United States Patent
Imamura

(10) Patent No.: US 10,965,233 B2
(45) Date of Patent: Mar. 30, 2021

(54) MOTOR CONTROL DEVICE AND ELECTRIC POWER STEERING DEVICE INCLUDING THE SAME

(71) Applicant: NSK Ltd., Tokyo (JP)

(72) Inventor: Yousuke Imamura, Maebashi (JP)

(73) Assignee: NSK Ltd., Tokyo (JP)

( * ) Notice: Subject to any disclaimer, the term of this patent is extended or adjusted under 35 U.S.C. 154(b) by 4 days.

(21) Appl. No.: 16/493,785

(22) PCT Filed: Mar. 14, 2019

(86) PCT No.: PCT/JP2019/010646
§ 371 (c)(1),
(2) Date: Sep. 13, 2019

(87) PCT Pub. No.: WO2019/216022
PCT Pub. Date: Nov. 14, 2019

(65) Prior Publication Data
US 2020/0403543 A1    Dec. 24, 2020

(30) Foreign Application Priority Data

May 11, 2018    (JP) .............................. JP2018-092473

(51) Int. Cl.
*H02P 21/09*    (2016.01)
*B62D 5/04*    (2006.01)
*H02P 21/22*    (2016.01)

(52) U.S. Cl.
CPC ............ *H02P 21/09* (2016.02); *B62D 5/0409* (2013.01); *B62D 5/0463* (2013.01); *B62D 5/0484* (2013.01); *H02P 21/22* (2016.02)

(58) Field of Classification Search
CPC .... B62D 5/049; B62D 5/0463; B62D 5/0484; B62D 5/046; B62D 5/0487; B62D 5/0409; H02P 21/09; H02P 21/22
See application file for complete search history.

(56) References Cited

U.S. PATENT DOCUMENTS

2016/0329849 A1*   11/2016   Nakajima ................. H02P 6/16
2018/0093702 A1     4/2018   Nampei
2019/0135334 A1*    5/2019   Itamoto .................. B62D 6/002

FOREIGN PATENT DOCUMENTS

EP    2 572 964 B1    5/2016
EP    3 243 728 A1    11/2017
(Continued)

OTHER PUBLICATIONS

Japanese-language Written Opinion (PCT/ISA/237) issued in PCT Application No. PCT/JP2019/010646 dated Jun. 11, 2019 with English translation (six pages).

(Continued)

*Primary Examiner* — Zoheb S Imtiaz
(74) *Attorney, Agent, or Firm* — Crowell & Moring LLP

(57) ABSTRACT

A motor control device includes a backup electrical angle detection circuit in which an inter-sensor error correction unit calculates an advance gain equal to or more than 1 with respect to input of a steering torque equal to or more than a predetermined torque value, and multiplies an output shaft angular velocity by the advance gain to calculate a post-advance steering angular velocity for correcting the estimated angle error of the direction delayed with respect to the steering direction. Then, an estimated angle calculation unit of the backup electrical angle detection circuit integrates the post-advance steering angular velocity, and, on the basis of a value of the integration, calculates a second motor electrical angle that is an estimated value of a motor electrical angle.

12 Claims, 26 Drawing Sheets

(56) References Cited

FOREIGN PATENT DOCUMENTS

| | | |
|---|---|---|
| JP | 2009-202774 A | 9/2009 |
| JP | 2010-70037 A | 4/2010 |
| JP | 2010-76714 A | 4/2010 |
| JP | 2016-96608 A | 5/2016 |
| JP | 6183424 B2 | 8/2017 |
| JP | 2018-47725 A | 3/2018 |

OTHER PUBLICATIONS

European Search Report issued in European Application No. 19762282.2 dated Apr. 8, 2020 (four pages).
Hindi-language Office Action issued in Indian Application No. 201927052540 dated Sep. 26, 2020 with English translation (six (6) pages).

* cited by examiner

FIG. 9

| SIGN OF PHASE COUNTER ELECTROMOTIVE FORCE | | ELECTRICAL ANGLE [deg_el] | 0~60 | 60~120 | 120~180 | 180~240 | 240~300 | 300~360 |
|---|---|---|---|---|---|---|---|---|
| | | OUTPUT INTERMEDIATE ANGLE [deg] | 30 | 90 | 150 | 210 | 270 | 330 |
| POSITIVE ROTATION | A-B COUNTER ELECTROMOTIVE FORCE | | + | + | + | − | − | − |
| | B-C COUNTER ELECTROMOTIVE FORCE | | − | − | + | + | + | − |
| | C-A COUNTER ELECTROMOTIVE FORCE | | + | − | − | + | + | + |
| REVERSE ROTATION | A-B COUNTER ELECTROMOTIVE FORCE | | − | + | + | − | + | + |
| | B-C COUNTER ELECTROMOTIVE FORCE | | + | + | − | + | − | + |
| | C-A COUNTER ELECTROMOTIVE FORCE | | − | + | + | + | − | − |

MOTOR CONTROL DEVICE AND ELECTRIC POWER STEERING DEVICE INCLUDING THE SAME

TECHNICAL FIELD

The present invention relates to a motor control device configured to drive control an electric motor mounted in an electric power steering device.

BACKGROUND ART

Conventionally, as backup technologies for when a motor position sensor has broken down that detects a motor electrical angle of an electric motor mounted in an electric power steering device, for example, there are technologies disclosed by PTL 1 to 2.

In the technology of PTL 1, an electric power steering device includes a steering angle sensor mounted on a column output shaft side, in which an estimated angle calculated from counter electromotive force information of an electric motor that generates a steering assist force and an estimated angle calculated from detection information of the steering angle sensor are used by being switched in accordance with steering velocity.

Here, usually, in an electric power steering device, a steering shaft is connected to an electric motor via a reduction gear. Thus, between output shaft steering angle information and motor electrical angle, there are error factor characteristics, such as mechanical compliance characteristics (such as backlash, nonlinear elasticity characteristics, and elastic deformation) of gears and the like and detection error characteristic of a steering angle sensor. Additionally, in the structure with the interposed reduction gear, when estimating a motor electrical angle is estimated using the output shaft steering angle information, influence due to an error of the steering angle sensor is multiplied by gear ratio, and therefore appears as a large motor angle calculation error. In addition, influence of an error due to an error factor such as the reduction gear or the steering angle sensor tends to more significantly appear in handling feeling, as the steering torque becomes larger.

In other words, in the conventional technology of PTL 1 described above, when a steering situation and an environmental situation occur in which an angle error due to the error factor appears, an error may occur in the estimated angle calculated from the output shaft steering angle, which may consequently cause behavior such as the loss of synchronism or the shortage of assist due to reduced torque generation efficiency.

Additionally, the technology of PTL 2 utilizes a correlation between the mechanical compliance characteristics and motor output torque, and when the motor position sensor is normal, learns a relationship between output torque-related information and an error characteristic between an estimated electrical angle obtained from the output shaft steering angle and an actual electrical angle. Then, when the motor position sensor becomes abnormal, the estimated angle is corrected by the error characteristic obtained from the output torque-related information, and the corrected estimated angle is used as an estimated electrical angle.

CITATION LIST

Patent Literature

PTL 1: JP 2016-96608 A
PTL 2: JP Pat. No. 6183424

SUMMARY OF INVENTION

Technical Problem

It is possible for the conventional technology of PTL 2 described above to eliminate the influence of an angle error due to the error factor. However, learning of error characteristics often requires much memory and a complicated leaning method. Besides, when considering a self-evaluation method for validity on learning results, there is a concern about the complication of an achievement method.

Here, as mentioned above, the mechanical compliance characteristics are mainly backlash, nonlinear elasticity characteristics, and elastic deformation, which can be approximately seen as hysteresis plus spring characteristics. Thus, seen from input/output characteristics, it is physically obvious that output with respect to input can be approximated as delay characteristics. In other words, when motor angle is an input and steering angle is an output, influence due to the mechanical compliance characteristics can be considered to always cause an error of the delay side.

The present invention has been made in view of the above problem. It is an object of the present invention to provide a motor control device that is configured to perform correction of advancing an estimated angle in response to a steering torque, and thereby capable of correcting an estimated angle error that acts in a direction delayed with respect to a steering direction in a simple structure and an electric power steering device including the motor control device.

Solution to Problem

In order to achieve the object mentioned above, according to an aspect of the present invention, there is provided a motor control device including: a steering angular velocity calculation unit configured to calculate a steering angular velocity on a basis of a steering angle detected by a steering angle detection unit configured to detect the steering angle of a steering wheel; a motor electrical angle estimation unit configured to estimate a motor electrical angle of an electric motor providing a steering assist force to a steering shaft on a basis of the steering angular velocity calculated by the steering angular velocity calculation unit; a motor drive control unit configured to, when a motor electrical angle detection unit configured to detect the motor electrical angle of the electric motor is normal, drive control the electric motor on a basis of the motor electrical angle detected by the motor electrical angle detection unit and, when the motor electrical angle detection unit is abnormal, drive control the electric motor on a basis of an estimated motor electrical angle estimated by the motor electrical angle estimation unit; an advance gain setting unit configured to set an advance gain for correcting an advance amount of the estimated motor electrical angle on a basis of a steering torque detected by a steering torque detection unit configured to detect the steering torque transmitted to the steering shaft; and a post-advance steering angular velocity calculation unit configured to calculate a post-advance steering angular velocity on a basis of a multiplication result obtained by multiplying the steering angular velocity by the advance gain set by the advance gain setting unit, wherein the motor electrical angle estimation unit integrates the post-advance steering angular velocity calculated by the post-advance steering angular velocity calculation unit, and estimates the motor electrical angle on a basis of a value of the integration, and only upon input of a steering torque equal to or more than a pre-set predetermined torque value, the advance gain setting unit sets the advance gain for advancing the estimated motor electrical angle in a direction cancelling an angle error of a direction delayed with respect to a steering direction.

Further, in order to achieve the object mentioned above, the motor control device according to the aspect of the present invention includes an advance correction limit value calculation unit configured to, on a basis of an error characteristic that is a characteristic of at least one error factor causing the angle error, calculate an advance correction limit value that is a limit value of an advance correction amount that is an integrated amount of an increased amount of the post-advance steering angular velocity due to the advance gain; and an advance correction amount control unit configured to control integration processing of the post-advance steering angular velocity by the motor electrical angle estimation unit such that the advance correction amount does not exceed the advance correction limit value calculated by the advance correction limit value calculation unit.

Further, in order to achieve the object mentioned above, an electric power steering device according to another aspect of the present invention includes the motor control device described above.

Advantageous Effects of Invention

According to the present invention, the structure configured to estimate a motor electrical angle on the basis of a steering angular velocity can, upon input of a steering torque equal to or more than a predetermined torque value, calculate a post-advance steering angular velocity for advancing the estimated motor electrical angle in a direction cancelling an angle error of a direction delayed with respect to a steering direction. For example, by setting the predetermined torque value to a boundary value indicating whether or not influence due to the angle error appears as handling feeling, correction can be performed only when the influence appears as handling feeling. As a result, the angle error of the direction delayed with respect to the steering direction due to the error factor can be reduced by the structure simpler than the conventional ones.

Furthermore, since the amount of advance is limited on the basis of the error characteristic of the error factor, occurrence of an angle error due to excessive advance can be suppressed, so that favorable advance correction can be performed.

Still furthermore, the electric power steering device is configured by including the motor control device having the above advantageous effects. Thus, even when abnormality occurs in the motor electrical angle detection unit, the electric motor can be drive controlled using an estimated motor electrical angle value, so that a steering assist function of the electric power steering device can be continued.

BRIEF DESCRIPTION OF DRAWINGS

FIG. 9 is a diagram illustrating a relationship among motor rotation direction, signs of the respective line counter electromotive forces, intermediate angle, and absolute angle region;

DESCRIPTION OF EMBODIMENTS

Figure 1:
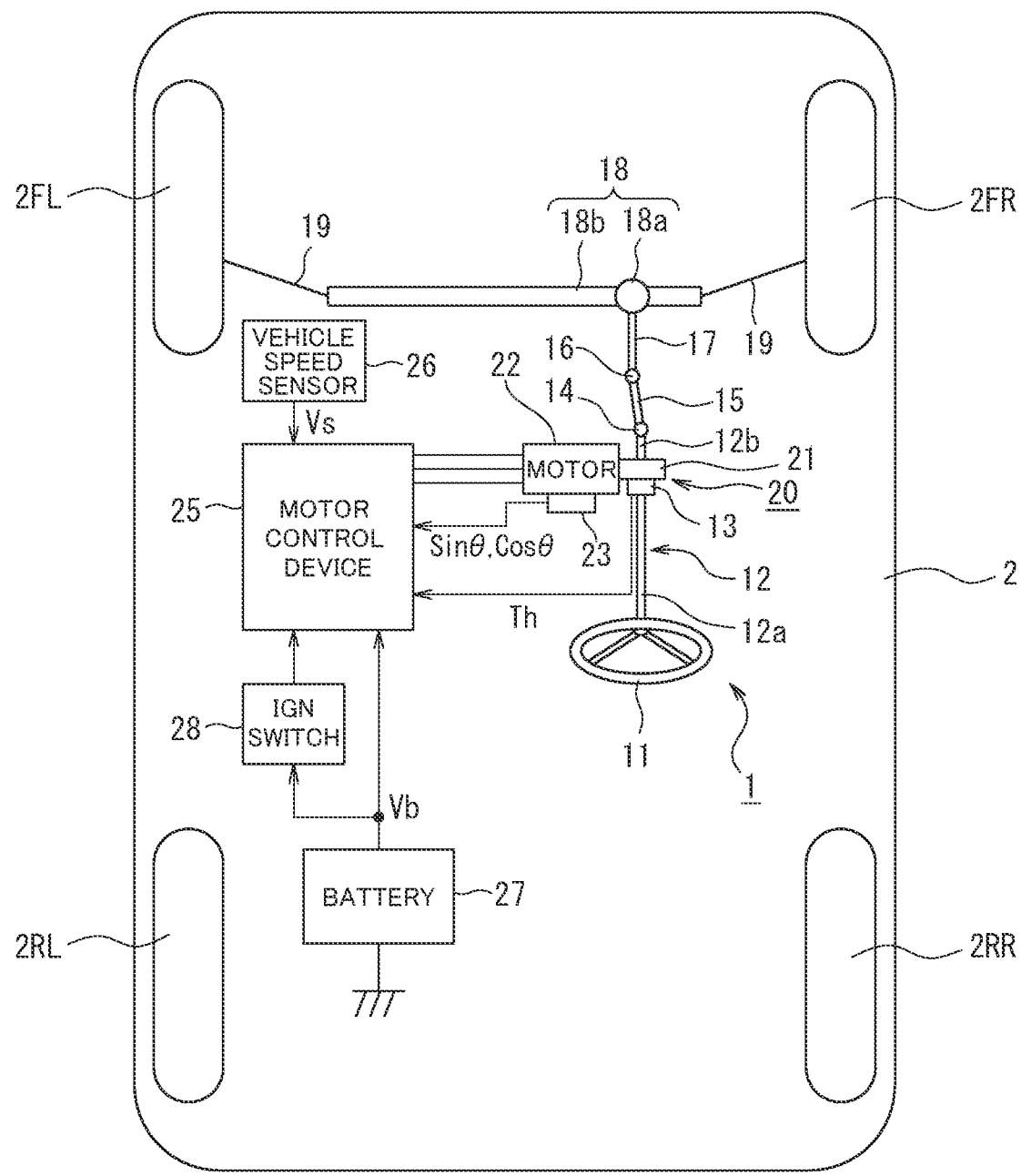
FIG. 1 is a diagram illustrating one structural example of a vehicle mounted with an electric power steering device according to a first embodiment.

Next, a first to third embodiments of the present invention will be described based on the drawings. In the drawings below, identical or similar symbols are assigned to identical or similar portions. However, it should be noted that the drawings are schematic, and the relationship between dimensions and the ratios of dimensions and the like may be different from the actual ones.

In addition, the first to third embodiments described below illustrate devices and methods to embody the technical idea of the present invention by way of example. The technical idea of the present invention is not limited to the materials, shapes, structures, arrangements, or the like of the constituent components to those described below. The technical idea of the present invention can be subjected to a variety of modifications and changes within the technical scope prescribed by the claims.

First Embodiment (Structure)

A vehicle 2 according to an embodiment of the present invention includes front wheels 2FR and 2FL serving as right and left steered wheels and rear wheels 2RR and 2RL, as depicted in FIG. 1. The front wheels 2FR and 2FL are steered by an electric power steering device 1.

The electric power steering device 1 includes a steering wheel 11, and a steering force applied to the steering wheel 11 by a driver is transmitted to a steering shaft 12. The steering shaft 12 includes an input shaft 12a and an output shaft 12b. One end of the input shaft 12a is connected to the steering wheel 11 and the other end thereof is connected to one end of the output shaft 12b via a steering torque sensor 13.

Then, the steering force transmitted to the output shaft 12b is transmitted to a lower shaft 15 via a universal joint 14, and furthermore transmitted to a pinion shaft 17 via a universal joint 16. The steering force transmitted to the pinion shaft 17 is transmitted to a tie rod 19 via a steering gear 18 to steer the front wheels 2FR and 2FL as the steered wheels. Here, the steering gear 18 is formed in a rack and pinion form having a pinion 18a connected to the pinion shaft 17 and a rack 18b engaged with the pinion 18a. Accordingly, the steering gear 18 converts a rotational movement transmitted to the pinion 18a to a translatory movement in a vehicle width direction at the rack 18b.

A steering assisting mechanism 20 that transmits a steering assist force to the output shaft 12b is connected to the output shaft 12b of the steering shaft 12. The steering assisting mechanism 20 includes a reduction gear 21 connected to the output shaft 12b and formed by, for example, a worm gear mechanism, and an electric motor 22 that is connected to the reduction gear 21 and that generates the steering assist force.

Figure 2:
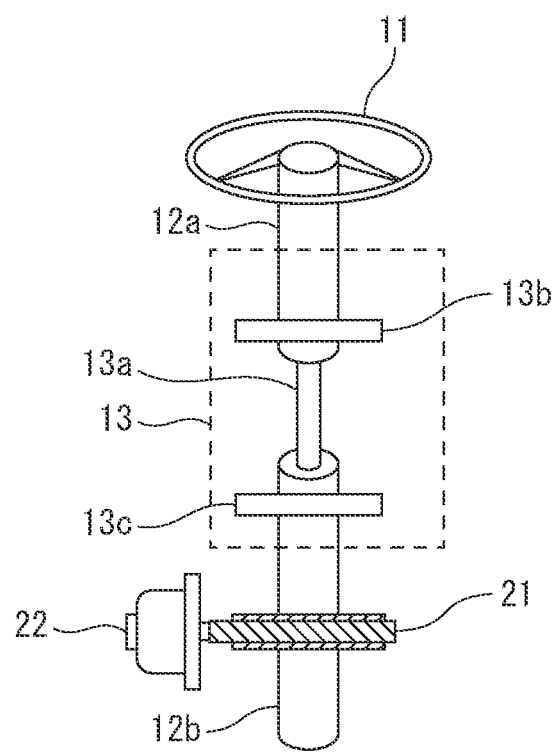
FIG. 2 is a schematic structural diagram illustrating a steering torque sensor according to the first embodiment.

The steering torque sensor 13 detects a steering torque Th applied to the steering wheel 11 and transmitted to the input shaft 12a. As illustrated in FIG. 2, the steering torque sensor 13 includes a torsion bar 13a interposed between the input shaft 12a and the output shat 12b, an input shaft rotation angle sensor 13b arranged on the input shaft 12a side, and an output shaft rotation angle sensor 13c arranged on the output shaft 12b side.

The input shaft rotation angle sensor 13b detects an input shaft rotation angle $\theta_{is}$ that is a rotation angle of the input shaft 12a.

The output shaft rotation angle sensor 13c detects an output shaft rotation angle $\theta_{os}$ that is a rotation angle of the output shaft 12b.

Then, the steering torque sensor 13 is configured so as to detect a steering torque Th by calculating from a twist angular displacement of the torsion bar 13a, i.e., an angular difference between the input shaft rotation angle sensor 13b and the output shaft rotation angle sensor 13c, and a stiffness value of the torsion bar 13a.

In addition, the electric motor 22 is a three-phase brushless motor in the present embodiment, and includes a ring-shaped motor rotor and a ring-shaped motor stator that are unillustrated. The motor stator includes a plurality of pole teeth protruding inward in a radial direction and provided at equal intervals in a circumferential direction, in which an excitation coil (A-phase motor winding La, B-phase motor winding Lb, and C-phase motor winding Lc illustrated in FIG. 3) is wound around each pole tooth. Then, the motor rotor is coaxially arranged inside the motor stator. The motor rotor is configured to face the pole teeth of the motor stator with a small gap (air gap) and include a plurality of magnets provided at equal intervals in a circumferential direction on an outer peripheral surface thereof. Hereinafter, the A-phase motor winding La, the B-phase motor winding Lb, and the C-phase motor winding Lc may be simply referred to as "three-phase motor windings La to Lc".

The motor rotor is fixed to a motor rotating shaft. A three-phase AC current is supplied to the three-phase motor windings La to Lc of the motor stator via a motor control device 25, whereby each of the teeth of the motor stator is excited in a predetermined sequence to rotate the motor rotor, thereby rotating the motor rotating shaft.

Figure 3:
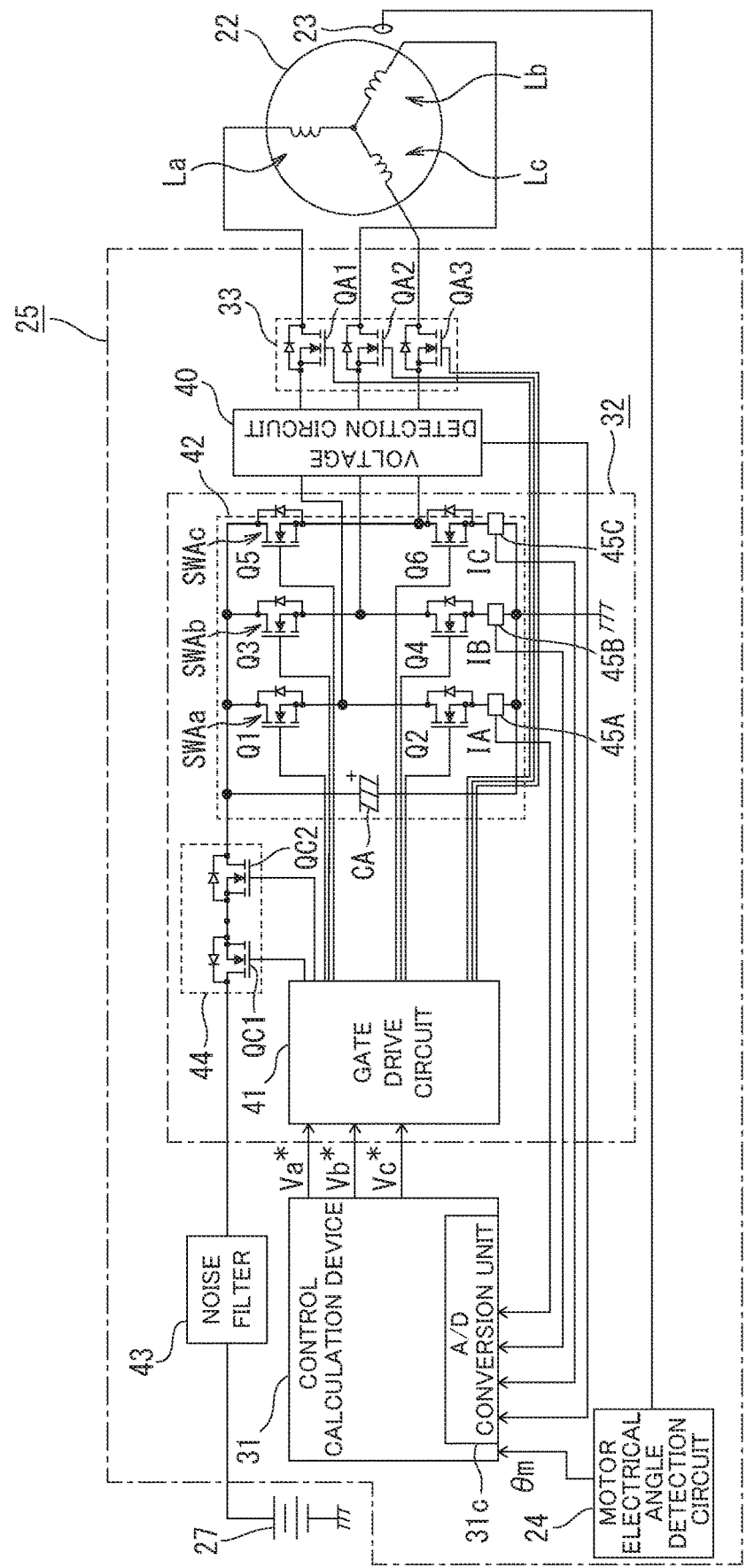
FIG. 3 is a circuit diagram illustrating a specific structure of a motor control device according to the first embodiment.

Furthermore, as illustrated in FIG. 1 and FIG. 3, the electric motor 22 includes a rotation position sensor 23 formed by a resolver configured to detect a rotation position of the rotor. A detected value from the rotation position sensor 23 is supplied to a motor electrical angle detection circuit 24, and the motor electrical angle detection circuit 24 detects a motor electrical angle $\theta m$. Hereinafter, the rotation position sensor 23 may be referred to as "resolver 23". Note that the rotation position sensor 23 is not limited to resolver, and may be formed by another sensor such as, for example, a rotary encoder.

Direct current is input to the motor control device 25 from a battery 27 as a direct current source. Here, a negative electrode of the battery 27 is grounded, and a positive electrode thereof is connected to the motor control device 25 via an ignition switch 28 (hereinafter may be referred to as "IGN switch 28") configured to start engine, and also directly connected to the motor control device 25, not via the IGN switch 28.

(Structure of Motor Control Device 25)

Next, a description will be given of a specific structure of the motor control device 25.

As illustrated in FIG. 3, the motor control device 25 includes the motor electrical angle detection circuit 24 configured to detect the motor electrical angle $\theta m$, a control calculation device 31 configured to calculate a motor voltage command value, and a motor drive circuit 32 to which three-phase motor voltage command values Va*, Vb*, and Vc* to be described later output from the control calculation device 31 are input. Hereinafter, when it is unnecessary to distinguish the motor voltage command values Va*, Vb*, and Vc*, they may be simply referred to as "motor voltage command values V*".

Furthermore, the motor control device 25 includes a motor phase current cut-off circuit 33 interposed between an output side of the motor drive circuit 32 and the three-phase motor windings La to Lc of the electric motor 22, a voltage detection circuit 40 provided between the motor drive circuit 32 and the motor phase current cut-off circuit 33, and a noise filter 43 provided between the battery 27 and the motor drive circuit 32.

The motor drive circuit 32 includes a gate drive circuit 41 to which the three-phase motor voltage command values V* output from the control calculation device 31 are input and thereby which forms a gate drive signal and an inverter circuit 42 to which the gate drive signal output from the gate drive circuit 41 is input.

The motor drive circuit 32 further includes a power source cut-off circuit 44 interposed between the noise filter 43 and the inverter circuit 42. In addition, the motor drive circuit 32 includes current detection circuits 45A, 45B, and 45C interposed between lower arms and a ground and configured to detect direct current flowing from the lower arms to the ground.

Hereinafter, the current detection circuits 45A, 45B, and 45C may be simply referred to as "current detection circuits 45A to 45C".

Specifically, the current detection circuit 45A detects an A-phase motor current Ia output from the A-phase motor winding La, the current detection circuit 45B detects a B-phase motor current Ib output from the B-phase motor winding Lb, and the detection circuit 45C detects a C-phase motor current Ic output from the C-phase motor winding Lc.

Hereinafter, the A, B, and C-phase motor currents Ia, Ib, and Ic may be simply referred to as "motor phase currents Ia to Ic".

The voltage detection circuit 40 detects each voltage of connection lines that connect connection points between respective upper arms and the respective lower arms of inverter circuit 42 to the three-phase motor windings La to Lc of the electric motor 22.

Specifically, the voltage detection circuit 40 detects a motor phase voltage Va that is a voltage of the connection line connecting to the A-phase motor winding La, a motor phase voltage Vb that is a voltage of the connection line connecting to the B-phase motor winding Lb, and a motor phase voltage Vc that is a voltage of the connection line connecting to the C-phase motor winding Lc.

Hereinafter, the motor phase voltages Va, Vb, and Vc may be simply referred to as "motor phase voltages Va to Vc".

Upon input of the motor voltage command values V* from the control calculation device 31, the gate drive circuit 41 forms six gate drive signals subjected to pulse width modulation (PWM) on the basis of the motor voltage command values V* and a triangular wave carrier signal Sc, and then, outputs the gate drive signals to the inverter circuit 42.

Battery power of the battery 27 is input to the inverter circuit 42 via the noise filter 43 and the power source cut-off circuit 44. In addition, a smoothing capacitor CA that is an electrolytic capacitor for smoothing is interposed between a connection line of an input side connecting to the power source cut-off circuit 44 and the ground. The smoothing capacitor CA has a noise removal function and a power source supply assist function for the inverter circuit 42.

The inverter circuit 42 includes six field effect transistors Q1 to Q6 as switching elements, each two of which field effect transistors are connected in series to form three switching arms SWAa, SWAb, and SWAc that are connected in parallel. Then, the gate drive signals output from the gate drive circuit 41 are input to gates of the respective field effect transistors Q1 to Q6, whereby the A-phase motor current Ia, the B-phase motor current Ib, and the C-phase motor current Ic are conducted to the three-phase motor windings La, Lb, and Lc of the electric motor 22 via the motor phase current cut-off circuit 33 from connection points between the field effect transistors of the respective switching arms SWAa, SWAb, and SWAc.

Note that since pulse width modulated (PWM) signals as the gate drive signals are input to the gates of the field effect transistors of the inverter circuit 42, the A-phase current Ia, the B-phase current Ib, and the C-phase current Ic output from the inverter circuit 42 become rectangular signals whose duty ratios are controlled.

The power source cut-off circuit 44 has a series circuit structure in which sources of two field effect transistors QC1 and QC2 are connected to each other so that parasitic diodes are oriented in reverse directions. Additionally, a drain of the field effect transistor QC1 is connected to an output side of the noise filter 43, and a drain of the field effect transistor QC2 is connected to drains of the respective field effect transistors Q1, Q3, and Q5 of the inverter circuit 42.

The motor phase current cut-off circuit 33 includes three field effect transistors QA1, QA2, and QA3 for current cut off. A source of the field effect transistor QA1 is connected to a connection point between the field effect transistors Q1 and Q2 of the switching arm SWAa of the inverter circuit 42 via the voltage detection circuit 40, and a drain thereof is connected to the A-phase motor winding La. Additionally, a source of the field effect transistor QA2 is connected to a connection point between the field effect transistors Q3 and Q4 of the switching arm SWAb of the inverter circuit 42 via the voltage detection circuit 40, and a drain thereof is connected to the B-phase motor winding Lb. In addition, a source of the field effect transistor QA3 is connected to a connection point between the field effect transistors Q5 and Q6 of the switching arm SWAc of the inverter circuit 42 via the voltage detection circuit 40, and a drain thereof is connected to the C-phase motor winding Lc.

Then, each of the field effect transistors QA1 to QA3 of the motor phase current cut-off circuit 33 is connected in the same direction, with an anode of a parasitic diode D being arranged on the inverter circuit 42 side.

(Structure of Control Calculation Device 31)

Next, a description will be given of a specific structure of the control calculation device 31

Here, as illustrated in FIG. 3, the motor phase voltages Va to Vc detected by the voltage detection circuit 40 and the motor phase currents Ia, Ib, and Ic output from the current detection circuits 45A to 45C are input to the control calculation device 31 via an A/D conversion unit 31c. Additionally, the motor electrical angle θm output from the motor electrical angle detection circuit 24 is input to the control calculation device 31.

Figure 4:
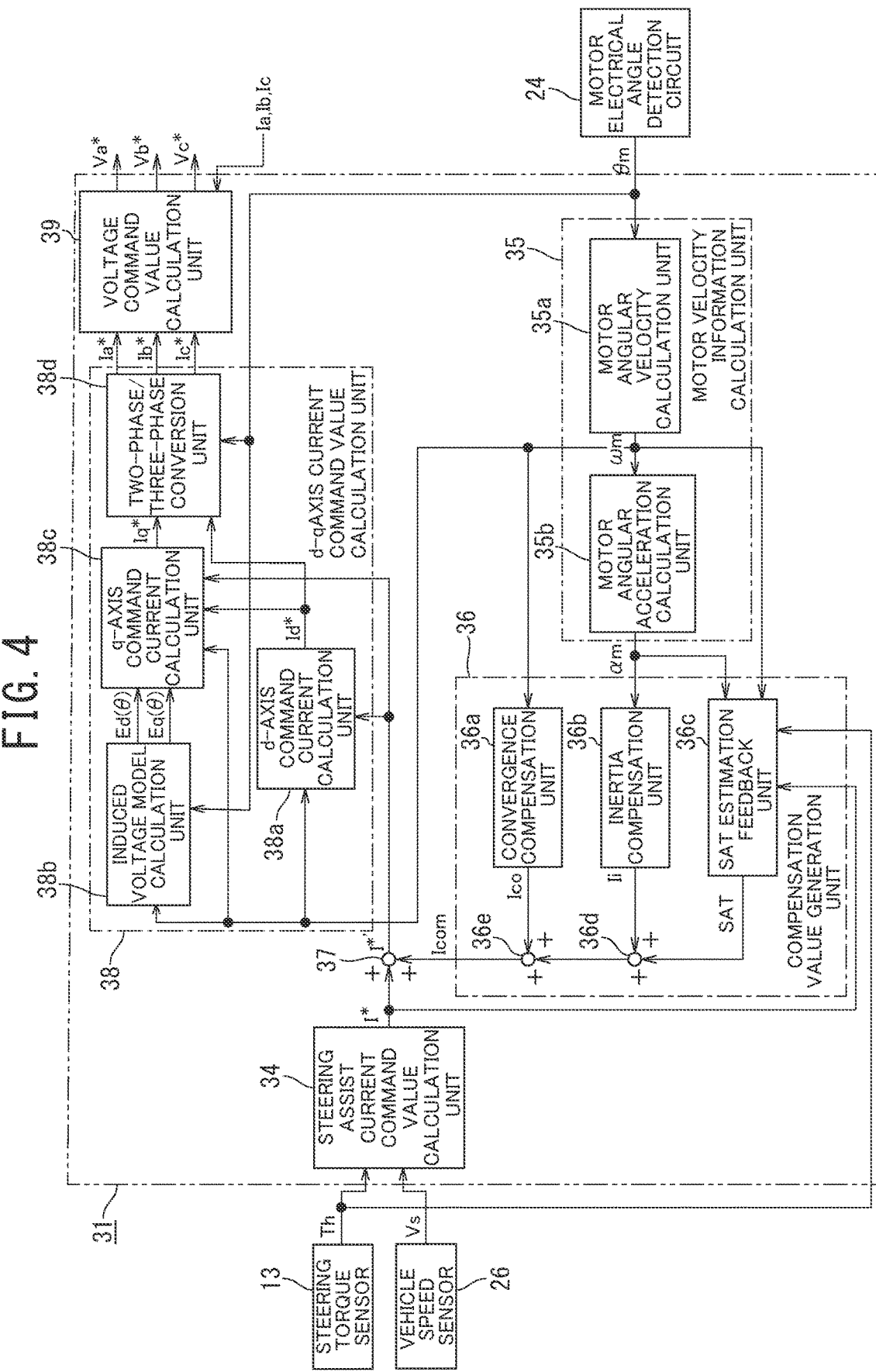
FIG. 4 is a block diagram illustrating a specific structure of a control calculation device according to the first embodiment.

Note that, furthermore, as illustrated in FIG. 4, the steering torque Th detected by the steering torque sensor 13 and a vehicle speed Vs detected by a vehicle speed sensor 26 are input to the control calculation device 31.

Furthermore, although illustration is omitted, the control calculation device 31 includes a CPU, a ROM previously storing a control program to be executed by the CPU, data to be used when executing the control program, and the like in a predetermined region, and a RAM as work memory for storing data read from the ROM and calculation results necessary in a calculation process of the CPU.

Still furthermore, as illustrated in FIG. 4, the control calculation device 31 includes a steering assist current command value calculation unit 34 configured to calculate steering assist current command values I* and a motor velocity information calculation unit 35 configured to calculate velocity information of the electric motor 22. In addition, the control calculation device 31 includes a compensation value generation unit 36 configured to, on the basis of the motor velocity information calculated by the motor velocity information calculation unit 35, generate a compensation value with respect to the steering assist current command value I* calculated by the steering assist current command value calculation unit 34 and an addition unit 37. Additionally, the control calculation device 31 includes a d-q axis current command value calculation unit 38 configured to, on the basis of a post-compensation steering assist current command value I*', compensated by the compensation value generation unit 36, calculate a d-q axis current command value and convert it to a three-phase current command value. Moreover, the control calculation device 31 includes a voltage command value calculation unit 39 configured to calculate the motor voltage command values V* for the motor drive circuit 32.

The steering assist current command value calculation unit 34 calculates, on the basis of the steering torque Th and the vehicle speed Vs input, the steering assist current command value I* formed by a current command value with reference to a steering assist current command value calculation map (unillustrated). The steering assist current command value calculation map is formed by a characteristic chart represented by parabolic curves, whose horizontal axis represents steering torque Th and whose vertical axis represents steering assist current command value I*.

The steering assist current command value calculation unit 34 outputs the calculated steering assist current command value I* to the addition unit 37 and the compensation value generation unit 36, respectively.

The motor velocity information calculation unit 35 includes a motor angular velocity calculation unit 35a and a motor angular acceleration calculation unit 35b.

The motor angular velocity calculation unit 35a calculates a motor angular velocity ωm by differentiating the input motor electrical angle θm. Then, the calculated motor angular velocity ωm is output to each of pre-set output destinations, such as the motor angular acceleration calculation unit 35b and the compensation value generation unit 36.

The motor angular acceleration calculation unit 35b calculates a motor angular acceleration am by differentiating the input motor angular velocity ωm. Then, the calculated motor angular acceleration αm is output to each of preset output destinations, such as the compensation value generation unit 36.

The compensation value generation unit 36 includes a convergence compensation unit 36a, an inertia compensation unit 36b, a SAT estimation feedback unit 36c, and addition units 36d and 36e.

The convergence compensation unit 36a calculates, on the basis of the motor angular velocity ωm input from the motor angular velocity calculation unit 35a, a convergence compensation value Ico such that a brake is applied to a swinging and rotating action of the steering wheel 11 so as to improve yaw convergence of the vehicle. The convergence compensation unit 36a outputs the calculated convergence compensation value Ico to the addition unit 36e.

On the basis of the motor angular acceleration αm input from the motor angular acceleration calculation unit 35b, the inertia compensation unit 36b calculates an inertia compensation value Ii for compensating for an amount equivalent to a torque generated due to inertia of the electric motor 22 to prevent deterioration of control responsiveness. The inertia compensation unit 36b outputs the calculated inertia compensation value Ii to the addition unit 36d.

The SAT estimation feedback unit 36c estimates and calculates a self-aligning torque SAT on the basis of the input steering torque Th, motor angular velocity ωm, motor angular acceleration αm, and steering assist current command value I*. The SAT estimation feedback unit 36c outputs the calculated self-aligning torque SAT to the addition unit 36d.

The addition unit 36d adds the input inertia compensation value Ii and self-aligning torque SAT together, and outputs an addition result to the addition unit 36e.

The addition unit 36e adds the addition results of the addition unit 36d and the convergence compensation value Ico calculated by the convergence compensation unit 36a together, and outputs an addition result as a command compensation value Icom to the addition unit 37.

The addition unit 37 adds the command compensation value Icom input from the compensation value generation unit 36 to the steering assist current command value I* input from the steering assist current command value calculation unit 34, and outputs the post-compensation steering assist current command value I*' to the d-q axis current command value calculation unit 38.

The d-q axis current command value calculation unit 38 includes a d-axis command current calculation unit 38a, an induced voltage model calculation unit 38b, a q-axis command current calculation unit 38c, and a two-phase/three-phase conversion unit 38d.

The d-axis command current calculation unit 38a calculates a d-axis current command value Id* on the basis of the post-compensation steering assist current command value I*' and the motor angular velocity ωm.

The induced voltage model calculation unit 38b calculates a d-axis EMF component Ed(θ) and a q-axis EMF component Eq(θ) of a d-q axis induced voltage model electromotive force (EMF) on the basis of the motor electrical angle θm and the motor angular velocity ωm.

The q-axis command current calculation unit 38c calculates a q-axis current command value Iq* on the basis of the d-axis EMF component Ed(θ) and the q-axis EMF component Eq(θ) output from the induced voltage model calculation unit 38b, the d-axis current command value Id* output from the d-axis command current calculation unit 38a, the post-compensation steering assist current command value I*', and the motor angular velocity ωm.

The two-phase/three-phase conversion unit 38d converts the d-axis current command value Id* output from the d-axis command current calculation unit 38a and the q-axis current command value Iq* output from the q-axis command current calculation unit 38c to an A-phase current command value Ia*, a B-phase current command value Ib*, and a C-phase current command value Ic*. Then, the three-phase current command values Ia*, Ib*, and Ic* are output to the voltage command value calculation unit 39.

The voltage command value calculation unit 39 calculates motor voltage command values V* on the basis of the input A-phase current command value Ia*, B-phase current command value Ib*, and C-phase current command value Ic* and the motor phase currents Ia to Ic detected by the current detection circuits 45A to 45C.

Specifically, the voltage command value calculation unit 39 subtracts respective detected values of the A-phase motor current Ia, the B-phase motor current Ib, and the C-phase motor current Ic input from the current detection circuits 45A to 45C from the A-phase current command value Ia*, the B-phase current command value Ib*, and the C-phase current command value Ic* input from the two-phase/three-phase conversion unit 38d to calculate current deviations ΔIa, ΔIb, and ΔIc. Additionally, the voltage command value calculation unit 39 performs, for example, a PI control calculation or a PID control calculation on the current deviations ΔIa, ΔIb, and ΔIc to calculate the three-phase motor voltage current values V* for the motor drive circuit 32. Then, the calculated three-phase motor voltage current values V* are output to the gate drive circuit 41.

(Motor Electrical Angle Detection Circuit 24)

Next, a description will be given of a specific structure of the motor electrical angle detection circuit 24 according to the first embodiment.

Figure 5:
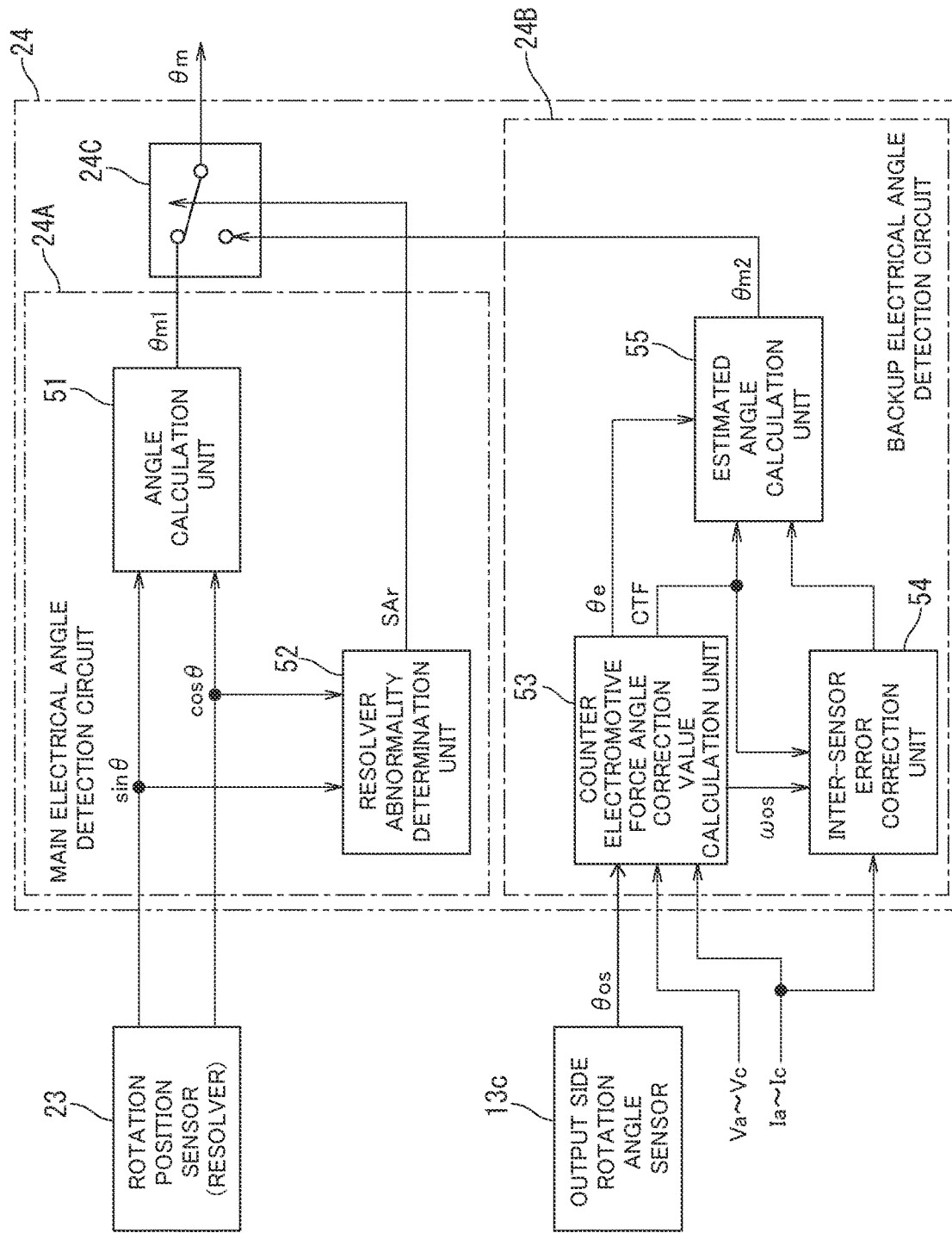
FIG. 5 is a block diagram illustrating a specific structure of a motor electrical angle detection circuit according to the first embodiment.

The motor electrical angle detection circuit 24 includes a main electrical angle detection circuit 24A configured to calculate a first motor electrical angle θm1 on the basis of a signal from the resolver 23 and a backup electrical angle detection circuit 24B configured to calculate a second motor electrical angle θm2 on the basis of a signal from the output shaft rotation angle sensor 13c, as illustrated in FIG. 5. In addition, the motor electrical angle detection circuit 24 includes an electrical angle selection unit 24C configured to select a motor electrical angle to be output from the first motor electrical angle θm1 and the second motor electrical angle θm2 on the basis of an abnormality determination result of the resolver 23.

Additionally, although illustration is omitted, the motor electrical angle detection circuit 24 includes a CPU, a ROM previously storing a control program to be executed by the CPU, data to be used when executing the control program, and the like in a predetermined region, and a RAM as work memory for storing data read from the ROM and calculation results necessary in a calculation process of the CPU.

The main electrical angle detection circuit 24A includes an angle calculation unit 51 and a resolver abnormality determination unit 52.

The angle calculation unit 51 calculates the first motor electrical angle θm1 on the basis of a sine wave signal sinθ and a cosine wave signal cosθ in accordance with a rotation angle of the electric motor 22 output from the resolver 23. Then, the calculated first motor electrical angle θm1 is output to the electrical angle selection unit 24C.

The resolver abnormality determination unit 52 determines abnormality of the resolver 23, and outputs an abnormality detection signal SAr indicating a determination result to the electrical angle selection unit 24C. Specifically, an abnormality determination map is referred to on the basis of the sinθ and the cosθ input from the resolver 23 to determine whether a combination of the sinθ and the cosθ is normal or abnormal.

Figure 6:
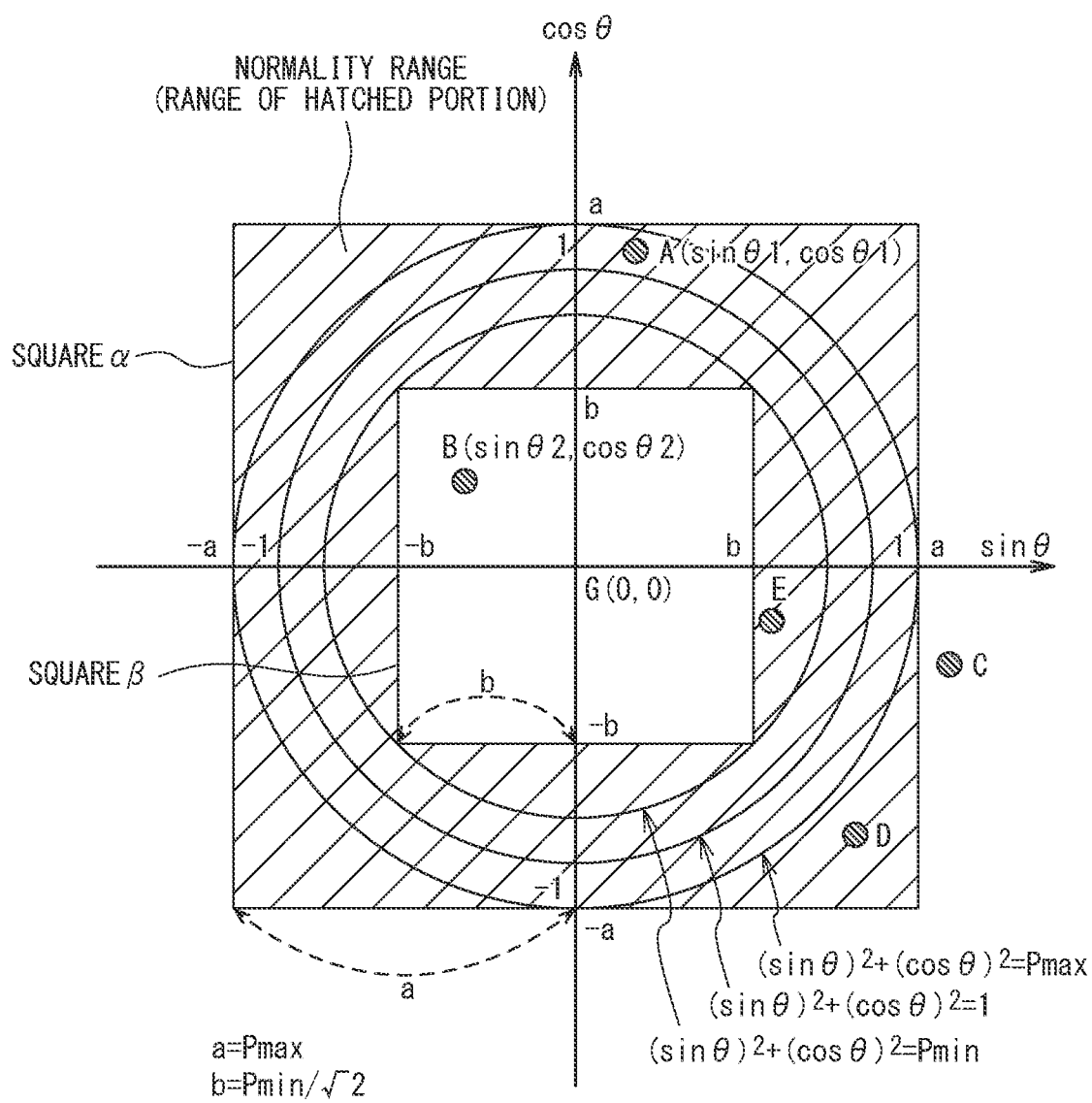
FIG. 6 is a diagram illustrating one example of an abnormality determination map.

Here, in the abnormality determination map, horizontal axis and vertical axis represent sinθ and cosθ, respectively, and the map is formed such that three concentric circles and two quadrangles are drawn centering on the origin G (0, 0), as illustrated in FIG. 6. Firstly, with regard to the three concentric circles, there are a circle of $(\sin\theta)^2+(\cos\theta)^2=$Pmin drawn on the innermost side, a circle of $(\sin\theta)^2+(\cos\theta)^2=1$ drawn on the middle side, and a circle of $(\sin\theta)^2+(\cos\theta)^2=$Pmax drawn on the outermost side. Large quadrangle α is a square whose one side length is 2×Pmax, and small quadrangle β is a quadrangle whose one side length is 2×(Pmin/√2). Here, normal region indicates the range of a hatched portion surrounded by the large quadrangle α and the small quadrangle β, and the region other than that indicates an abnormal range. Note that Pmin and Pmax of the determination reference mentioned above are set by considering influences of detection accuracy, the number of motor poles, and the like, and abnormality detection accuracy can be adjusted by Pmin and Pmax. Appropriately setting Pmax and Pmin enables detection of motor breakdown during operation and abnormality of the resolver 23. Additionally, $(\sin\theta)^2+(\cos\theta)^2=1$ is a usual normality determination reference, and $(\sin\theta)^2+(\cos\theta)^2=$Pmin and $(\sin\theta)^2+(\cos\theta)^2=$Pmax are used to indicate a normality range of Pmin<$(\sin\theta)^2+(\cos\theta)^2$<Pmax, which is thus wider than the usual normality determination reference.

When the resolver 23 is determined to be abnormal, the resolver abnormality determination unit 52 outputs the abnormality detection signal SAr of a logical value "1" to the electrical angle selection unit 24C. When resolver 23 is determined to be normal, the resolver abnormality determination unit 52 outputs the abnormality detection signal SAr of a logical value "0" to the electrical angle selection unit 24C.

Referring back to FIG. 5, the backup electrical angle detection circuit 24B includes a counter electromotive force angle correction value calculation unit 53 configured to calculate a correction angle θe for correcting the second motor electrical angle θm2 that is an estimated angle of the motor electrical angle θm on the basis of line counter electromotive forces of the electric motor 22. In addition, the backup electrical angle detection circuit 24B includes an inter-sensor error correction unit 54 configured to correct an output shaft angular velocity ωs that is an angular velocity of an output shaft rotation angle θos on the basis of mechanical compliance characteristics of the reduction gear 21. Furthermore, the backup electrical angle detection circuit 24B includes an estimated angle calculation unit 55 configured to calculate the second motor electrical angle θm2 by integrating the output shaft angular velocity ωs and a post-correction output shaft angular velocity ωsc (hereinafter referred to as "post-advance steering angular velocity ωsc).

Here, the correction angle θe calculated by the counter electromotive force angle correction value calculation unit 53 is calculated from motor-side information, and therefore, is more accurate and reliable than the estimated electrical angle calculated by the integration of the output shaft angular velocity ωs and the post-advance steering angular velocity ωosc. Thus, the estimated angle calculation unit 55 of the first embodiment is configured to, when the correction angle θe is input at a time of permission of correction, perform a correction for forcibly changing a present integration value to the correction angle θe.

The electrical angle selection unit 24C selects the first motor electrical angle θm1 output from the main electrical angle detection circuit 24A when the abnormality detection signal SAr output from the resolver abnormality determination unit 52 of the main electrical angle detection circuit 24A has the logical value "0" representing that there is no abnormality. Then, the selected first motor electrical angle θm1 is output as the motor electrical angle θm to the above-described control calculation device 31. On the other hand, when the abnormality detection signal SAr has the logical value "1" representing that there is abnormality, the electrical angle selection unit 24C selects the second motor electrical angle θm2 output from the backup electrical angle detection circuit 24B. Then, the selected second motor electrical angle θm2 is output as the motor electrical angle θm to the control calculation device 31.

(Counter Electromotive Force Angle Correction Value Calculation Unit 53)

Next, a description will be given of a specific structure of the counter electromotive force angle correction value calculation unit 53.

Figure 7:
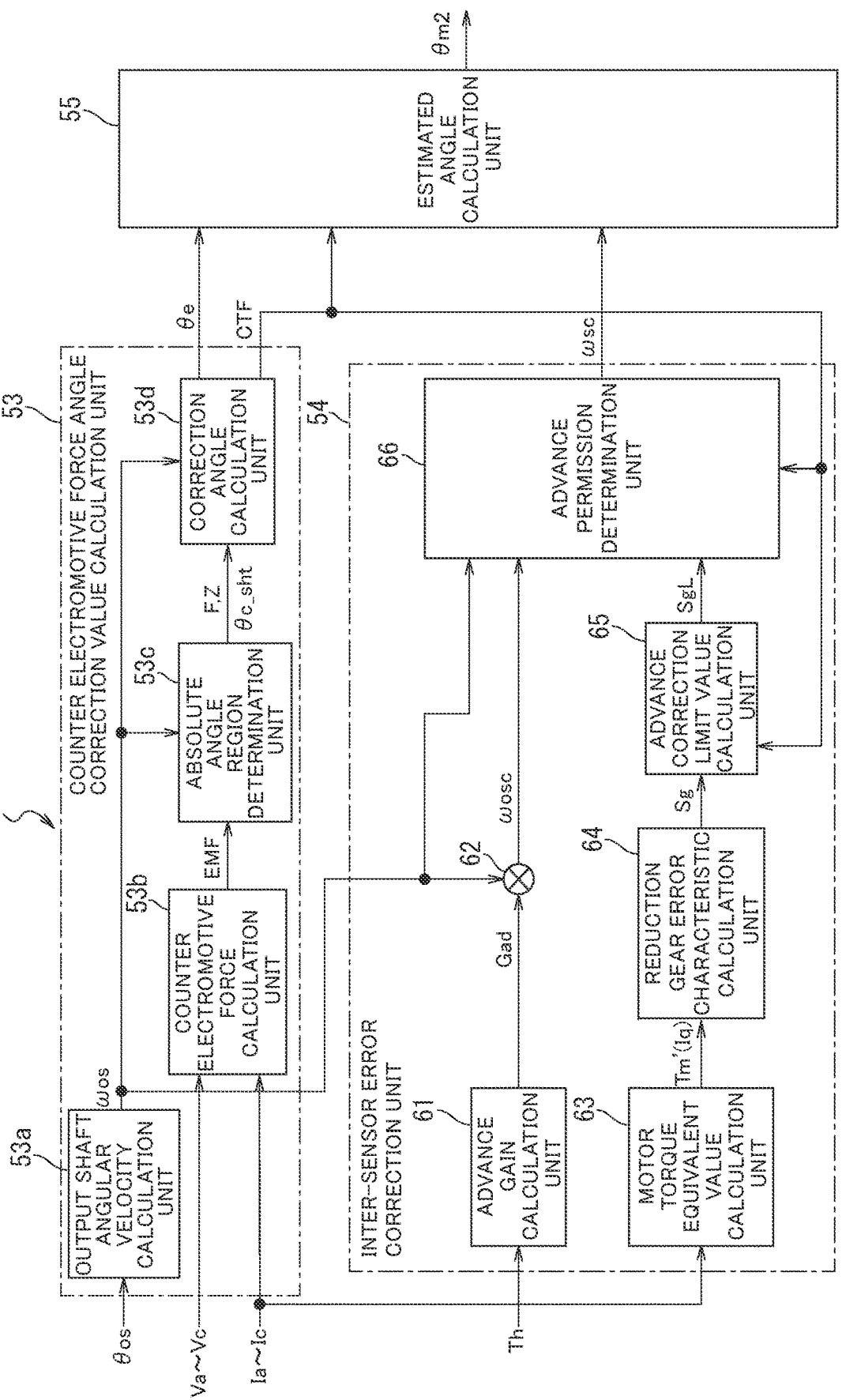
FIG. 7 is a block diagram illustrating a specific structure of a backup electrical angle detection circuit according to the first embodiment.

As illustrated in FIG. 7, the counter electromotive force angle correction value calculation unit 53 includes an output shaft angular velocity calculation unit 53a, a counter electromotive force calculation unit 53b, an absolute angle region determination unit 53c, and a correction angle calculation unit 53d.

The output shaft angular velocity calculation unit 53a calculates the output shaft angular velocity ωos by differentiating the output shaft rotation angle θos from the output shaft rotation angle sensor 13c. Then, the calculated output shaft angular velocity ωs is output to the absolute angle region determination unit 53c, the correction angle calculation unit 53d, and the inter-sensor error correction unit 54, respectively.

Firstly, the counter electromotive force calculation unit 53b performs calculations of the following formulae (1) to (3) on the basis of the motor phase voltages Va to Vc input from the voltage detection circuit 40 to calculate line voltages Vab, Vbc, and Vca.

$$Vab = Va - Vb \quad (1)$$

$$Vbc = Vb - Vc \quad (2)$$

$$Vca = Vc - Va \quad (3)$$

Next, the counter electromotive force calculation unit 53b performs calculations of the following formulae (4) to (6) on the basis of the calculated line voltages Vab, Vbc, and Vca and the motor phase currents Ia to Ic input from the current detection circuits 45A to 45C to calculate an A-B counter electromotive force EMFab, a B-C counter electromotive force EMFbc, and a C-A counter electromotive force EMFca. Hereinafter, the A-B counter electromotive force EMFab, the B-C counter electromotive force EMFbc, and the C-A counter electromotive force EMFca may be generally referred to as "respective line counter electromotive force values EMF".

$$EMFab = Vab - \{(Ra + s \times La) \times Ia - (Rb + s \times Lb) \times Ib\} \quad (4)$$

$$EMFbc = Vbc - \{(Rb + s \times Lb) \times Ib - (Rc + s \times Lc) \times Ic\} \quad (5)$$

$$EMFca = Vca - \{(Rc + s \times Lc) \times Ic - (Ra + s \times La) \times Ia\} \quad (6)$$

Here, Ra, Rb, and Rc are winding resistances of the respective phases of the motor; La, Lb, and Lc are inductances of the respective phases of the motor; and s is a Laplace operator, and herein represents a differential operation (d/dt).

The counter electromotive force calculation unit 53b outputs the calculated respective line counter electromotive force values EMF to the absolute angle region determination unit 53c.

On the basis of the input output shaft angular velocity ωs and the input respective line counter electromotive force values EMF, the absolute angle region determination unit 53c estimates a region where an actual motor electrical angle θm is positioned (hereinafter referred to as "absolute angle region Z") from among angle regions obtained by dividing an electrical angle region of 360 [deg_el] of the electric motor 22 by 60 [deg].

Hereinafter, a description will be given of a principle for estimating the absolute angle region where the actual motor electrical angle θm is positioned.

Figure 8A:
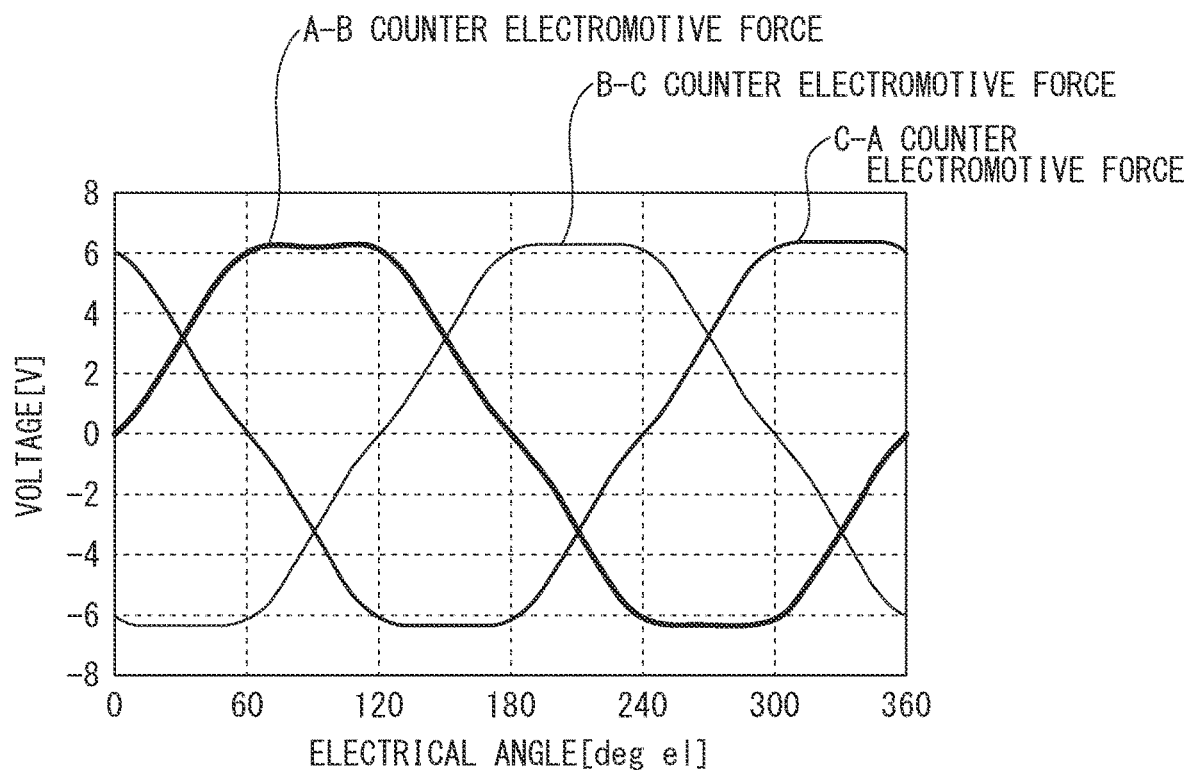
FIG. 8A is a diagram illustrating waveform examples of respective line counter electromotive forces when in positive rotation.
Figure 8B:
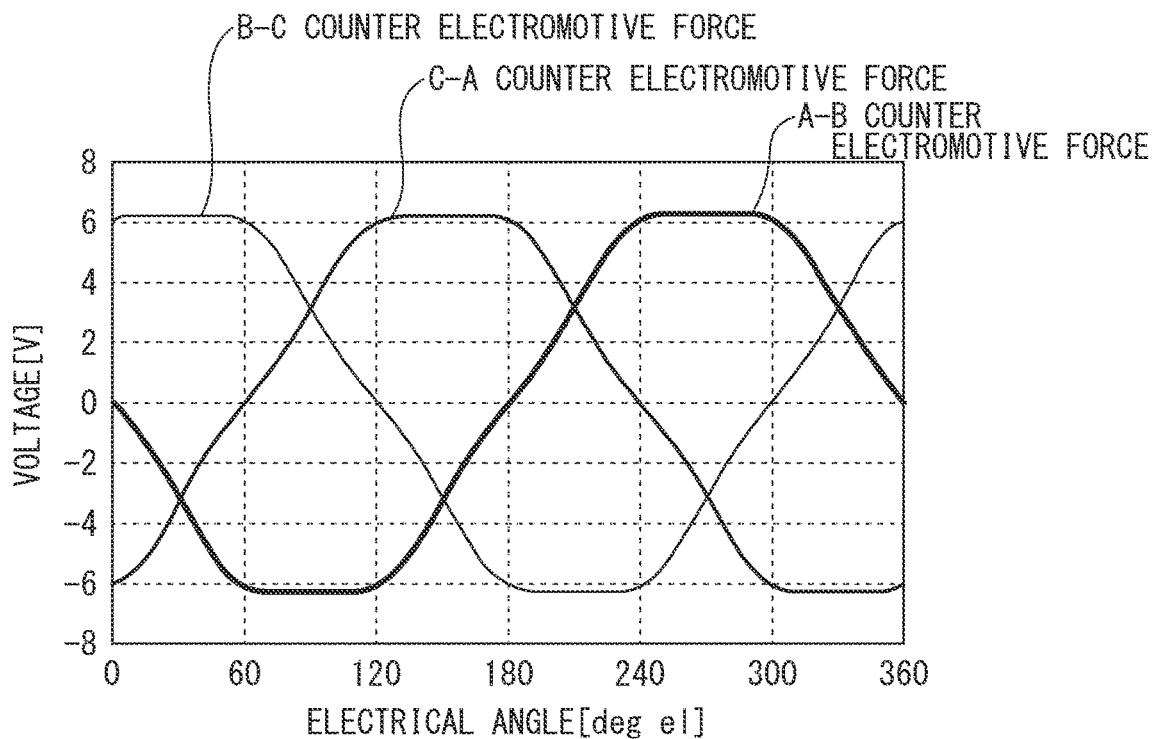
FIG. 8B illustrates waveform examples of the respective line counter electromotive forces when in reverse rotation.

As illustrated in FIGS. 8A, 8B, and FIG. 9, in a relationship between the respective line counter electromotive force values EMF and the motor electrical angle θm of the electric motor 22, a sign relationship among the respective line counter electromotive force values EMF differs between positive rotation and reverse rotation. For example, assume that the actual motor electrical angle θm is present within the absolute angle region Z of from 0 to 60 [deg_el], and the rotation direction is reversed (from positive rotation to reverse rotation). Then, as illustrated in FIG. 9, the plus-or-minus sign relationship among the respective line counter electromotive force values EMF of the electric motor 22 will change from "+, +" to "−, +, −", as indicated in order from top to bottom in the drawing. Accordingly, when the rotation direction of the electric motor 22 is determined, the angular region where the motor electrical angle θm is present (the absolute angle region Z) can be estimated from the sign relationship among the respective line counter electromotive force values EMF.

Additionally, at a time when the absolute angle region shifts to an adjacent region in the respective absolute angle regions divided by 60 [deg], the motor electrical angle θm to be estimated is positioned at a boundary angle between the regions. On the basis of the fact, in the first embodiment, when the absolute angle region has shifted to the adjacent region, the correction angle θe is calculated on the basis of the boundary angle between the absolute angle region before shifting and the absolute angle region after shifting.

However, if noise is mixed in the calculated values of the respective line counter electromotive force values EMF, the sign relationship among the respective line counter electromotive force values EMF is easily switched around a switching boundary line between the absolute angle regions. Due to that, there is a concern that hunting easily occurs upon region determination with respect to the adjacent region.

Thus, in the first embodiment, as illustrated in FIG. 9, an intermediate angle θc of each of the absolute angle regions is calculated, and when the intermediate angle θc has changed, a new post-shifting intermediate angle θc_sht, which is an angle after shifting from the intermediate angle θc, is calculated on the basis of an amount of the change and a direction of the shifting. The post-shifting intermediate angle θc_sht is configured not to shift when hunting occurs. In other words, by determining not only shifting of the absolute angle region Z but also the presence or absence of a change in the post-shifting intermediate angle θc_sht, the correction angle θe is more accurately calculated.

That is, the absolute angle region determination unit 53c of the first embodiment estimates the absolute angle region Z where the actual motor electrical angle θm is present, calculates the post-shifting intermediate angle θc_sht, and outputs the estimated absolute angle region Z and the calculated post-shifting intermediate angle θc_sht to the correction angle calculation unit 53d.

On the basis of the input absolute angle region Z, the correction angle calculation unit 53d determines whether or not the present absolute angle region Z has shifted to an adjacent region with respect to a previous absolute angle region Z(n−1). In addition, when it has been determined that the absolute angle region Z has shifted, the correction angle calculation unit 53d determines, on the basis of the input post-shifting intermediate angle θc_sht, whether or not the present post-shifting intermediate angle θc_sht has changed with respect to a previous post-shifting intermediate angle θc_sht(n−1). Furthermore, in the first embodiment, when it has been determined that the post-shifting intermediate angle θc_sht has changed, the correction angle calculation unit 53*d* determines, on the basis of a sign representing the direction of the change and a sign of the input output shaft angular velocity ωos, whether or not the direction (sign) of the change is the same as the direction (sign) of the input output shaft angular velocity ωs. Then, when it has been determined that the directions (signs) are the same, the correction angle calculation unit 53*d* sets a boundary angle between the previous absolute angle region Z(n−1) and the present absolute angle region Z to the correction angle θe.

The correction angle calculation unit 53*d* further sets correction timing information indicating timing for performing a correction using the correction angle θe and timing for performing no correction using the correction angle θe.

Specifically, when performing the correction, the correction angle calculation unit 53*d* outputs correction timing information indicating permission of the correction to the inter-sensor error correction unit 54 and the estimated angle calculation unit 55, respectively, and outputs the correction angle θe to the estimated angle calculation unit 55. On the other hand, when not performing the correction, the correction angle calculation unit 53*d* outputs correction timing information indicating non-permission of the correction to the inter-sensor error correction unit 54 and the estimated angle calculation unit 55, respectively.

(Absolute Angle Region Determination Processing)

Next, with reference to FIG. 10, a detailed description will be given of absolute angle region determination processing that is executed by the above-described absolute angle region determination unit 53*c*. Here, the absolute angle region determination processing is a subprogram that is called by a main program and executed, the main program being configured to calculate the second motor electrical angle θm2 and executed by the CPU (unillustrated) of the motor electrical angle detection circuit 24.

Figure 10:
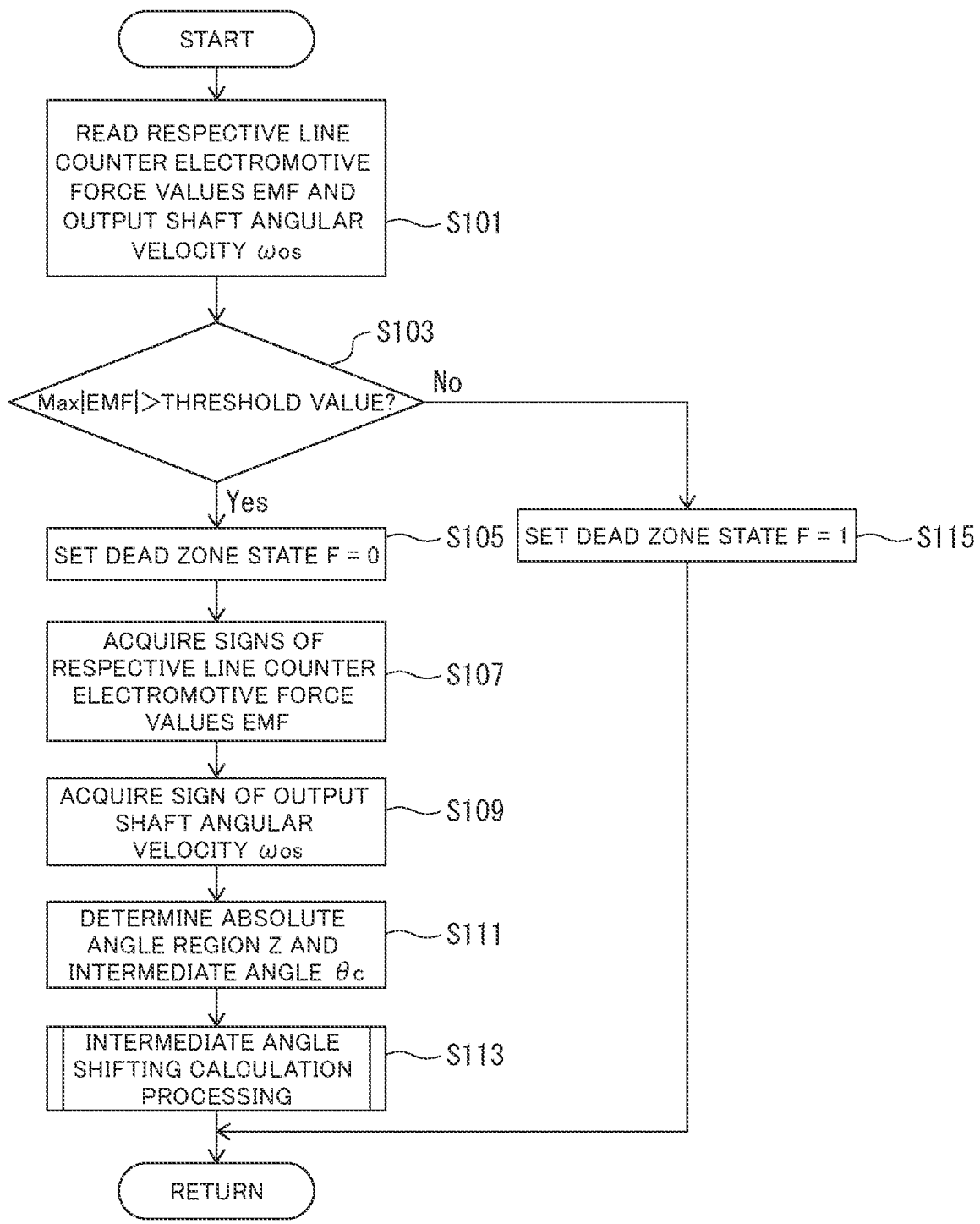
FIG. 10 is a flowchart illustrating one example of a processing procedure of absolute angle region determination processing.

Upon execution of the absolute angle region determination processing by the CPU of the motor electrical angle detection circuit 24, the processing first proceeds to step S101, as illustrated in FIG. 10.

At step S101, the absolute angle region determination unit 53*c* reads the respective line counter electromotive force values EMF calculated by the counter electromotive force calculation unit 53*b* and the output shaft angular velocity ωos calculated by the output shaft angular velocity calculation unit 53*a*, and the processing proceeds to step S103.

At step S103, the absolute angle region determination unit 53*c* compares a maximum value of absolute values of the read respective line counter electromotive force values EMF with a predetermined threshold value Thv. When rotation speed of the electric motor 22 is low, the absolute values of the respective line counter electromotive force values EMF are small. Due to that, the predetermined threshold value Thv is pre-set to treat acquired values considered to be low reliable in the sign relationship as a determination dead zone. Then, when the maximum value of the absolute values of the respective line counter electromotive force values EMF has been determined to be equal to or more than the predetermined threshold value Thv (Yes), the processing proceeds to step S105. On the other hand, when the maximum value of the absolute values of the respective line counter electromotive force values EMF has been determined to be less than the predetermined threshold value Thv (No), the processing proceeds to step S115.

When the processing has proceeded to step S105, the absolute angle region determination unit 53*c* sets a dead zone state value "F=0" that is a state value of the determination dead zone, and the processing proceeds to S107.

At step S107, the absolute angle region determination unit 53*c* acquires sign information of the read respective line counter electromotive force values EMF, and the processing proceeds to step S109.

At step S109, the absolute angle region determination unit 53*c* acquires sign information of the read output shaft angular velocity ωos, and the processing proceeds to step S111.

At step S111, the absolute angle region determination unit 53*c* refers to the table illustrated in FIG. 9, and determines the absolute angle region Z and the intermediate angle θc on the basis of the sign information of the respective line counter electromotive force values EMF acquired at step S107 and the sign information of the output shaft angular velocity ωos acquired at step S109. After that, the processing proceeds to step S113.

At step S113, on the basis of the intermediate angle θc determined at step S111, the absolute angle region determination unit 53*c* executes intermediate angle shifting calculation processing to calculate the post-shifting intermediate angle θc_sht. Then, the absolute angle region determination unit 53*c* outputs the calculated post-shifting intermediate angle θc_sht, the dead zone state value "F=0" set at step S105, and the absolute angle region Z determined at step S111 to the correction angle calculation unit 53*d*, ends the series of processing, and returns to the calling processing.

On the other hand, when the maximum value thereof has been determined to be less than the threshold value at step S103, and then the processing has proceeded to step S115, the absolute angle region determination unit 53*c* sets a dead zone state value "F=1". Then, the absolute angle region determination unit 53*c* outputs the set dead zone state value "F=1" to the correction angle calculation unit 53*d*, ends the series of processing, and returns to the calling processing.

In other words, when the respective line counter electromotive force values EMF are small, and thus the reliability of the acquired values of the sign relationship is considered to be low, the absolute angle region determination unit 53*c* outputs the dead zone state value "F=1" without executing the processing after that, and then returns to the calling processing.

(Intermediate Angle Shifting Calculation Processing)

Next, with reference to FIG. 11, a detailed description will be given of intermediate angle shifting calculation processing that is executed by step S113 described above.

Figure 11:
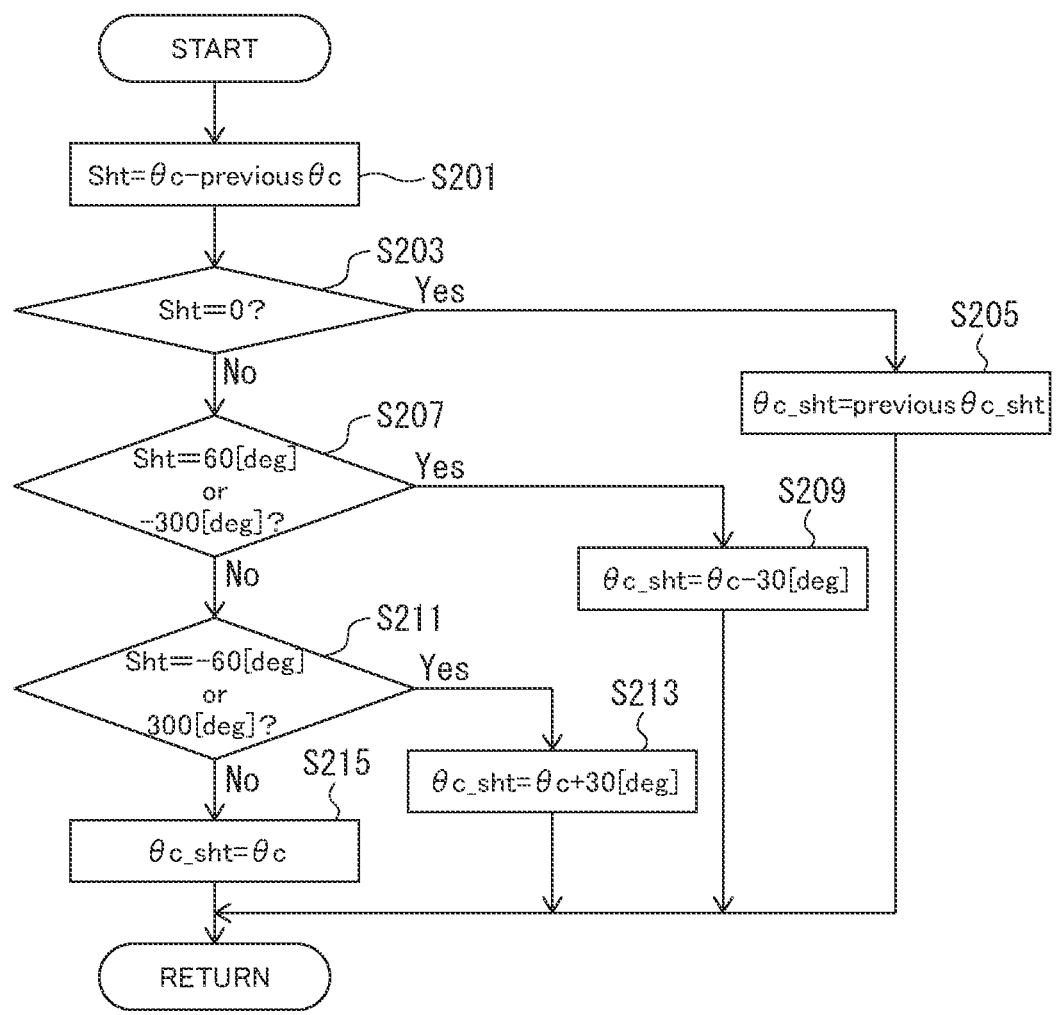
FIG. 11 is a flowchart illustrating one example of a processing procedure of intermediate angle shift calculation processing.

Upon execution of the intermediate angle shifting calculation processing at step S113 described above, the processing first proceeds to step S201, as illustrated in FIG. 11.

At step S201, the absolute angle region determination unit 53*c* calculates a difference value Sht (Sht=θc−θc (n−1)) between the present intermediate angle θc determined at step S111 described above and a previous intermediate angle θc (n−1), and the processing proceeds to step S203.

At step S203, the absolute angle region determination unit 53*c* determines whether the difference value Sht is "0" or not to determine whether or not the present intermediate angle θc is coincident with the previous intermediate angle θc (n−1). Then, when it has been determined that the difference value Sht is "0", and thus both are coincident (Yes), the processing proceeds to step S205. When it has been determined that the difference value Sht is not "0", and thus both are not coincident (No), the processing proceeds to step S207.

When the processing has proceeded to step S205, the absolute angle region determination unit 53*c* determines that there is no shifting of the intermediate angle θc, sets a previous post-shifting intermediate angle θc_sht(n−1) as the post-shifting intermediate angle θc_sht, ends the series of processing, and returns to the calling processing.

On the other hand, when the processing has proceeded to step S207, the absolute angle region determination unit 53*c* determines that there is shifting of the intermediate angle θc, and determines whether or not the difference value Sht is 60 [deg] or −300 [deg]. Then, when the difference value Sht has been determined to be 60 [deg] or −300 [deg] (Yes), the processing proceeds to step S209, whereas when not (No), the processing proceeds to step S211.

When the processing has proceeded to step S209, the absolute angle region determination unit 53*c* sets a value obtained by subtracting 30 [deg] from the intermediate angle θc as the post-shifting intermediate angle θc_sht, ends the series of processing, and returns to the calling processing.

On the other hand, when the processing has proceeded to step S211, the absolute angle region determination unit 53*c* determines whether or not the difference value Sht is −60 [deg] or 300 [deg]. Then, when the difference value Sht has been determined to be −60 [deg] or 300 [deg] (Yes), the processing proceeds to step S213, whereas when not (No), the processing proceeds to step S215.

When the processing has proceeded to step S213, the absolute angle region determination unit 53*c* sets a value obtained by adding 30 [deg] to the intermediate angle θc as the post-shifting intermediate angle θc_sht, ends the series of processing, and returns to the calling processing.

On the other hand when the processing has proceeded to step S215, the absolute angle region determination unit 53*c* sets the present intermediate angle θc as the post-shifting intermediate angle θc_sht, ends the series of processing, and returns to the calling processing.

(Correction Electrical Value Calculation Processing)

Next, with reference to FIG. 12, a detailed description will be given of a specific processing content of correction electrical angle calculation processing that is executed by the above-described correction angle calculation unit 53*d*. The correction electrical angle calculation processing is processing of a subprogram that is executed following the above-described absolute angle region determination processing in the above main program.

Figure 12:
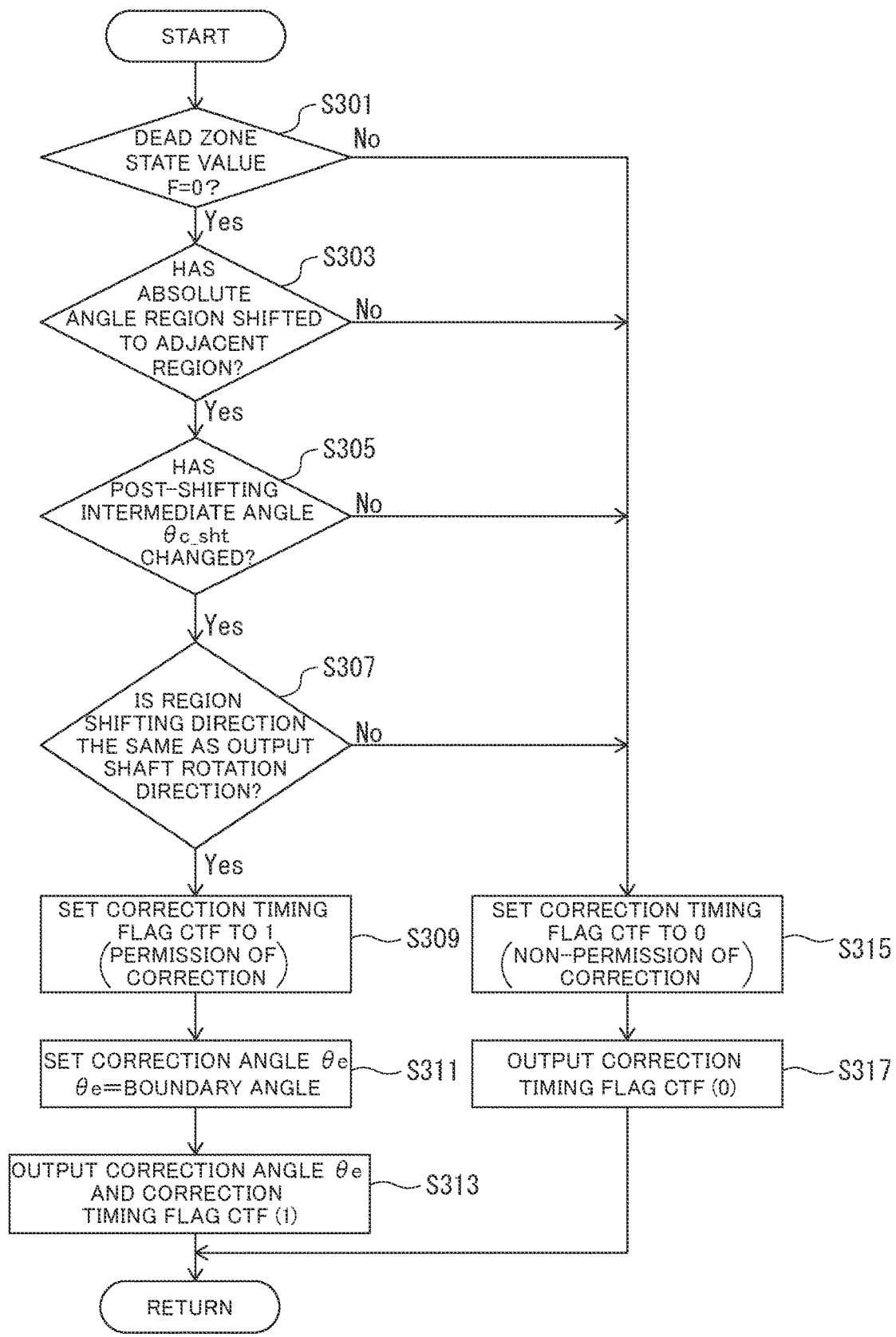
FIG. 12 is a flowchart illustrating one example of a processing procedure of corrected electrical angle calculation processing.

Upon execution of the correction electrical angle calculation processing by the CPU of the motor electrical angle detection circuit 24, the processing first proceeds to step S301, as illustrated in FIG. 12.

At step S301, the correction angle calculation unit 53*d* determines whether the input dead zone state value F is "F=0" or not. When it has been determined to be "F=0" (Yes), the processing proceeds to step S303, whereas when not (No), the processing proceeds to step S315.

When the processing has proceeded to step S303, the correction angle calculation unit 53*d* determines whether or not the absolute angle region Z has shifted to an adjacent region, on the basis of the input present absolute angle region Z and the previous absolute angle region Z (n−1) stored in memory such as RAM. Then, when it has been determined that the absolute angle region Z has shifted thereto (Yes), the processing proceeds to step S305, whereas when not (No), the processing proceeds to step S315.

When the processing has proceeded to step S305, the correction angle calculation unit 53*d* determines whether the post-shifting intermediate angle has changed or not, on the basis of the input present post-shifting intermediate angle θc_sht and the previous post-shifting intermediate angle θc_sht (n−1) stored in memory such as RAM. Then, when it has been determined that the post-shifting intermediate angle has changed (Yes), the processing proceeds to step S307, whereas when not (No), the processing proceeds to step S315.

When the processing has proceeded to step S307, the correction angle calculation unit 53*d* acquires sign information corresponding to a shifting direction of the absolute angle region and sign information of the input output shaft angular velocity ωos. Here, the sign information is "+" when rotation direction is a positive rotation direction based on a motor rotation direction, whereas the sign information is "−" when it is a reverse rotation direction. Furthermore, the correction angle calculation unit 53*d* determines whether both sines are coincident or not to determine whether or not the shifting direction of the absolute angle region is the same as the direction of output shaft rotation. Then, when it has been determined that the sines are coincident and the directions are the same (Yes), the processing proceeds to step S309, and when it has been determined that the sines are not coincident and the directions are not the same (No), the processing proceeds to step S315.

When the processing has proceeded to step S309, the correction angle calculation unit 53*d* sets a correction timing flag CTF to "1" indicating permission of correction, and the processing proceeds to step S311.

At step S311, the correction angle calculation unit 53*d* sets, as the correction angle θe, a boundary angle between the previous absolute angle region Z (n−1) and the present absolute angle region Z. After that, the processing proceeds to step S313.

At step S313, the correction angle calculation unit 53*d* outputs the correction angle θe to the estimated angle calculation unit 55, and also outputs the correction timing flag CTF with the value of "1" to the inter-sensor error correction unit 54 and the estimated angle calculation unit 55, respectively. After that, the correction angle calculation unit 53*d* ends the series of processing, and returns to the calling processing.

On the other hand, when the determination has been "No" at steps S301, S303, S305, and S307, and then the processing has proceeded to step S315, the correction angle calculation unit 53*d* sets the correction timing flag CTF to "0" indicating non-permission of correction, and the processing proceeds to step S317.

At step S317, the correction angle calculation unit 53*d* outputs the correction timing flag CTF with the value of "0" to the inter-sensor error correction unit 54 and the estimated angle calculation unit 55, respectively. After that, the correction angle calculation unit 53*d* ends the series of processing, and returns to the calling processing.

(Inter-Sensor Error Correction Unit 54)

Next, a description will be given of a specific structure of the inter-sensor error correction unit 54.

Figure 13:
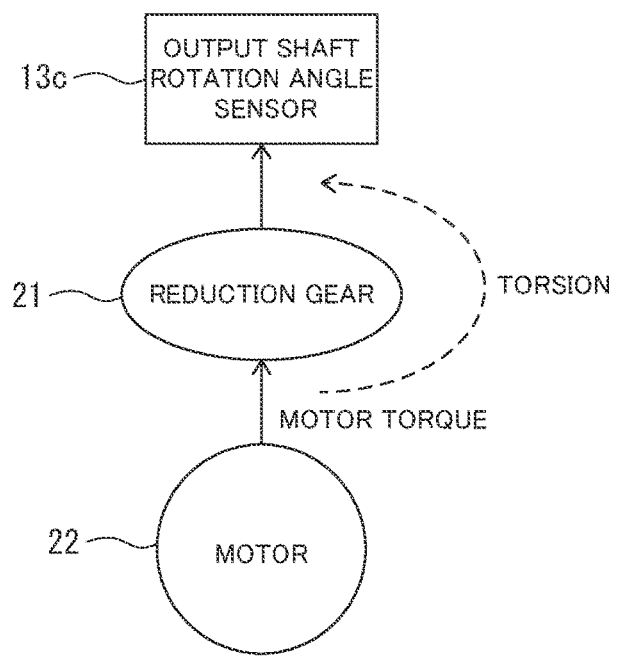
FIG. 13 is a schematic diagram for describing influence due to a reduction gear.

Here, as illustrated in FIG. 13, the electric power steering device 1 according to the first embodiment includes the reduction gear 21 interposed between the output shaft rotation angle sensor 13*c* and the electric motor 22. The reduction gear 21 usually has mechanical compliance characteristics such as backlash and elastic deformation.

Figure 14:
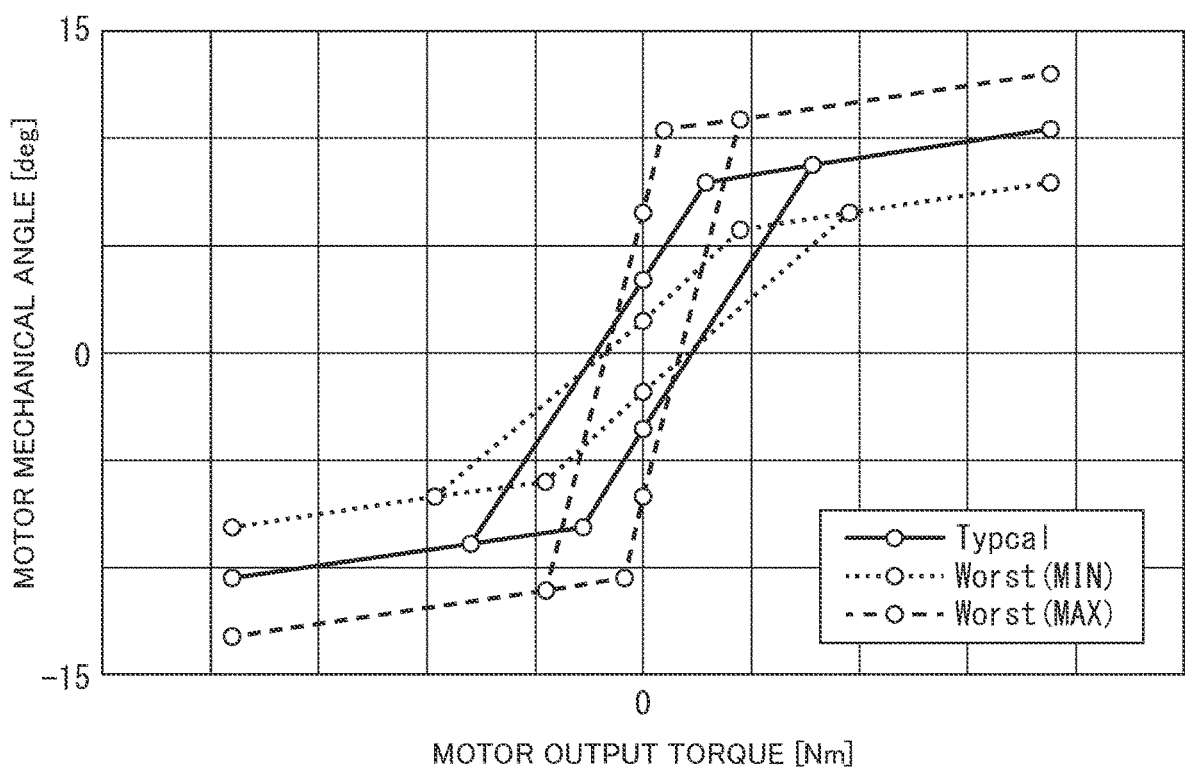
FIG. 14 is a diagram illustrating one example of mechanical compliance characteristics of the reduction gear.

In the mechanical compliance characteristics, for example, as illustrated in FIG. 14, torsion angle (motor mechanical angle) changes in response to motor output torque Tm. Additionally, the center part represents hysteresis characteristics, which are characteristics mainly due to backlash and the like of the reduction gear 21. The torsion characteristics change also depending on environmental conditions and manufacturing conditions, and have a large variation width between a minimum value indicated by a dotted line and a maximum value indicated by a broken line with respect to a median value indicated by a solid line. In the example of the present characteristics, occurrence of an angle estimation error up to around 30 [deg] is expected. Due to the influence, motor torque efficiency is reduced, and thus effective assist cannot be provided, as a result of which steering operation becomes heavy, which affects vehicle steering.

In addition, as illustrated in FIG. 13, the mechanical compliance characteristics of the reduction gear 21 are the torsion characteristics. Thus, error estimated from the output shaft rotation angle sensor 13c side is always error of a side delayed with respect to the direction of steering.

In the first embodiment, the inter-sensor error correction unit 54 is configured to perform processing for correcting error due to the mechanical compliance characteristics on the output shaft angular velocity ωos before being input to the estimated angle calculation unit 55.

The inter-sensor error correction unit 54 includes an advance gain calculation unit 61, a multiplication unit 62, a motor torque equivalent value calculation unit 63, a reduction gear error characteristic calculation unit 64, an advance correction limit value calculation unit 65, and an advance permission determination unit 66, as illustrated in FIG. 7.

The advance gain calculation unit 61 calculates an advance gain Gad for advance correcting the output shaft angular velocity ωos input by using an advance gain map, on the basis of the steering torque Th from the steering torque sensor 13. Then, the advance gain calculation unit 61 outputs the calculated advance gain Gad to the multiplication unit 62.

Figure 15:
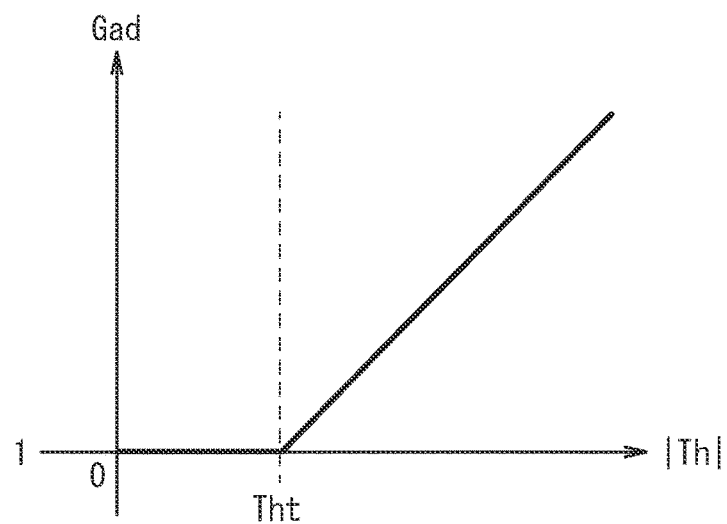
FIG. 15 is a diagram illustrating one example of an advance gain map according to the first embodiment.

Specifically, as illustrated in FIG. 15, in the advance gain map, there is a dead zone where when an absolute value |Th| of the steering torque Th is less than a predetermined torque value Tht, the advance gain Gad is "1". Then, the first embodiment is characterized in that when the absolute value |Th| is equal to or more than the predetermined torque value Tht, the advance gain Gad linearly increases to values larger than "1" with a pre-set slope as the absolute value |Th| becomes larger. The predetermined torque value Tht is set to a boundary value indicating whether or not, for example, an error due to the mechanical compliance characteristics appears as handling feeling of a driver. Specifically, for example, experiments or the like are conducted in advance to confirm an actual steering feel of the vehicle, whereby the absolute value |Th| of an allowable steering torque Th is set as a predetermined value. Note that the advance gain map is not limited to a map having the structure in which the advance gain Gad linearly changes with a constant slope, and may have another structure such as a structure in which the advance gain Gad linearly changes with a plurality of slopes in multiple steps or nonlinearly changes.

The multiplication unit 62 multiplies the input output shaft angular velocity ωos by the input advance gain Gad to perform advance correction of the output shaft angular velocity ωos, and outputs, to the advance permission determination unit 66, a post-advance steering angular velocity ωosc that is an output shaft angular velocity ωos after the advance correction.

Here, advance correction is a correction in which when the absolute value |Th| of the steering torque Th is equal to or more than the predetermined torque value Tht, the input output shaft angular velocity ωos is multiplied by an advance gain Gad larger than 1 to increase (largely in the direction of steering) the output shaft angular velocity ωos so that an advance amount in a direction cancelling an error increases. Note that since the advance gain Gad is "1" in the dead zone where the absolute value |Th| is less than the predetermined torque value Tht, the input output shaft angular velocity ωos will be output directly as the post-advantage steering angular velocity ωosc to the advance permission determination unit 66.

The motor torque equivalent value calculation unit 63 calculates a motor torque equivalent value Tm' equivalent to the motor output torque Tm. In the first embodiment, on the basis of the motor phase currents Ia to Ic, the motor torque equivalent value calculation unit 63 calculates a q-axis current Iq as the motor torque equivalent value Tm'. Then, the motor torque equivalent value calculation unit 63 outputs the calculated motor torque equivalent value Tm' (Iq) to the reduction gear error characteristic calculation unit 64.

Specifically, the motor torque equivalent value calculation unit 63 calculates the q-axis current Iq by using a known three-phase to two-phase conversion method. For example, a three-phase static coordinate system of the motor phase currents Ia to Ic is first converted to a two-phase α-β coordinate system (two-phase orthogonal static coordinate system), and next, the α-β coordinate system is converted to a d-q coordinate system (rotation coordinate system) to obtain the q-axis current Iq.

Note that a structure may be employed in which an actual motor output torque Tm is directly measured, and the measured motor output torque Tm is used instead of the motor torque equivalent value Tm' if it is mountable.

The reduction gear error characteristic calculation unit 64 calculates a reduction gear error characteristic Sg by using a reduction gear error characteristic map on the basis of the input motor torque equivalent value Tm'. Then, the reduction gear error characteristic calculation unit 64 outputs the calculated reduction gear error characteristic Sg to the advance correction limit value calculation unit 65.

Figure 16:
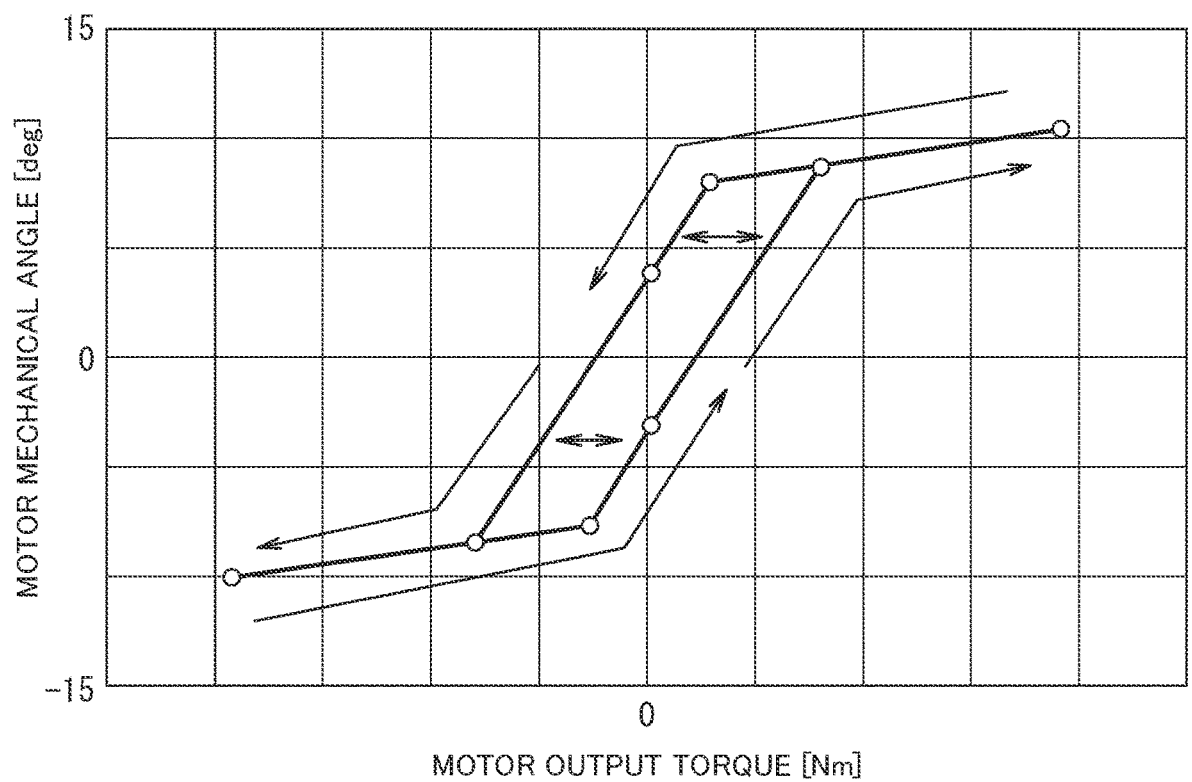
FIG. 16 is a diagram illustrating one example of a reduction gear error characteristic map.

Specifically, in the first embodiment, as the reduction gear error characteristic map, there is prepared a map using median values of a variation width, as illustrated in FIG. 16. However, a deviation width between the median values and maximum/minimum values causes an angle estimation error, reducing assist efficiency. Thus, the width needs to be reduced to an allowable reduction amount of assist efficiency, so that it is preferable to prepare a reduction gear error characteristic map subjected to the adjustment.

Additionally, in a motor output torque range at the center of the reduction gear error characteristic map, the hysteresis characteristics are used for the calculation. Specifically, as indicated by arrow lines in FIG. 16, map values on lower and right sides are used in a direction in which the motor output torque changes from a minus side to a plus side, whereas map values on upper and left sides are used in a direction in which the motor output torque changes from the plus side to the minus side.

The advance correction limit value calculation unit 65 calculates an advance correction limit value SgL that is a limit value of an advance correction amount from the timing of correction using the correction angle θe, on the basis of the correction timing flag CTF input from the counter electromotive force angle correction value calculation unit 53 and the reduction gear error characteristic Sg input from the reduction gear error characteristic calculation unit 64. Then, the advance correction limit value calculation unit 65 outputs the calculated advance correction limit value SgL to the advance permission determination unit 66.

Here, when angle correction is performed using the correction angle θe calculated on the basis of an electromotive force, the second motor electrical angle θm2 is corrected to the correction angle θe regardless of an error state due to the mechanical compliance characteristics at that time. In other words, there occurs a state where 0 [deg] in FIG. 16 is not always an initial position. Accordingly, in the first embodiment, with reference to an error state in timing where correction using the correction angle θe has been performed, the advance correction limit value SgL is obtained from a difference between an error due to the mechanical compliance characteristics in the reference timing and a present error.

Here, when the steering torque Th increases, error due to the mechanical compliance characteristics occurs. However, other than the occurrence of such error, the following two situations are considered to be those increasing the steering torque Th.

S1) Increased Steering Velocity
S2) Pressing Abutment Against a Rack End, Hitting a Curb with Tire, and the Like With regard to the above situation S1), due to the increased steering velocity, it is possible to perform an angle correction using the correction angle θe calculated by the counter electromotive force angle correction value calculation unit 53 on the basis of the line counter electromotive force values EMF, so that influence can be ignored. On the other hand, with regard to the situation S2), due to decreased steering velocity, the electric motor 22 also rotates at low speed, whereby the dead zone state value F becomes "1", so that the angle correction function using the correction angle θe cannot be executed. In this state, advance correction using the advance gain Gad causes excessive advance of the second motor electrical angle θm2, which may cause assist efficiency reduction and the loss of synchronization.

To avoid the problem, the first embodiment is configured such that the advance correction limit value calculation unit 65 calculates the advance correction limit value SgL, and the advance permission determination unit 66 treats the advance correction limit value SgL as an advance amount limit that allows advance using the advance gain Gad, whereby excessive advance is suppressed.

Specifically, the advance permission determination unit 66 performs control for not permitting an advance such that a total amount (hereinafter referred to as "advance correction amount Ct") of an amount of advance (an advance correction update amount Cr) using the advance gain Gad from the timing of correction using the correction angle θe exceeds the advance correction limit value SgL. Besides, the advance permission determination unit 66 performs control for not permitting advance in a direction away from the advance correction limit value SgL. In other words, the advance permission determination unit 66 performs control for permitting advance in a direction approaching the advance correction limit value SgL as long as the advance correction amount Ct does not exceed the advance correction limit value SgL. Accordingly, when permitting advance, the advance permission determination unit 66 outputs the post-advance steering angular velocity ωosc as a final steering angular velocity ωsc to the estimated angle calculation unit 55, whereas when not permitting advance, it outputs directly the output shaft angular velocity ωos as the final steering angular velocity ωsc to the estimated angle calculation unit 55.

(Advance Correction Limit Value Calculation Processing)

Figure 17:
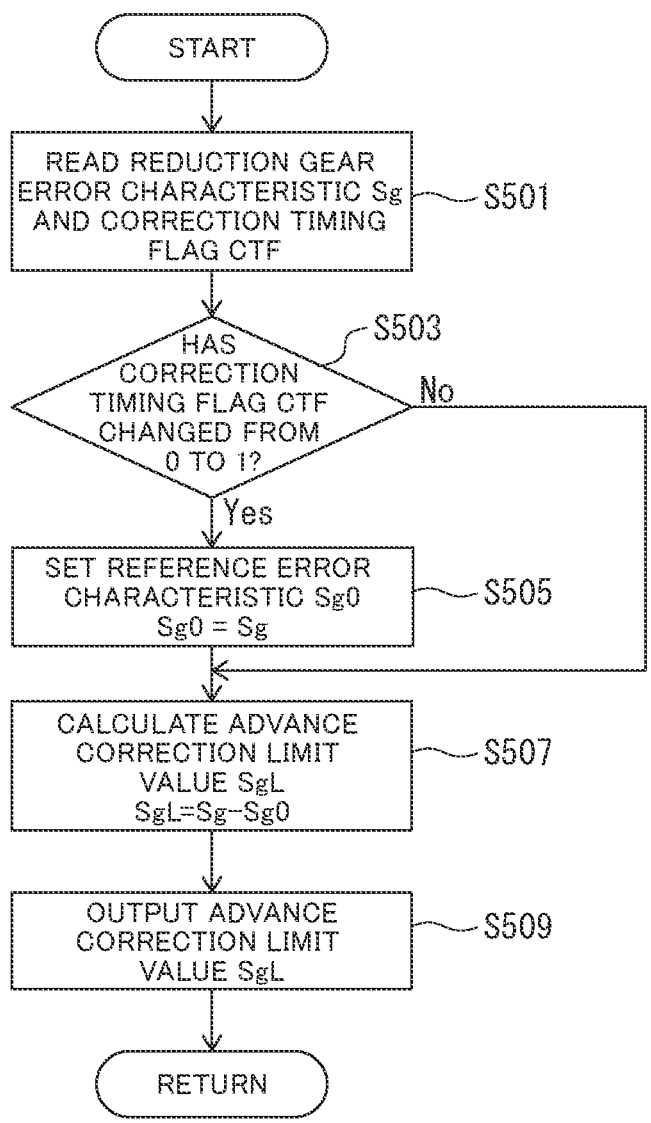
FIG. 17 is a flowchart illustrating one example of a processing procedure of advance correction limit value calculation processing according to the first embodiment.
Figure 18A:
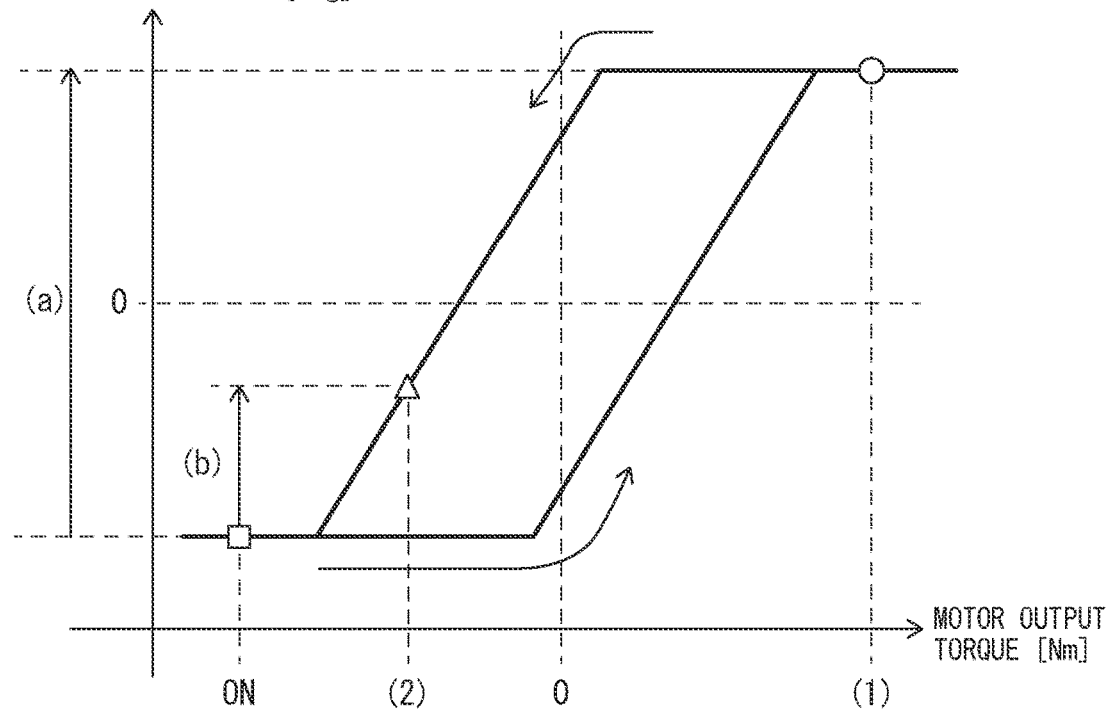
FIGS. 18A and 18B are diagrams for describing a method for calculating an advance correction limit value.
Figure 18B:
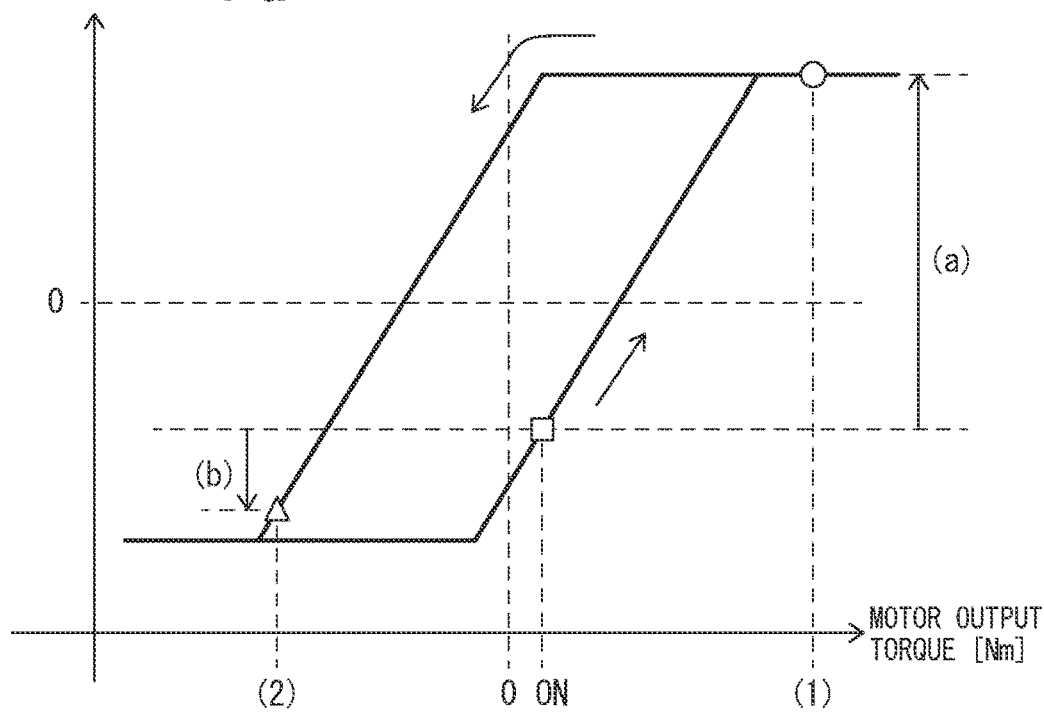

Next, with reference to FIG. 17, FIGS. 18A and 18B, a specific processing content of advance correction limit value calculation processing that is executed by the advance correction limit value calculation unit 65. The advance correction limit value calculation processing is processing of a subprogram that is called by the main program and executed.

Upon execution of the advance correction limit value calculation processing by the CPU of the motor electrical angle detection circuit 24, the processing first proceeds to step S501, as illustrated in FIG. 17.

At step S501, the advance correction limit value calculation unit 65 reads the reduction gear error characteristic Sg and the correction timing flag CTF, and the processing proceeds to step S503.

At step S503, the advance correction limit value calculation unit 65 determines whether or not the correction timing flag CTF has changed from "0" to "1". When the correction timing flag CTF has been determined to have changed from "0" to "1" (Yes), the processing proceeds to step S505, whereas when not (No), the processing proceeds to step S507.

Here, the first embodiment is configured such that a previous correction timing flag CTF (n−1) is stored and retained in memory such as RAM.

When the processing has proceeded to step S505, the advance correction limit value calculation unit 65 uses the timing of changing of the correction timing flag CTF from "0" to "1" as reference timing, and sets the reduction gear error characteristic Sg corresponding to the motor torque equivalent value Tm' at the reference timing as a reference error characteristic Sg0. After that, the processing proceeds to step S507.

Specifically, the advance correction limit value calculation unit 65 sets the reduction gear error characteristic Sg read at step S501 as the reference error characteristic Sg0, and stores and retains the reference error characteristic Sg0 in memory such as RAM.

At step S507, the advance correction limit value calculation unit 65 subtracts the reference error characteristic Sg0 stored in the memory from the reduction gear error characteristic Sg read at step S501 to calculate the advance correction limit value SgL. Then, the processing proceeds to step S509.

At step S509, the advance correction limit value calculation unit 65 outputs the advance correction limit value SgL calculated at step S507 to the advance permission determination unit 66, ends the series of processing, and returns to the calling processing.

Here, with reference to FIGS. 18A and 18B, a description will be given of a specific example regarding the processing of advance correction limit value calculation.

For example, as illustrated in FIG. 18A, assume that correction using the correction angle θe has been performed in timing of "ON" in FIG. 18A where torsion angle has a minus maximum value on a reduction gear error characteristic map. In this case, a value of the torsion angle corresponding to the timing of "ON" indicated by a square mark in FIG. 18A is set as the reference error characteristic Sg0. Then, assume that the motor output torque Tm has changed in a plus direction, and the torsion angle has passed through a hysteresis portion of lower and right sides on the reduction gear error characteristic map, and has changed to a value of (1) indicated by a white circle in FIG. 18A where the torsion angle has a plus maximum value. In this case, a value obtained by subtracting the value (the reference error characteristic Sg0) indicated by the square mark from the value indicated by the white circle in FIG. 18A is the advance correction limit value SgL at the time of (1). In other words, an angle amount equivalent to a length of an upward arrow line (a) in FIG. 18A is the advance correction limit value SgL. Note that the upward arrow line indicates a case where the advance correction limit value SgL has the plus sign.

Assume that next, the motor output toque Tm has decreased and has changed in a minus direction, and the torsion angle has passed through a hysteresis portion of upper and left sides on the reduction gear error characteristic map, and has changed to a value of (2) indicated by a triangle mark in FIG. 18A. In this case, a value obtained by subtracting the value (the reference error characteristic Sg0) indicated by the square mark from the value indicated by the triangle mark in FIG. 18A is the advance correction limit value SgL at the time of (2). In other words, an angle amount equivalent to a length of an upward arrow line (b) in FIG. 18A is the advance correction limit value SgL.

On the other hand, for example, as illustrated in FIG. 18B, assume that during the increase of the motor output torque Tm in the plus side, the torsion angle has had a value of the hysteresis portion on the right side of the reduction gear error characteristic map, and then, correction using the correction angle θe has been performed in timing of "ON" in FIG. 18B. In this case also, a value of the timing of "ON" indicated by a square mark in FIG. 18B is set as the reference error characteristic Sg0. Then, assume that the motor output torque Tm has increased in the plus direction, and the torsion angle has changed to a value of (1) indicated by a white circle in FIG. 18B. In this case, a value obtained by subtracting the value (the reference error characteristic Sg0) indicated by the square mark from the value indicated by the white circle in FIG. 18B is the advance correction limit value SgL at the time of (1). In other words, an angle amount equivalent to a length of an upward arrow line (a) in FIG. 18B is the advance correction limit value SgL.

Assume that next, the motor output toque Tm has had a plus maximum value and then has changed toward a minus direction side, and the torsion angle has passed through a hysteresis portion of upper and left sides on the reduction gear error characteristic map, and has changed to a value of (2) indicated by a triangle mark in FIG. 18B. In this case also, a value obtained by subtracting the value (the reference error characteristic Sg0) indicated by the square mark from the value indicated by the triangle mark in FIG. 18B is the advance correction limit value SgL at the time of (2). However, in the example illustrated in FIG. 18B, the value indicated by the triangle mark is larger than the value (the reference error characteristic Sg0) indicated by the square mark in the minus side, so that the subtraction result has the minus sign. In other words, an angle amount equivalent to a length of a downward arrow line (b) in FIG. 18B is the advance correction limit value SgL and has a minus value.

Note that the reduction gear error characteristic maps of FIGS. 18A and 18B are those simplified for description, and are different from the reduction gear error characteristic map of FIG. 16.

(Advance Permission Determination Unit 66)

Next, with reference to FIG. 19, a description will be given of a specific structure of the advance permission determination unit 66.

Figure 19:
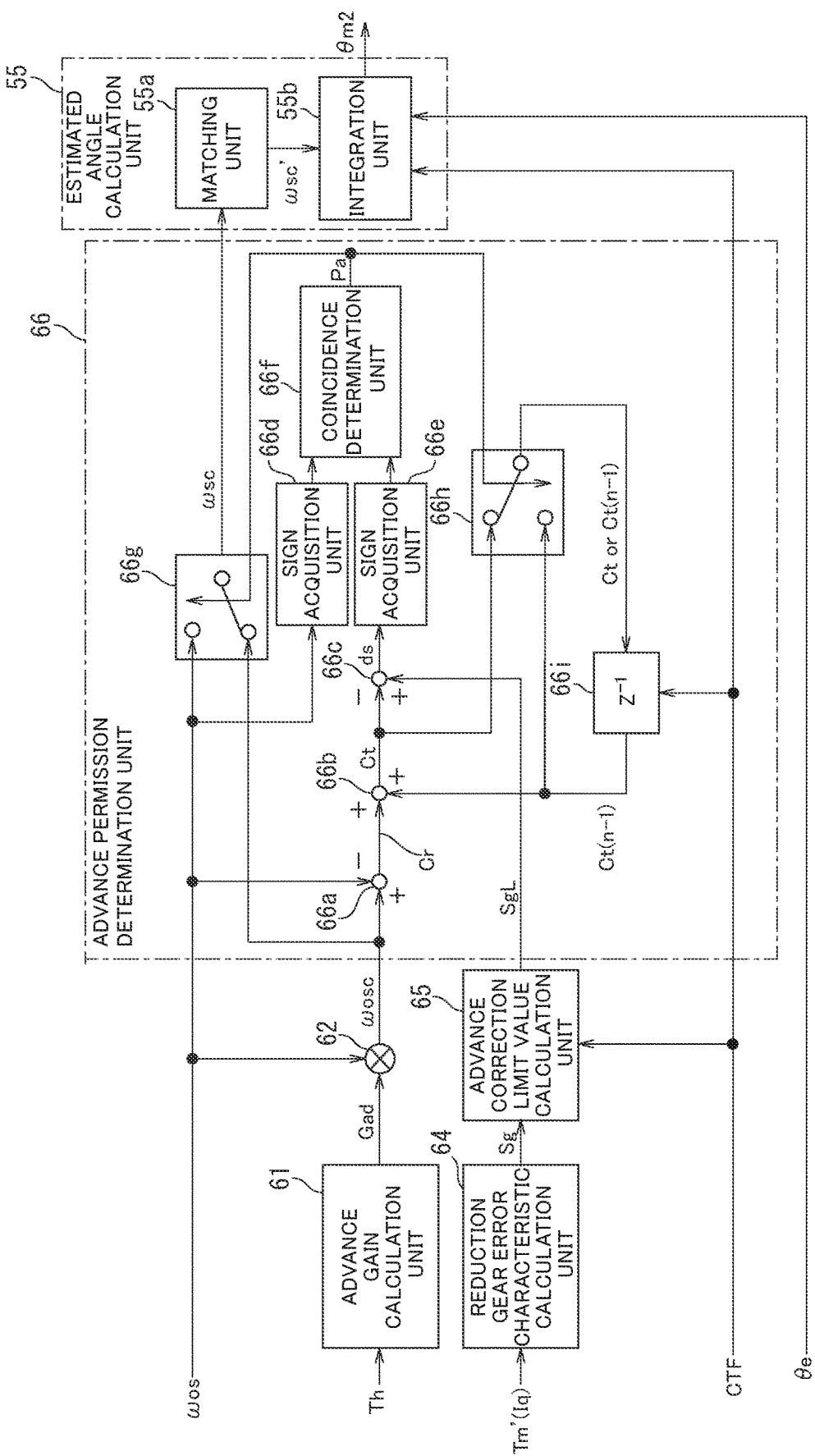
FIG. 19 is a block diagram illustrating a specific structure of an advance permission determination unit according to the first embodiment.

The advance permission determination unit 66 includes subtraction units 66a and 66c, an addition unit 66b, sign acquisition units 66d and 66e, a coincidence determination unit 66f, an angular velocity switching unit 66g, an advance correction amount past value switching unit 66h, and a signal delay unit 66i, as illustrated in FIG. 19.

The subtraction unit 66a subtracts the output shaft angular velocity ωos input from the output shaft angular velocity calculation unit 53a from the post-advance steering angular velocity ωosc input from the multiplication unit 62 to calculate the advance correction update amount Cr. Then, the subtraction unit 66a outputs the calculated advance correction update amount Cr to the addition unit 66b. In other words, the subtraction unit 66a calculates an increased amount of the output shaft angular velocity ωos in each steering direction by advance correction.

The addition unit 66b adds, to the advance correction update amount Cr input from the subtraction unit 66a, an advance correction amount past value Ct (n−1) that is a previous advance correction amount Ct input from the signal delay unit 66i to calculate the advance correction amount Ct. Then, the addition unit 66b outputs the calculated advance correction amount Ct to the subtraction unit 66c.

The subtraction unit 66c subtracts the advance correction amount Ct input from the addition unit 66b from the advance correction limit value SgL input from the advance correction limit value calculation unit 65 to calculate advance direction information ds. Then, the subtraction unit 66c outputs the calculated advance direction information ds to the sign acquisition unit 66e.

The sign acquisition unit 66d acquires a sign of the output shaft angular velocity ωos input from the output shaft angular velocity calculation unit 53a, and outputs the acquired sign information to the coincidence determination unit 66f. For example, the sign acquisition unit 66d outputs, "steering direction=1" in the case of the plus sign, "steering direction=−1" in the case of the minus sign, and "steering direction=0" in the case of "ωos=0" to the coincidence determination unit 66f.

The sign acquisition unit 66e acquires a sign of the advance direction information ds input from the subtraction unit 66c, and outputs the acquired sign information as an advance direction to the coincidence determination unit 66f. For example, the sign acquisition unit 66e outputs, "advance direction=1" in the case of the plus sign, "advance direction=−1" in the case of the minus sign, and "advance direction=0" in the case of "ds=0" to the coincidence determination unit 66f.

The coincidence determination unit 66f compares the steering direction input from the sign acquisition unit 66d with the advance direction input from the sign acquisition unit 66e to determine whether both are coincident or not. Then, the coincidence determination unit 66f outputs a determination result Pa to the angular velocity switching unit 66g and the advance correction amount past value switching unit 66h, respectively. For example, the coincidence determination unit 66f outputs "Pa=1" when both have been determined to be coincident, and outputs "Pa=0" when both have been determined not to be coincident.

On the basis of the determination result Pa input from the coincidence determination unit 66f, the angular velocity switching unit 66g switches an angular velocity that is to be output as the final steering angular velocity ωsc to the estimated angle calculation unit 55 to anyone of the output shaft angular velocity ωos input from the output shaft angular velocity calculation unit 53a or the post-advance steering angular velocity ωosc input from the multiplication unit 62.

Specifically, the angular velocity switching unit 66g outputs the post-advance steering angular velocity ωosc as the final steering angular velocity ωsc when the determination result Pa is "1" indicating coincidence, and outputs the output shaft angular velocity ωos as the final steering angular velocity ωsc when the determination result Pa is "0" indicating noncoincidence. In other words, when the steering direction is coincident with the advance direction, advance amount correction using the post-advance steering angular velocity ωosc is permitted, whereas when the directions are not coincident, advance amount correction is not permitted.

Specifically, when "the present advance correction amount Ct>advance correction limit value SgL", advance is permitted only when the advance direction is "−1". On the other hand, when "the present advance correction amount Ct<advance correction limit value SgL", advance is permitted only when the advance direction is "1".

On the basis of the determination result Pa input from the coincidence determination unit 66f, the advance correction amount past value switching unit 66h switches an advance correction amount to be output to the signal delay unit 66i to any one of the advance correction amount Ct input from the addition unit 66b or the advance correction amount past value Ct (n−1) input from the signal delay unit 66i.

Specifically, the advance correction amount past value switching unit 66h outputs the advance correction amount Ct when the determination result Pa is "1" indicating coincidence, and outputs the advance correction amount past value Ct(n−1) when the determination result Pa is "0" indicating noncoincidence. In other words, when performing advance correction, the advance correction amount past value Ct(n−1) retained in the signal delay unit 66i is updated to a present advance correction amount Ct, whereas when not performing advance correction, the previous value (Ct(n−1)) is retained as it is.

The signal delay unit 66i outputs the value input from the advance correction amount past value switching unit 66h by delaying the value for one control period. In other words, the signal delay unit 66i outputs the advance correction amount past value Ct(n−1) that is an advance correction amount delayed for one control period to the addition unit 66b and the advance correction amount past value switching unit 66h.

In addition, the signal delay unit 66i performs processing for resetting the retained advance correction amount past value Ct(n−1) to "0" in timing of input of "CTF=1" on the basis of the correction timing flag CTF input from the correction angle calculation unit 53d. In other words, the signal delay unit 66i resets the advance correction amount Ct to "0" by resetting the advance correction amount past value Ct(n−1) to "0".

Here, in the first embodiment, the addition unit 66b adds the advance correction amount past value Ct(n−1) to the advance correction update amount Cr to calculate the advance correction amount Ct. This means that the advance correction amount Ct is calculated by integration of the advance correction update amount Cr.

Figure 20:
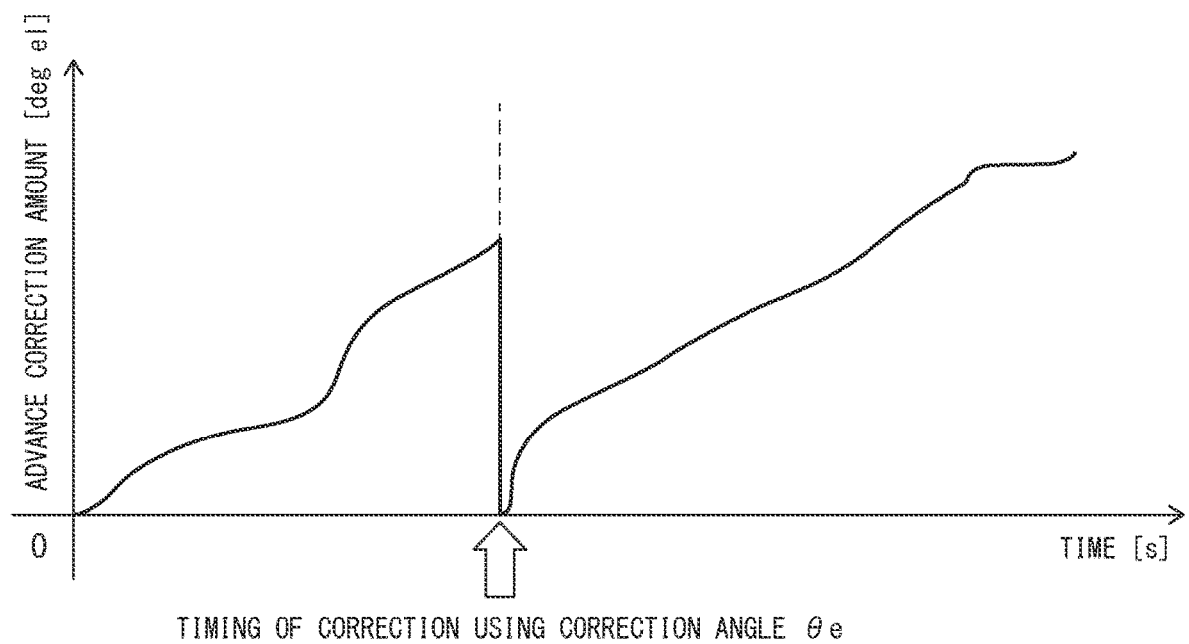
FIG. 20 is a diagram for describing a method for calculating an advance correction amount.

Additionally, in timing (CTF=0→1) where correction using the correction angle θe has been performed, the reference error characteristic Sg0 is updated, as well as the advance correction limit value SgL is reset to "0". As a result, the reference position is updated, so that the advance correction amount Ct needs to be reset to "0" in accordance with the update. Specifically, in the first embodiment, as illustrated in FIG. 20, the advance correction amount Ct is reset to "0" in timing of the correction using the correction angle θe, and the advance correction update amount Cr from that time up to the present is integrated to calculate the advance correction amount Ct up to the present.

(Advance Permission Determination Processing)

Next, with reference to FIG. 21, a description will be given of a specific processing content of advance permission determination processing that is executed by the advance permission determination unit 66. The advance permission determination processing is processing of a subprogram that is called by the main program and executed.

Figure 21:
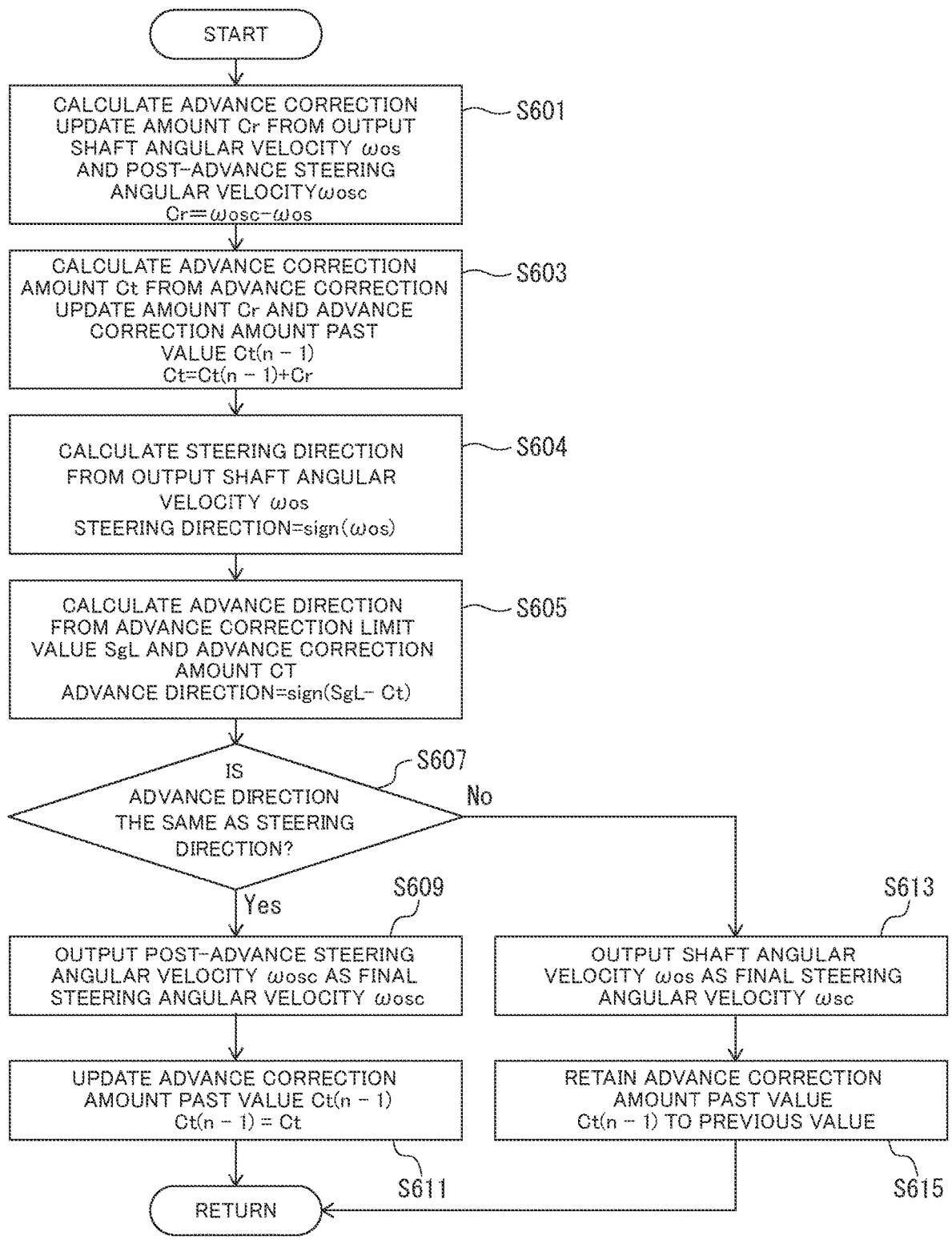
FIG. 21 is a flowchart illustrating one example of a processing procedure of advance permission determination processing.

Upon execution of the advance permission determination processing by the CPU of the motor electrical angle detection circuit 24, the processing first proceeds to step S601, as illustrated in FIG. 21.

At step S601, the subtraction unit 66a subtracts the input output shaft angular velocity ωos from the input post-advance steering angular velocity ωosc to calculate the advance correction update amount Cr. Then, the subtraction unit 66a outputs the calculated advance correction update amount Cr to the addition unit 66b, and the processing proceeds to step S603.

At step S603, the addition unit 66b adds the input advance correction amount past value Ct(n−1) to the input advance correction update amount Cr to calculate the advance correction amount Ct. Then, the addition unit 66b outputs the calculated advance correction amount Ct to the subtraction unit 66c and the advance correction amount past value switching unit 66h, respectively. After that, the processing proceeds to step S604.

At step S604, the sign acquisition unit 66d calculates the steering direction from the input output shaft angular velocity ωos, and outputs the calculated steering direction to the coincidence determination unit 66f. Then, the processing proceeds to step S605.

Specifically, the sign acquisition unit 66d uses, for example, a sign function "sign" to calculate the steering direction from "steering direction=sign (ωos)".

At step S605, the subtraction unit 66c subtracts the input advance correction amount Ct from the input advance correction limit value SgL to calculate the advance direction information ds, and outputs the calculated advance direction information ds to the sign acquisition unit 66e. Next, the sign acquisition unit 66e calculates the advance direction from the advance direction information ds, and outputs the calculated advance direction to the coincidence determination unit 66f. Then, the processing proceeds to step S607.

Specifically, the sign acquisition unit 66e uses, for example, a sign function "sign" to calculate the advance direction from "advance direction=sign (ds=SgL−Ct)".

At step S607, the coincidence determination unit 66f determines whether or not the advance direction is coincident with the steering direction, on the basis of the input steering direction and the input advance direction. Then, when both directions have been determined to be coincident (Yes), the coincidence determination unit 66f outputs the determination result "Pa=1" indicating permission of advance to the angular velocity switching unit 66g and the advance correction amount past value switching unit 66h, respectively. Then, the processing proceeds to step S609. On the other hand, when the directions have been determined not to be coincident (No), the coincidence determination unit 66f outputs the determination result "Pa=0" indicating non-permission of advance to the angular velocity switching unit 66g and the advance correction amount past value switching unit 66h, respectively. Then, the processing proceeds to step S613.

When the processing has proceeded to step S609, the angular velocity switching unit 66g outputs, on the basis of the input determination result "Pa=1", the post-advance steering angular velocity ωosc as the final steering angular velocity ωsc to the estimated angle calculation unit 55. Then, the processing proceeds to step S611.

At step S611, on the basis of the input determination result "Pa=1", the advance correction amount past value switching unit 66*h* updates the retained value (Ct (n−1)) of the signal delay unit 66*i* to the advance correction amount Ct calculated at step S603, ends the series of processing, and returns to the calling processing.

On the other hand, when both directions have been determined not to be coincident at step S607, and the processing has proceeded to step S613, the angular velocity switching unit 66*g* outputs, on the basis of input determination result "Pa=0", the output shaft angular velocity ωos as the steering angular velocity to the estimated angle calculation unit 55. Then, the processing proceeds to step S615.

At step S615, on the basis of input determination result "Pa=0", the advance correction amount past value switching unit 66*h* retains the retained value (Ct(n−1)) of the signal delay unit 66*i* as it is, without updating. Then, the advance correction amount past value switching unit 66*h* ends the series of processing, and returns to the calling processing.
(Estimated Angle Calculation Unit 55)

Next, with reference to FIG. 19, a description will be given of a specific structure of the estimated angle calculation unit 55.

As illustrated in FIG. 19, the estimate angle calculation unit 55 includes a matching unit 55*a* and an integration unit 55*b*.

Since the reduction gear 21 is interposed between the output shaft rotation angle sensor 13*c* and the electric motor 22, the matching unit 55*a* performs calculation for matching the final steering angular velocity ωsc to that after the interposition. Specifically, the matching unit 55*a* multiplies the final steering angular velocity ωsc input from the advance permission determination unit 66 by a reduction ratio RGr and a number of pole pairs P. Then, the matching unit 55*a* outputs a post-multiplication final steering angular velocity ωsc' to the integration unit 55*b*.

The integration unit 55*b* integrates the input final steering angular velocity ωsc', and outputs a value of the integration as the second motor electrical angle θm2 to the electrical angle selection unit 24C.

Additionally, on the basis of the correction timing flag CTF input from the correction angle calculation unit 53*d* and the correction angle θe, the integration unit 55*b* performs processing of changing the value of the integration to the input correction angle θe when the input correction timing flag CTF is "1". In other words, the integration unit 55*b* performs processing of correcting the second motor electrical angle θm2 to the correction angle θe.
(Operation)

Next, operations of the first embodiment will be described with reference to FIG. 22.

When in an operation stopped state where the IGN switch 28 is in an OFF state and the vehicle 2 is not running, as well as steering assist control processing also is not running, the control calculation device 31 and the motor electrical angle detection circuit 24 of the motor control device 25 are in non-operating states.

Due to that, various kinds of processing to be executed by the control calculation device 31 and the motor electrical angle detection circuit 24 are not running. In this state, the electric motor 22 is in a non-operating state, so that no steering assist force is being output to a steering mechanism.

When the IGN switch 28 is turned ON from the operation stopped state, the control calculation device 31 and the motor electrical angle detection circuit 24 are brought into operating states, thereby starting the various kinds of processing such as detection processing of the motor electrical angle θm and the steering assist control processing. In this case, the resolver 23 is assumed to be normal.

At that time, the abnormality detection signal SAr has a value indicating that there is no abnormality, and the electrical angle selection unit 24C outputs, as the motor electrical angle θm, the first motor electrical angle θm1 calculated by the main electrical angle detection circuit 24A to the control calculation device 31.

The control calculation device 31 calculates a d-axis current command value Id* and a q-axis current command value Iq* on the basis of the motor electrical angle θm. Then, on the basis of the d-axis current command value Id* and the q-axis current command value Iq*, the control calculation device 31 calculates three-phase motor voltage command values Va*, Vb*, and Vc* for the motor drive circuit 32, and outputs the calculated three-motor voltage command values Va*, Vb*, and Vc* to the motor drive circuit 32. As a result, the motor drive circuit 32 drive controls the inverter circuit 42, whereby the electric motor 22 is drive controlled (commutated controlled).

On the other hand, when the resolver 23 becomes abnormal, the backup electrical angle detection circuit 24B performs calculation processing of the second motor electrical angle θm2. Here, initial values of the intermediate angle θc and the post-shifting intermediate angle θc_sht are set to values close to normal values before the resolver 23 becomes abnormal. Other signals are initialized with an initial value "0".

Specifically, the counter electromotive force angle correction value calculation unit 53 of the backup electrical angle detection circuit 24B first calculates the output shaft angular velocity ωos by differentiating the output shaft rotation angle θos, and calculates the respective line counter electromotive force values EMF on the basis of the motor phase voltages Va to Vc and the motor phase currents Ia to Ic. Next, the counter electromotive force angle correction value calculation unit 53 compares the absolute values of the respective line counter electromotive force values EMF with the predetermined threshold value Thv. When the absolute values thereof have been determined to be equal to or more than the predetermined threshold value Thv, a determination is made that it is not the dead zone state (F=0) (Yes at step S103, and step S105). On the other hand, when the absolute values thereof have been determined to be less than the predetermined threshold value Thv, a determination is made that it is the dead zone state (F=1) (No at step S103, and step S115).

When it has been determined not to be the dead zone state, next, signs of the respective line counter electromotive force values EMF are acquired (step S107), and a sign of the output shaft angular velocity ωos is acquired (step S109). Then, on the basis of the acquired sign information and the map information illustrated in FIG. 9, the absolute angle region Z and the intermediate angle θc are determined (step S111). Here, since the motor rotation direction (positive direction or reverse direction) is obtained from the sign of the output shaft angular velocity ωos, the absolute angle region Z and the intermediate angle θc can be uniquely determined from the motor rotation direction and the sign relationship among the respective line counter electromotive force values EMF. For example, when the motor rotation direction is the positive direction and the sign relationship between the respective line counter electromotive force values EMF represent (+, −, −), the absolute angle region Z is "60 to 120 [deg_el]", and the intermediate angle θc is "90 [deg]".

Next, on the basis of the determined present intermediate angle θc, the previous intermediate angle θc(n−1), and the previous post-shifting intermediate angle θc_sht(n−1), the post-shifting intermediate angle θc_sht is calculated (step S113).

For example, when the previous θc(n−1) is 30 [deg] and the present θc is 90 [deg], the difference value Sht (=θc−θc(n−1)) is 60 [deg] (step S201, and No at step S203). Therefore, the present post-shifting intermediate angle θc_sht is 60 [deg] from "θc_sht=θc−30 [deg] (step S209)".

Next, since the dead zone state value is "F=0" (Yes at step S301), the counter electromotive force angle correction value calculation unit 53 determines whether or not the present absolute angle region Z is one that has shifted to an adjacent region with respect to the previous absolute angle region Z (n−1) (step S303).

Here, assume that the previous absolute angle region Z (n−1) is "0 to 60 [deg_el]", and the present absolute angle region Z is "60 to 120 [deg_el]". This case indicates that it is the one that has shifted to the adjacent region (Yes at step S303). Thus, it is next determined whether or not the post-shifting intermediate angle θc_sht has changed (step S305).

Additionally, assume that the post-shifting intermediate angle θc_sht is 0 [deg]. As described above, since the present post-shifting intermediate angle θc_sht is 60 [deg] when shifting from 0 to 60 [deg_el] to 60 to 120 [deg_el], a determination is made that the post-shifting intermediate angle θc_sht has changed (Yes at step S305).

Next, on the basis of the sign of the output shaft angular velocity ωos and the sign of region shifting direction (in which the positive direction is defined as "+"), it is determined whether or not the shifting direction is the same as the output shaft rotation direction (step S307). Here, assume that the sign of the output shaft angular velocity ωos is "+", and therefore the directions have been determined to be the same (Yes at step S307). As a result, the shifting to the adjacent region is determined.

Next, a boundary angle between the previous and present absolute angle regions is set as the correction angle θe (step S309), and then, the correction timing flag CTF is set to "1" (step S311). Here, the correction angle θe is set to 60 [deg] that is the boundary angle between the absolute angle regions 0 to 60 [deg_el] and 60 to 120 [deg_el]. After that, the correction timing flag CTF with the value of "1" (hereinafter referred to as "correction timing flag CTF (1)" is output to the inter-sensor error correction unit 54 and the estimated angle calculation unit 55, respectively, and the correction angle θe is output to the estimated angle calculation unit 55 (step S313).

On the other hand, in the inter-sensor error correction unit 54 of the backup electrical angle detection circuit 24B, the advance gain calculation unit 61 calculates the advance gain Gad from the input steering torque Th by using map information of FIG. 15. Then, the calculated advance gain Gad is output to the multiplication unit 62. In the first embodiment, when the steering torque Th is equal to or more than the predetermined torque value Tht, a value larger than "1" is output as the advance gain Gad, whereas when it is less than the predetermined torque value Tht, "1" is output as the advance gain Gad (see FIG. 15).

The multiplication unit 62 multiplies the input output shaft angular velocity ωos by the input advance gain Gad to calculate the post-advance steering angular velocity ωosc. Then, the multiplication unit 62 outputs the calculated post-advance steering angular velocity ωosc to the advance permission determination unit 66.

In addition, the motor torque equivalent value calculation unit 63 of the inter-sensor error correction unit 54 calculates the q-axis current Iq as the motor torque equivalent value Tm' on the basis of the motor phase currents Ia to Ic. Then, the calculated motor torque equivalent value Tm' is output to the reduction gear error characteristic calculation unit 64.

The reduction gear error characteristic calculation unit 64 calculates, as the reduction gear error characteristic Sg, an angle error (torsion angle) corresponding to the input motor torque equivalent value Tm' by using map information illustrated in FIG. 16, and outputs the calculated reduction gear error characteristic Sg to the advance correction limit value calculation unit 65.

The advance correction limit value calculation unit 65 calculates the advance correction limit value SgL on the basis of the input reduction gear error characteristic Sg and the correction timing flag CTF.

Specifically, every time the correction timing flag CTF becomes "1" from "0", the input reduction gear error characteristic Sg is set to the reference error characteristic Sg0 in that timing (step S501, Yes at step S503, and step S505). In other word, every time the correction timing flag CTF changes from "0" to "1", the set reference error characteristic Sg0 is updated to the input reduction gear error characteristic Sg.

Then, in timing of each calculation of the advance correction limit value SgL thereafter, a subtraction result obtained by subtracting the set reference error characteristic Sg0 from the input reduction gear error characteristic Sg in timing of each calculation is calculated as the advance correction limit value SgL (step S507). Then, the calculated advance correction limit value SgL is output to the advance permission determination unit 66 (step S509).

Additionally, in the advance permission determination unit 66, the subtraction unit 66a subtracts the input output shaft angular velocity ωos from the input post-advance steering angular velocity ωosc to calculate the advance correction update amount Cr. Then, the calculated advance correction update amount Cr is output to the addition unit 66b (step S601). Next, the addition unit 66b adds the advance correction amount past value Ct(n−1) to the advance correction update amount Cr to calculate the advance correction amount Ct. Then, the calculated advance correction amount Ct is output to the subtraction unit 66c (step S603).

Next, using a sign function, the sign acquisition unit 66e calculates sign information (sign (ωos)) of the output shaft angular velocity ωos. Then, the calculated sign information is output as steering direction to the coincidence determination unit 66f (step S604).

Subsequently, the subtraction unit 66c subtracts the advance correction amount Ct from the advance correction limit value SgL to calculate the advance direction information ds. Then, the calculated advance direction information ds is output to the sign acquisition unit 66d. Next, by using a sign function, the sign acquisition unit 66d calculates sign information (sign(ds)) of the advance direction information ds. Then, the calculated sign information is output as advance direction to the coincidence determination unit 66f (step S605).

Subsequently, the coincidence determination unit 66f determines whether or not the input advance direction is the same as the input steering direction (step S607). Then, when both directions have been determined to be the same, the coincidence determination unit 66f outputs the determination result "Pa=1" to the angular velocity switching unit 66g and the advance correction amount past value switching unit 66*h*, respectively (Yes at step S607). On the other hand, when they have been determined not to be the same direction, the coincidence determination unit 66*f* outputs the determination result "Pa=0" to the angular velocity switching unit 66*g* and the advance correction amount past value switching unit 66*h*, respectively (No at step S607).

Next, when "Pa=1", the angular velocity switching unit 66*g* outputs, as the final steering angular velocity ωsc, the post-advance steering angular velocity ωosc to the estimated angle calculation unit 55 (step S609), and when "Pa=0", outputs, as the final steering angular velocity ωsc, the output shaft angular velocity ωos to the estimated angle calculation unit 55 (step S613).

Upon input of the final steering angular velocity ωsc, in the estimated angle calculation unit 55, the matching unit 55*a* multiplies the input final steering angular velocity ωsc by the reduction ratio RGr and the number of pole pairs P, and outputs the multiplication result ωsc' to the integration unit 55*b*. The integration unit 55*b* integrates the input multiplication result ωsc'. On the other hand, when the correction timing flag CTF input from the counter electromotive force angle correction value calculation unit 53 has changed from "0" to "1", the integration unit 55*b* changes a value of the integration at that time to the correction angle θe input from the counter electromotive force angle correction value calculation unit 53.

Specifically, the estimated angle calculation unit 55 integrates the post-advance steering angular velocity ωosc when the advance direction is coincident with the steering direction, and integrates the output shaft angular velocity ωos when the advance direction is not coincident with the steering direction.

On the other hand, when "Pa=1", the advance correction amount past value switching unit 66*h* outputs the advance correction amount Ct to the signal delay unit 66*i*, and the signal delay unit 66*i* updates the retained advance correction amount past value Ct (n−1) to the advance correction amount Ct (step S611). On the other hand, when "Pa=0", the advance correction amount past value switching unit 66*h* outputs the advance correction amount past value Ct (n−1) to the signal delay unit 66*i*. In other words, the signal delay unit 66*i* retains the retained advance correction amount past value Ct (n−1) as it is (step S615).

Additionally, when the correction timing flag CTF input from the counter electromotive force angle correction value calculation unit 53 has changed from "0" to "1", the signal delay unit 66*i* resets the retained value at that time to "0".

Next, operation of the advance permission determination unit 66 will be described by using a specific example.

Figure 22:
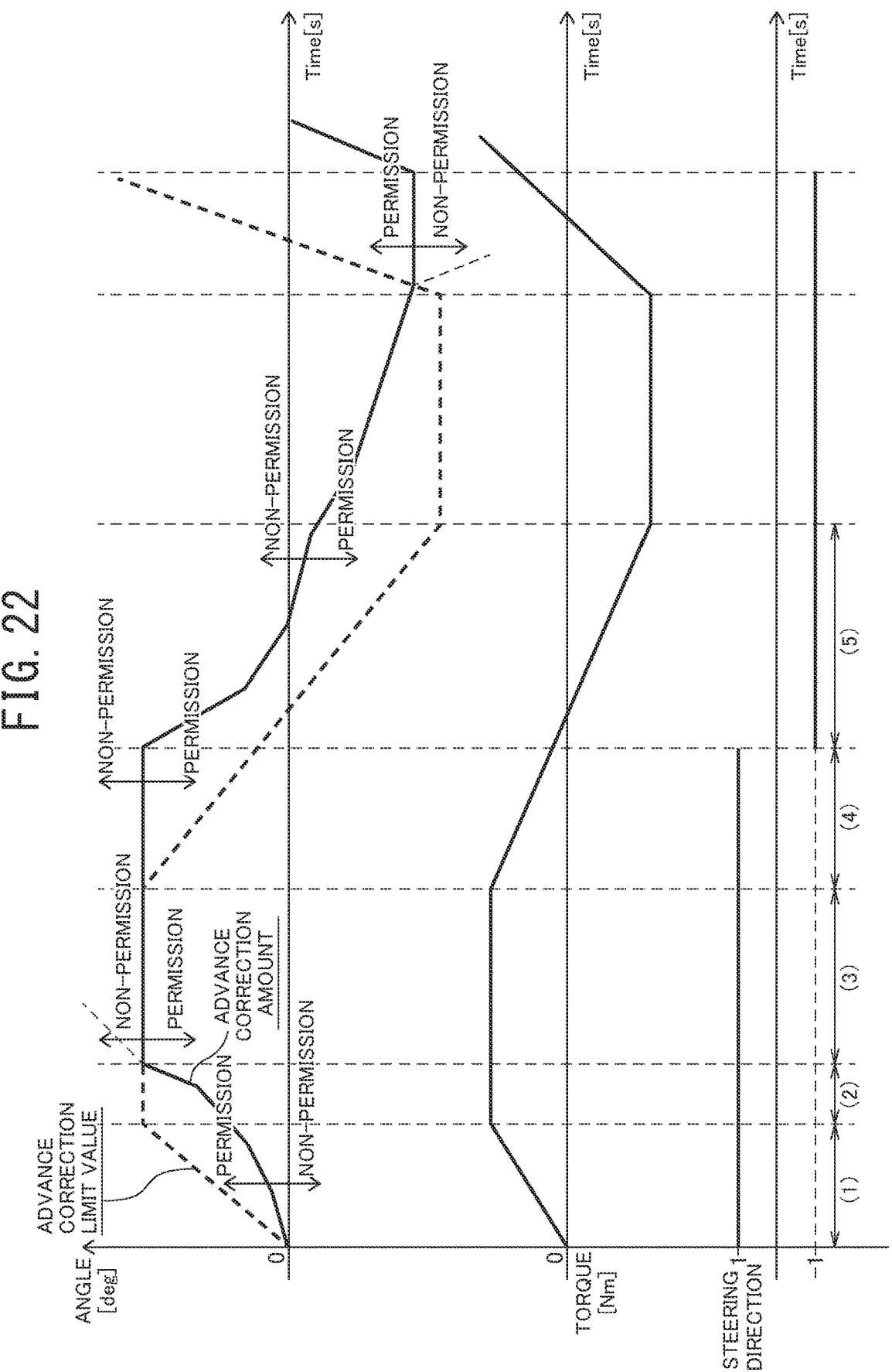
FIG. 22 is a diagram for describing a specific operation of the advance permission determination unit, which diagram is a time chart illustrating a relationship among advance correction limit value, advance correction amount, motor output torque, and steering direction.

An example of FIG. 22 illustrates steering in a situation where, for example, motor output increases to some extent in steering during parking.

In FIG. 22, in an upper diagram of the drawing, the vertical axis represents angle [deg]; in a middle diagram of the drawing, the vertical axis represents motor output torque Tm [Nm]; and in a lower diagram of the drawing, the vertical axis represents steering direction ("1" when the sign of the output shaft angular velocity ωos is the + sign, and "−1" when it is the − sign). In addition, in all the diagrams, the horizontal axis represents time [s]. Additionally, in the upper diagram of the drawing, the solid line indicates the advance correction amount Ct, and the broken line indicates the advance correction limit value SgL.

In a period (1) of FIG. 22, the motor output torque Tm has increased on a plus side in accordance with steering of a driver in the "+" direction, and along with this, the advance correction limit value SgL also has increased on the plus side. Additionally, the sign of the steering direction is "+", and the sign of the advance direction (sign(ds=SgL−Ct)) also is "+". Thus, since the steering direction is coincident with the advance direction, the advance permission determination unit 66 permits advance by integration of the post-advance steering angular velocity ωosc.

Next, in a period (2) of FIG. 22, the driver goes into a steering holding state, and thereby change of the motor output torque Tm is stopped, so that change of the advance correction limit value SgL also is stopped. On the other hand, the sign of the steering direction is "+", and that of the advance direction (sign (ds)) also is "+". Thus, since the steering direction is coincident with the advance direction, the advance permission determination unit 66 permits advance by integration of the post-advance steering angular velocity ωosc.

Subsequently, in a period (3) of FIG. 22, the steering holding state of the driver is continuing, and the change of the motor output torque Tm and the change of the advance correction limit value SgL still remain stopped. Additionally, due to the advance by the integration of the post-advance steering angular velocity ωosc in the period (2), the advance correction amount Ct is substantially coincident with the advance correction limit value SgL. Thus, the advance direction (sign (ds)) when performing the integration of the post-advance steering angular velocity ωosc becomes "−". In addition, since the steering direction at that time is "+", the steering direction is not coincident with the advance direction. Accordingly, the advance permission determination unit 66 does not permit advance by integration of the post-advance steering angular velocity ωosc.

Subsequently, in a period (4) of FIG. 22, while the driver is maintaining the steering holding state, the motor output torque Tm begins to decrease. Along with this, the advance correction limit value SgL also decreases. In this period, the steering direction is "+", whereas the advance direction (sign (ds)) is "−". Thus, since the steering direction is not coincident with the advance direction, the advance permission determination unit 66 does not permit advance by the integration of the post-advance steering angular velocity ωosc.

Next, in a period (5) of FIG. 22, the driver performs return-to-center steering operation, whereby the motor output torque Tm further decreases, and soon goes into the minus direction, where the sign thereof becomes "−". Along with this, the advance correction limit value SgL also decreases, and then becomes a minus value, so that the sign thereof is "−". In this period, the steering direction is "−", and the advance direction (sign (ds)) is "−". Thus, since the steering direction is coincident with the advance direction, the advance permission determination unit 66 permits advance by integration of the post-advance steering angular velocity ωosc.

Herein, the output shaft rotation angle sensor 13*c* corresponds to a steering angle detection unit; the output shaft angular velocity calculation unit 53*a* corresponds to a steering angular velocity calculation unit; the estimated angle calculation unit 55 corresponds to a motor electrical angle estimation unit; and the control calculation device 31 corresponds to a motor drive control unit.

Additionally, the resolver 23 and the main electrical angle detection circuit 24A correspond to a motor electrical angle detection unit; the advance gain calculation unit 61 corresponds to an advance gain setting unit; the multiplication unit 62 corresponds to a post-advance steering angular velocity calculation unit; and the second motor electrical angle θm2 corresponds to an estimated motor electrical angle.

In addition, the steering torque sensor 13 corresponds to a steering torque detection unit; the advance permission determination unit 66 corresponds to an advance correction amount control unit; the output shaft angular velocity ωos corresponds to motor rotation direction information; and the correction timing flag CTF with the value of "1" corresponds to correction timing information.

Furthermore, the counter electromotive force angle correction value calculation unit 53 and the estimated angle calculation unit 55 correspond to a counter electromotive force angle correction unit; the motor output torque Tm and the motor torque equivalent value Tm' correspond to motor output torque information; the reduction gear error characteristic Sg corresponds to an angle error; and the reference error characteristic Sg0 corresponds to a reference angle error.

Functions and Effects of First Embodiment

In the motor control device 25 according to the first embodiment, the output shaft angular velocity calculation unit 53a calculates the output shaft angular velocity ωos on the basis of the output shaft rotation angle θos detected by the output shaft rotation angle sensor 13c. On the basis of the output shaft angular velocity ωos, the estimated angle calculation unit 55 calculates the second motor electrical angle θm2 that is an estimated value of the motor electrical angle θm of the electric motor 22. When the resolver 23 is normal, the control calculation device 31 drive controls the electric motor 22 on the basis of the first motor electrical angle θm1 calculated by the main electrical angle detection circuit 24A. When the resolver 23 is abnormal, the control calculation device 31 drive controls the electric motor 22 on the basis of the second motor electrical angle θm2 calculated by the estimated angle calculation unit 55. On the basis of the steering torque Th, the advance gain calculation unit 61 calculates the advance gain Gad for correcting an advance amount of the second motor electrical angle θm2. Specifically, only upon input of the steering torque Th equal to or more than the pre-set predetermined torque value Tht, the advance gain calculation unit 61 calculates the advance gain Gad for advancing the second motor electrical angle θm2 in a direction cancelling an angle error of a direction delayed with respect to a steering direction. In addition, the set predetermined torque value Tht is a boundary value indicating whether or not influence due to the angle error appears as handling feeling of a driver. The multiplication unit 62 multiplies the output shaft angular velocity ωos by the advance gain Gad calculated by the advance gain calculation unit 61 to calculate the post-advance steering angular velocity ωosc. Then, the estimated angle calculation unit 55 integrates the post-advance steering angular velocity ωosc calculated by the multiplication unit 62 to calculate the second motor electrical angle θm2 on the basis of a value of the integration.

With respect to input of the steering torque Th equal to or more than the pre-set predetermined torque value Tht, the above structure enables calculation of the post-advance steering angular velocity ωosc for advancing the second motor electrical angle θm2 in a direction cancelling an angle error of a direction delayed with respect to a steering direction. In the first embodiment, the predetermined torque value Tht has been set to the boundary value indicating whether or not influence due to the angle error appears as handling feeling. Thus, correction can be performed only in timing where influence due to the angle error appears as handling feeling. This can reduce an angle error of a direction delayed with respect to a steering direction in a simpler structure than the conventional ones.

Additionally, in the motor control device 25 according to the first embodiment, furthermore, the counter electromotive force angle correction value calculation unit 53 and the estimated angle calculation unit 55 correct the second motor electrical angle θm2 on the basis of the respective line counter electromotive force values EMF of the electric motor 22.

Specifically, in the first embodiment, the counter electromotive force angle correction value calculation unit 53 and the estimated angle calculation unit 55 calculate the absolute angle regions Z by dividing an angle range (the range of 360°) of one cycle of the motor electrical angle θm by 60° (see FIG. 9). In addition, on the basis of the output shaft angular velocity ωos that is motor rotation information and the sign relationship among the respective line counter electromotive force values EMF, the absolute angle region Z where an actual motor electrical angle θm is present is determined, and the timing of shifting of the absolute angle region Z to an adjacent region is detected. Then, in the detected timing (correction timing), the second motor electrical angle θm2 is corrected on the basis of the boundary angle (correction angle θe) between the absolute angle regions before and after the shifting. In the first embodiment, correction to change the value of the integration by the integration unit 55b to the boundary angle (correction angle θe) is performed.

With this structure, the second motor electrical angle θm2 can be corrected, at the timing of shifting of the absolute angle region to the adjacent region, by using the boundary angle between the absolute angle regions before and after the shifting. Here, the boundary angle is a known electrical angle, and therefore is more reliable angle information than angle information obtained from the output shaft angular velocity ωos. Then, since the second motor electrical angle θm2 can be corrected by the highly reliable angle information, accuracy in estimation of the motor electrical angle θm can be improved.

In addition, in the motor control device 25 according to the first embodiment, furthermore, the absolute angle region determination unit 53c compares an absolute value |EMF| of the maximum value of the respective line counter electromotive force values EMF with the predetermined threshold value Thv, and performs correction using the boundary angle only when the absolute value |EMF| is equal to or more than the predetermined threshold value Thy.

Here, at low motor rotation speeds, the respective line counter electromotive forces are very small, which reduces reliability of the acquired values of the sign relationship.

The above structure can prevent correction using a low-reliable boundary angle from being performed at low motor rotation speeds, so that reduction in estimation accuracy at low motor rotation speeds can be prevented.

Additionally, in the motor control device 25 according to the first embodiment, the absolute angle region determination unit 53c further calculates the intermediate angle θc of the absolute angle region Z. In addition, the absolute angle region determination unit 53c determines the shifting direction in which the intermediate angle θc has shifted, and calculates a new post-shifting intermediate angle θc_sht by shifting the intermediate angle θc in accordance with the determined shifting direction. The correction angle calculation unit 53d sets the above correction timing to the time when the absolute angle region Z has shifted to the adjacent region and the post-shifting intermediate angle θc_sht has changed.

Here, the sign relationship among the respective line counter electromotive force values EMF is easily switched around the switching boundary angle of the absolute angle region Z, so that the absolute angle region determination may cause hunting between the adjacent regions.

In the above structure, the post-shifting intermediate angle θc_sht is configured not to shift when the hunting occurs. Thus, adding as a correction timing condition enables more accurate correction of the second motor electrical angle θm2.

Additionally, in the motor control device 25 according to the first embodiment, furthermore, the advance correction limit value calculation unit 65 calculates the advance correction limit value SgL that is the limit value of the advance correction amount Ct that is the integrated amount of an increased portion of the post-advance steering angular velocity ωosc, on the basis of the error characteristic of the error factor causing an angle error. The advance permission determination unit 66 controls integration processing of the post-advance steering angular velocity ωosc in the estimated angle calculation unit 55 so that the advance correction amount Ct does not exceed the advance correction limit value SgL calculated by the advance correction limit value calculation unit 65.

Specifically, every time the above shifting time is detected, the counter electromotive force angle correction value calculation unit 53 outputs the correction timing flag CTF (1) indicating correction timing of the second motor electrical angle θm2 to the advance correction limit value calculation unit 65 and the advance permission determination unit 66. In timing of each correction on the basis of the input correction timing flag CTF (1), the advance correction limit value calculation unit 65 calculates the reduction gear error characteristic Sg corresponding to the motor torque equivalent value Tm' (q-axis current Iq) at that time, as the reference error characteristic Sg0. Then, a difference value between the calculated reference error characteristic Sg0 and the reduction gear error characteristic Sg in timing of each calculation thereafter is calculated as the advance correction limit value SgL in timing of each calculation. The advance permission determination unit 66 integrates the advance correction update amount Cr to calculate the advance correction amount Ct, and resets the value of the integration of the advance correction update amount Cr to 0 in timing of each correction on the basis of the correction timing flag CTF (1). In other words, the advance correction amount past value Ct (n−1) retained in the signal delay unit 66i is reset to 0.

With this structure, the advance correction limit value SgL is calculated on the basis of the reduction gear error characteristic Sg, whereby integration processing of the post-advance steering angular velocity ωosc can be controlled so that the advance correction amount Ct does not exceed the advance correction limit value SgL. As a result, in situations where the steering torque Th increases at low motor rotation speed, such as pressing abutment against the rack end and hitting a curb with tire, it is possible to prevent occurrence of excessive advance such that exceeds the amount of angle error caused by the reduction gear 21. As a result, assist efficiency reduction and the loss of synchronism due to the excessive advance can be prevented.

In addition, the reference error characteristic Sg0 is configured to be updated in timing of each correction using the boundary angle. Thus, even when correction using the boundary angle has been performed and thereby the second motor electrical angle θm2 has suddenly changed, the advance correction limit value SgL can be calculated from a new reference, so that prevention of occurrence of excessive advance can be further ensured.

Furthermore, the electric power steering device 1 according to the first embodiment includes the motor control device 25.

With the structure, there can be obtained the same functions and effects as those of the motor control device 25. In addition, even when abnormality occurs in the resolver 23 and the motor electrical angle detection circuit 24, the electric motor 22 can be drive controlled by the second motor electrical angle θm2, whereby the steering assist function of the electric power steering device 1 can be continued.

Second Embodiment

Next, the second embodiment of the present invention will be described.
(Structure)

The first embodiment has been configured so that the advance correction limit value SgL is calculated by considering only the reduction gear error characteristic of the reduction gear 21.

However, the second embodiment is different from the first embodiment in that the second embodiment considers a detection error characteristic of the output shaft rotation angle sensor 13c as well as the reduction gear error characteristic. Other than that, the second embodiment has the same structure as that of the first embodiment.

Hereinafter, the same component units as those of the first embodiment are denoted by the same reference signs, and descriptions thereof will be omitted as appropriate, whereas different points will be described in detail.
(Inter-Sensor Error Correction Unit 54)

Figure 23:
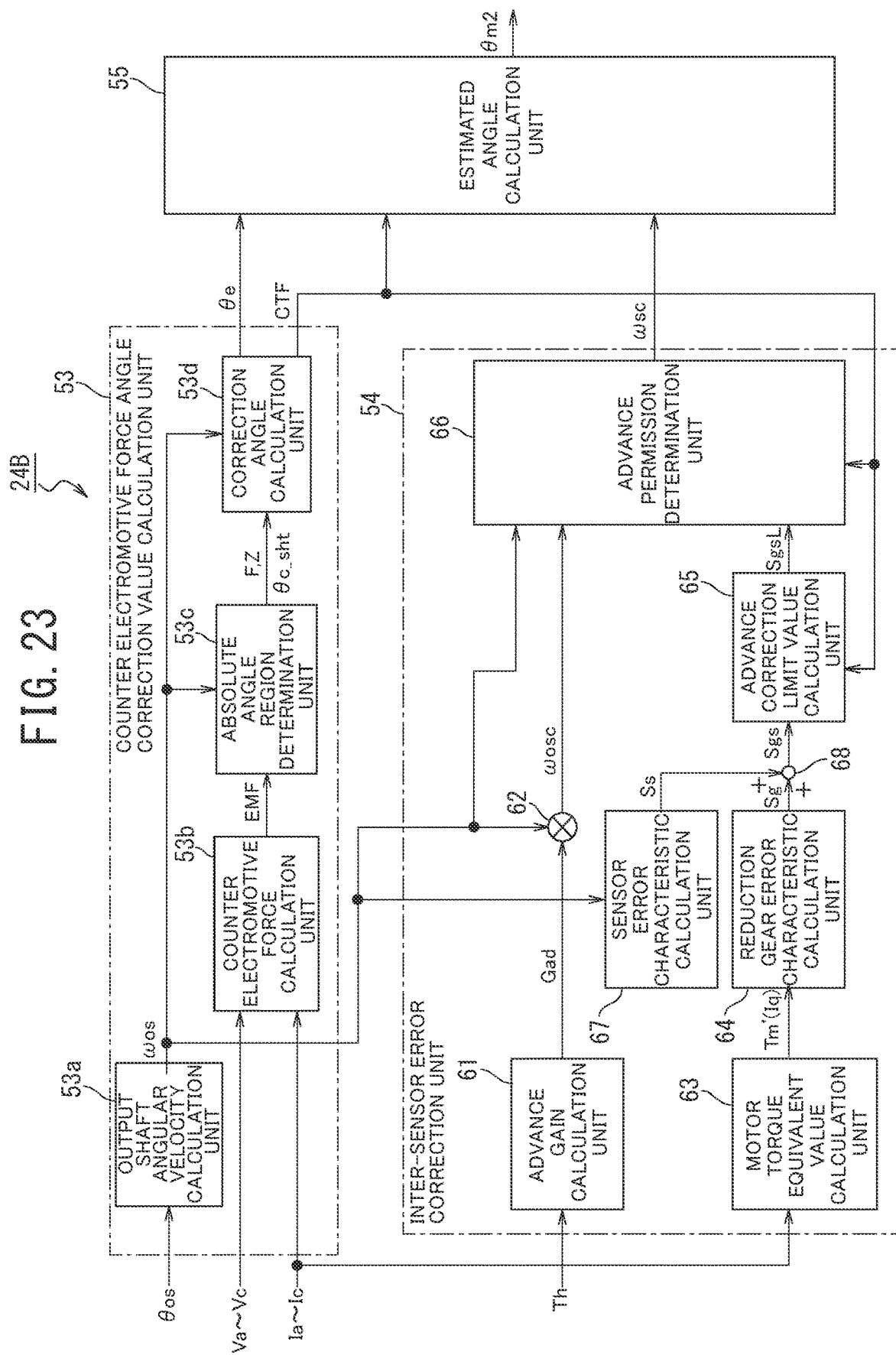
FIG. 23 is a block diagram illustrating a specific structure of a backup electrical angle detection circuit according to a second embodiment.

The inter-sensor error correction unit 54 according to the second embodiment has a structure in which a sensor error characteristic calculation unit 67 and an addition unit 68 are added to the structure of the first embodiment, as illustrated in FIG. 23.

The sensor error characteristic calculation unit 67 calculates a sensor error characteristic Ss on the basis of the output shaft angular velocity ωos. Then, the sensor error characteristic calculation unit 67 outputs the calculated sensor error characteristic Ss to the addition unit 68.

Figure 24:
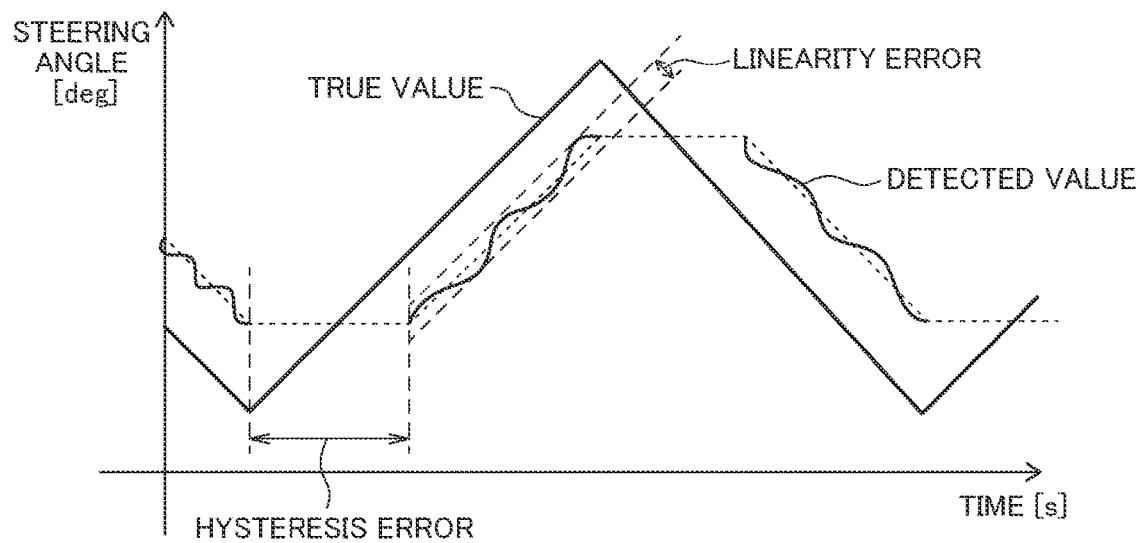
FIG. 24 is a diagram for describing a detection error of an output shaft rotation angle sensor.

Here, as detection error of the output shaft rotation angle sensor 13c, mainly, there are linearity error and hysteresis error, as illustrated in FIG. 24. Note that, in FIG. 24, the horizontal axis represents time, and the vertical axis represents steering angle (output shaft rotation angle θos). The linearity error indicates error with a wave-like characteristic against a true value, and the hysteresis error indicates an error characteristic like a dead zone against a direction in which the true value changes. Particularly, the hysteresis characteristic is an error characteristic that frequently occurs due to attachment rigidity of the output shaft 12b or the like, and therefore is a characteristic desired to be previously corrected.

Figure 25:
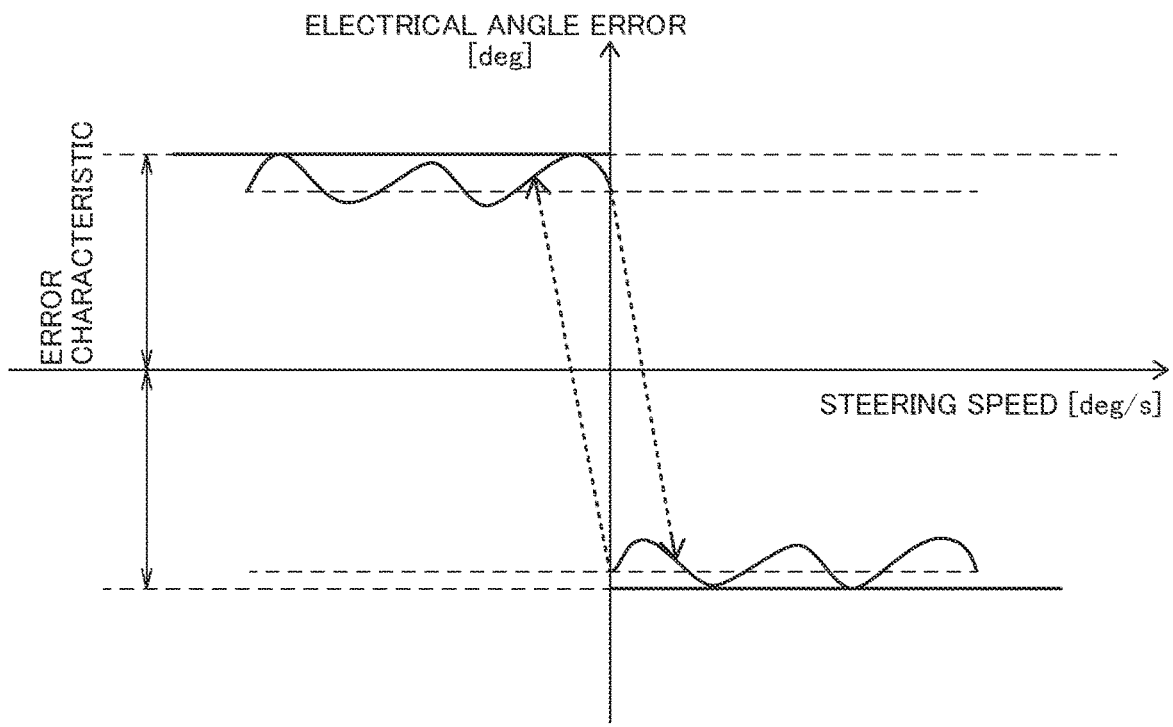
FIG. 25 is a diagram illustrating a relationship between output shaft angular velocity (steering angular velocity) and sensor detection error.

Additionally, the linearity error and the hysteresis error can be presented as illustrated in FIG. 25 when the horizontal axis represents steering velocity (output shaft angular velocity ωos), and the vertical axis represents electrical angle error.

As illustrated in FIG. 25, a combined error of both becomes a plus error when the sign of the steering velocity is minus, whereas it becomes a minus error when the sign of the steering velocity is plus.

On the basis of the fact, the sensor error characteristic calculation unit 67 of the second embodiment calculates, as the sensor error characteristic Ss, a maximum value (a value at a peak of a wavy line) of errors on a plus side at the time of the minus sign in accordance with the sign (i.e., steering direction) of the steering velocity. On the other hand, at the time of the plus sign, a maximum value (a value at a peak of a wavy line) of errors on a minus side is calculated as the sensor error characteristic Ss. In other words, in the second embodiment, the sensor error characteristic Ss has a fixed value whose sign is different with respect to the steering direction.

The addition unit 68 adds the sensor error characteristic Ss input from the sensor error characteristic calculation unit 67 to the reduction gear error characteristic Sg input from the reduction gear error characteristic calculation unit 64, and outputs the addition result as a synthetic error characteristic Sgs to the advance correction limit value calculation unit 65.

In the addition of the sensor error characteristic Ss to the reduction gear error characteristic Sg, when the sign of the steering velocity is "+", a state occurs in which the entire part of the reduction gear error characteristic map illustrated in FIG. 16 has gone down. On the other hand, when the sign of the steering velocity is "−", the entire part of the reduction gear error characteristic map illustrated in FIG. 16 has gone up. In other words, it becomes a map added with sensor error.

The advance correction limit value calculation unit 65 of the second embodiment uses the synthetic error characteristic Sgs input from the addition unit 68 to calculate an advance correction limit value SgsL instead of the advance correction limit value SgL of the first embodiment. Then, the advance correction limit value calculation unit 65 outputs the calculated advance correction limit value SgsL to the advance permission determination unit 66.

Specifically, in timing of each correction on the basis of the input correction timing flag CTF, the synthetic error characteristic Sgs input at that time is set to a reference error characteristic Sgs0 (stored and retained in memory). Then, in timing of each calculation of the advance correction limit value SgsL thereafter, the reference error characteristic Sgs0 is subtracted from the synthetic error characteristic Sgs input at that time to calculate the advance correction limit value SgsL.

(Synthetic Error Characteristic Calculation Processing)

Next, with reference to FIG. 26, a description will be given of a specific processing content of synthetic error characteristic calculation processing that is executed by the addition unit 68. The synthetic error characteristic calculation processing is processing of a subprogram that is called by the main program and executed.

Figure 26:
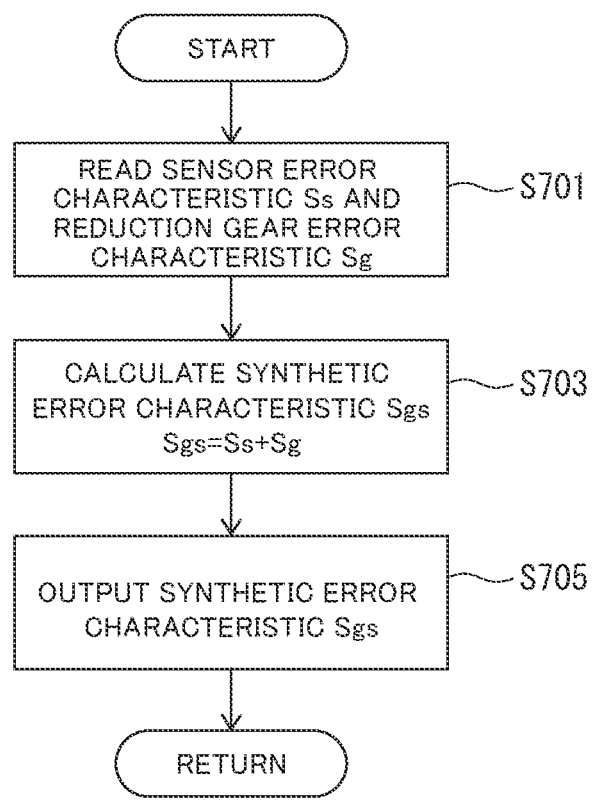
FIG. 26 is a flowchart illustrating one example of a processing procedure of synthetic error characteristic calculation processing according to the second embodiment.

Upon execution of the synthetic error characteristic calculation processing by the CPU of the motor electrical angle detection circuit 24, the processing first proceeds to step S701, as illustrated in FIG. 26.

At step S701, the addition unit 68 reads the reduction gear error characteristic Sg from the reduction gear error characteristic calculation unit 64 and the sensor error characteristic Ss from the sensor error characteristic calculation unit 67, and the processing proceeds to step S703.

At step S703, the addition unit 68 adds the read sensor error characteristic Ss to the read the reduction gear error characteristic Sg to calculate the synthetic error characteristic Sgs. Then, the processing proceeds to step S705.

At step S705, the addition unit 68 outputs the synthetic error characteristic Sgs calculated at step S703 to the advance correction limit value calculation unit 65, ends the series of processing, and returns to the calling processing.

(Advance Correction Limit Value Calculation Processing)

Next, with reference to FIG. 27, a description will be given of a specific processing content of advance correction limit value calculation processing that is executed by the advance correction limit value calculation unit 65 of the second embodiment. The advance correction limit value calculation processing is processing of a subprogram that is called by the main program and executed.

Figure 27:
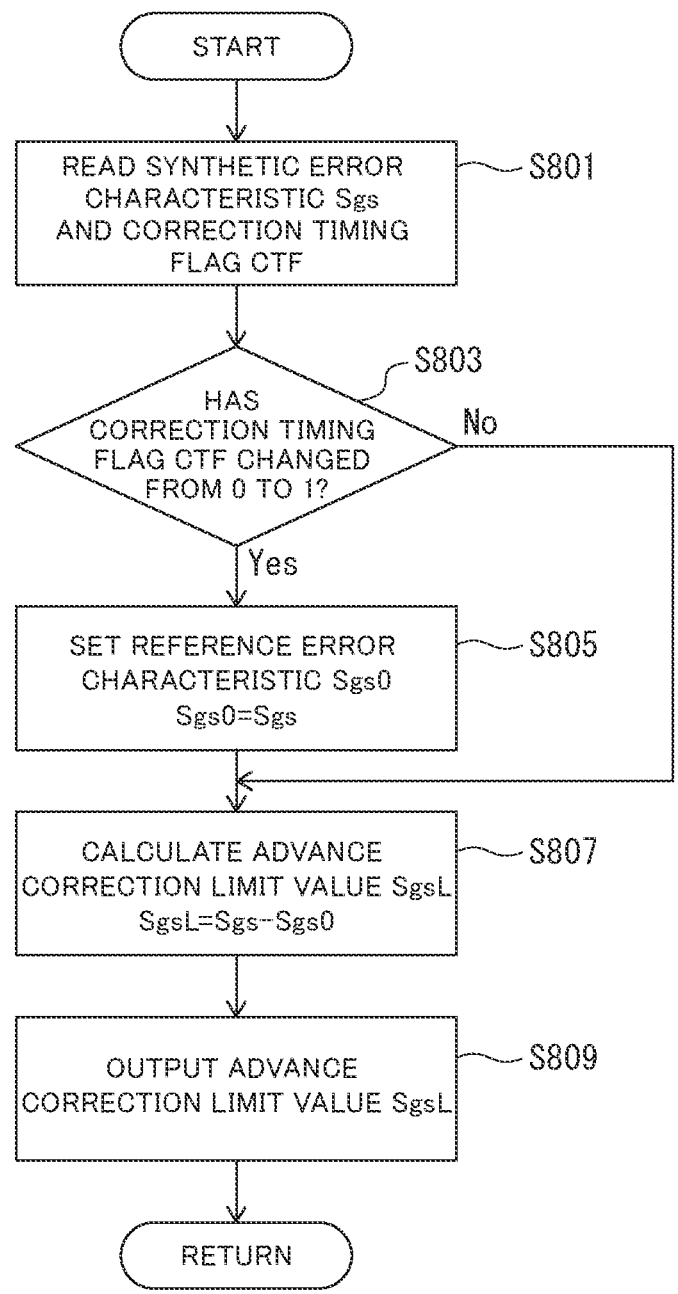
FIG. 27 is a flowchart illustrating one example of a processing procedure of advance correction limit value calculation processing according to the second embodiment.

Upon execution of the advance correction limit value calculation processing by the CPU of the motor electrical angle detection circuit 24, the processing first proceeds to step S801, as illustrated in FIG. 27.

At step S801, the advance correction limit value calculation unit 65 reads the synthetic error characteristic Sgs and the correction timing flag CTF, and the processing proceeds to step S803.

At step S803, the advance correction limit value calculation unit 65 determines whether or not the correction timing flag CTF has changed from "0" to "1". When the correction timing flag CTF has been determined to have changed from "0" to "1" (Yes), the processing proceeds to step S805, whereas when not (No), it proceeds to step S807.

When the processing has proceeded to step S805, the advance correction limit value calculation unit 65 sets, in timing of changing of the correction timing flag CTF from "0" to "1" as reference timing, the synthetic error characteristic Sgs that is an added value of the reduction gear error characteristic Sg and the sensor error characteristic Ss corresponding to the motor torque equivalent value Tm' and the output shaft angular velocity ωos at that time, as the reference error characteristic Sgs0. After that, the processing proceeds to step S807.

Specifically, the advance correction limit value calculation unit 65 sets the synthetic error characteristic Sgs read at step S801 to the reference error characteristic Sgs0, and stores and retains the reference error characteristic Sgs0 in memory.

At step S807, the advance correction limit value calculation unit 65 subtracts the reference error characteristic Sgs0 stored in memory from the synthetic error characteristic Sgs read at step S801 to calculate the advance correction limit value SgsL. Then, the processing proceeds to step S809.

At step S809, the advance correction limit value calculation unit 65 outputs the advance correction limit value SgsL calculated at step S807 to the advance permission determination unit 66, ends the series of processing, and returns to the calling processing.

(Operation)

Hereinafter, operations of the second embodiment will be described. Note that the same operations as those of the first embodiment will be omitted as appropriate, and operations different from those of the first embodiment will be described in detail.

Using the map information illustrated in FIG. 16, the reduction gear error characteristic calculation unit 64 calculates an angle error (torsion angle) corresponding to the input motor torque equivalent value Tm' as the reduction gear error characteristic Sg, and outputs the calculated reduction gear error characteristic Sg to the addition unit 68.

On the other hand, using the error characteristic illustrated in FIG. 25, the sensor error characteristic calculation unit 67 calculates an angle error (fixed value) corresponding to the input output shaft angular velocity ωos as the sensor error characteristic Ss, and outputs the calculated sensor error characteristic Ss to the addition unit 68.

The addition unit 68 adds the input sensor error characteristic Ss to the input reduction gear error characteristic Sg to calculate the synthetic error characteristic Sgs (steps S701 to S703). Then, the addition unit 68 outputs the calculated synthetic error characteristic Sgs to the advance correction limit value calculation unit 65 (step S705).

The advance correction limit value calculation unit 65 calculates the advance correction limit value SgL on the basis of the input synthetic error characteristic Sgs and the input correction timing flag CTF.

Specifically, every time the correction timing flag CTF changes from "0" to "1", the synthetic error characteristic Sgs input in this timing is set as the reference error characteristic Sgs0 (step S801, Yes at step S803, and step S805). In other words, the reference error characteristic Sgs0 set every time the correction timing flag CTF changes from "0" to "1" is updated to the input synthetic error characteristic Sgs.

Then, in timing of each calculation of the advance correction limit value SgsL thereafter, a subtraction result obtained by subtracting the set reference error characteristic Sgs0 from the input synthetic error characteristic Sgs in timing of each calculation is calculated as the advance correction limit value SgsL (step S807). Then, the calculated advance correction limit value SgsL is output to the advance permission determination unit 66 (step S809).

Operations of the advance permission determination unit 66 and the estimated angle calculation unit 55 are the same as those of the first embodiment except that the advance correction limit value SgsL is used instead of the advance correction limit value SgL, so that descriptions thereof will be omitted.

Functions and Effects of Second Embodiment

The second embodiment provides the following effects in addition to the effects of the first embodiment.

In the motor control device 25 according to the second embodiment, the counter electromotive force angle correction value calculation unit 53 detects the timing of shifting of the absolute angle region Z where the actual motor electrical angle θm is present to an adjacent region. Then, every time the timing is detected, the correction timing flag CTF (1) indicating correction timing for the second motor electrical angle θm2 is output to the advance correction limit value calculation unit 65 and the advance permission determination unit 66. In timing of each correction on the basis of the input correction timing flag CTF (1), the advance correction limit value calculation unit 65 calculates, as the reference error characteristic Sgs0, the synthetic error characteristic Sgs obtained by adding the sensor error characteristic Ss corresponding to the output shaft angular velocity ωos at that time to the reduction gear error characteristic Sg corresponding to the motor torque equivalent value Tm' (q-axis current Iq) at that time. Then, the advance correction limit value calculation unit 65 calculates a difference value between the calculated reference error characteristic Sgs0 and the synthetic error characteristics Sgs in timing of each calculation thereafter, as the advance correction limit value SgsL in timing of each calculation.

The advance permission determination unit 66 integrates the advance correction update amount Cr to calculate the advance correction amount Ct, and resets the value of the integration of the advance correction update amount Cr to 0 in timing of each correction on the basis of the correction timing flag CTF (1). In other words, the advance correction amount past value Ct(n−1) retained in the signal delay unit 66i is reset to 0.

With this structure, the advance correction limit value SgsL is calculated on the basis of the synthetic error characteristic Sgs obtained by adding the sensor error characteristic Ss to the reduction gear error characteristic Sg, whereby integration processing of the post-advance steering angular velocity ωosc can be controlled so that the advance correction amount Ct does not exceed the advance correction limit value SgsL. Thus, even when steering to right and left in the situations where the steering torque Th increases at low motor rotation speed, such as pressing abutment against the rack end and hitting a curb with tire, it is possible to prevent occurrence of excessive advance such that exceeds a total amount of angle errors caused by the reduction gear 21 and the output shaft rotation angle sensor 13c. As a result, prevention of assist efficiency reduction and occurrence of loss of synchronism due to excessive advance can be further ensured.

In addition, the reference error characteristic Sgs0 is configured to be updated in timing of each correction using the boundary angle. Thus, even when correction using the boundary angle has been performed and thereby the second motor electrical angle θm2 has suddenly changed, the advance correction limit value SgsL can be calculated from a new reference, so that prevention of occurrence of excessive advance can be further ensured.

Third Embodiment

Next, the third embodiment of the present invention will be described.

(Structure)

The first embodiment has had the structure in which the advance gain is set to be equal to or more than "1", by which the output shaft angular velocity ωos is multiplied to calculate the post-advance steering angular velocity ωosc. However, the third embodiment is different from the first embodiment in that the advance gain is set to be equal to or more than "0", by which the output shaft angular velocity ωos is multiplied to calculate the advance correction update amount Cr. Additionally, the third embodiment is also different from the first embodiment in that the advance correction update amount Cr is added to the output shaft angular velocity ωos to calculate the post-advance steering angular velocity ωosc. Other structures than those are the same as those of the first embodiment.

Hereinafter, the same component units as those of the first embodiment are denoted by the same reference signs, and descriptions thereof will be omitted as appropriate, whereas different points will be described in detail.

(Advance Gain Calculation Unit 61)

Figure 29:
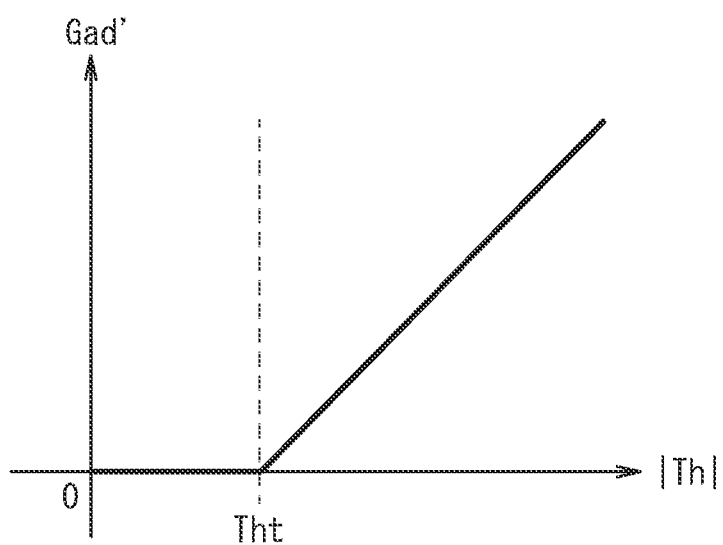
FIG. 29 is a diagram illustrating one example of an advance gain map according to the third embodiment.

The advance gain calculation unit 61 according to the third embodiment is configured to calculate an advance gain Gad' instead of the advance gain Gad of the first embodiment by using an advance gain map illustrated in FIG. 29 instead of the advance gain map illustrated in FIG. 15 of the first embodiment.

Specifically, as illustrated in FIG. 29, the advance gain map of the third embodiment is characterized in that the advance gain Gad' is "0" in a range of the dead zone where the absolute value |Th| of the steering torque Th is less than the predetermined torque value Tht, whereas the advance gain Gad' has a value larger than "0" in a range where the absolute value |Th| thereof is equal to or more than the predetermined torque value Tht. It is particularly characterized in that, in the range where the absolute value |Th| is equal to or more than the predetermined torque value Tht, the advance gain Gad' linearly increases with a constant slope as the absolute value |Th| becomes larger. Note that the advance gain map is not limited to one having the structure in which the advance gain Gad' linearly changes with a constant slope, and may have another structure such as a structure in which the advance gain Gad' linearly changes with a plurality of slopes in multiple steps or nonlinearly changes.

(Multiplication Unit 62)

The multiplication unit 62 according to the third embodiment multiplies the output shaft angular velocity ωos input from the output shaft angular velocity calculation unit 53*a* by the advance gain Gad' input from the advance gain calculation unit 61 to calculate the advance correction update amount Cr. Then, the multiplication unit 62 outputs the calculated advance correction update amount Cr to the advance permission determination unit 66. Note that in the range where the absolute value |Th| of the steering torque Th is less than the predetermined torque value tht, the advance gain Gad' is "0", and therefore, the advance correction update amount Cr is also "0".

(Advance Permission Determination Unit 66)

Figure 28:
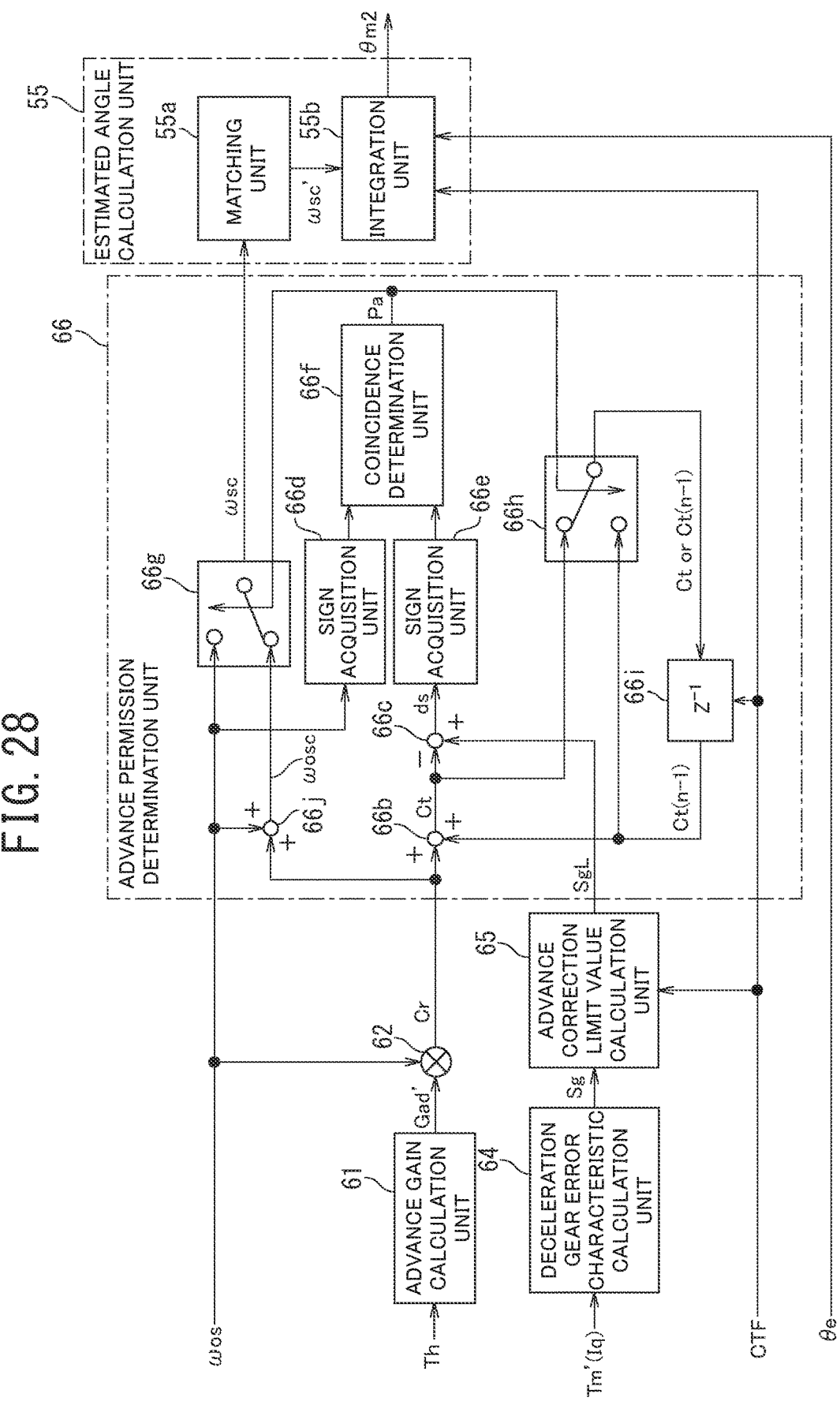
FIG. 28 is a block diagram illustrating a specific structure of an advance permission determination unit according to a third embodiment.

The advance permission determination unit 66 according to the third embodiment is configured to include an addition unit 66*j* instead of the subtraction unit 66*a* in the advance permission determination unit 66 of the first embodiment, as illustrated in FIG. 28.

The addition unit 66*b* of the third embodiment adds the advance correction amount past value Ct(n−1) input from the signal delay unit 66*i* to the advance correction update amount Cr input from the multiplication unit 62 to calculate the advance correction amount Ct. Then, the addition unit 66*b* outputs the calculated advance correction amount Ct to the subtraction unit 66*c* and the advance correction amount past value switching unit 66*h*, respectively.

The addition unit 66*j* adds the advance correction update amount Cr input from the multiplication unit 62 to the output shaft angular velocity ωos input from the output shaft angular velocity calculation unit 53*a* to calculate the post-advance steering angular velocity ωosc. Then, the addition unit 66*j* outputs the calculated post-advance steering angular velocity ωosc to the angular velocity switching unit 66*g*.

Here, when the absolute value |Th| of the steering torque Th is less than the predetermined torque value Tht, the advance correction update amount Cr becomes "0". In this case, the output shaft angular velocity ωos is output as the post-advance steering angular velocity ωosc.

On the basis of the determination result Pa input from the coincidence determination unit 66*f*, the angular velocity switching unit 66*g* of the third embodiment switches the final steering angular velocity ωsc that is to be output as the final steering angular velocity ωsc to the estimated angle calculation unit 55 to any one of the output shaft angular velocity ωos input from the output shaft angular velocity calculation unit 53*a* or the post-advance steering angular velocity ωosc input from the addition unit 66*j*. The switching method is the same as that of the angular velocity switching unit 66*g* of the first embodiment.

Processing contents of the respective component units other than the component units described above are the same as those in the first embodiment, and therefore descriptions thereof will be omitted. Additionally, regarding the operations, the only one different point is that the advance correction update amount Cr is obtained from the output shaft angular velocity ωos by using the advance gain Gad' obtained from the advance gain map illustrated in FIG. 29, and then the advance correction update amount Cr is added to the output shaft angular velocity ωos to obtain the post-advance steering angular velocity ωosc. Other operations than that are the same as those of the first embodiment. Therefore, descriptions of the operations also will be omitted.

Here, the multiplication unit 62 and the addition unit 66*j* correspond to a post-advance steering angular velocity calculation unit.

Functions and Effects of Third Embodiment

In the motor control device 25 according to the third embodiment, the output shaft angular velocity calculation unit 53*a* calculates the output shaft angular velocity ωos on the basis of the output shaft rotation angle θos detected by the output shaft rotation angle sensor 13*c*. On the basis of the output shaft angular velocity ωos, the estimated angle calculation unit 55 calculates the second motor electrical angle θm2 that is an estimated value of the motor electrical angle θm of the electric motor 22. When the resolver 23 is normal, the control calculation device 31 drive controls the electric motor 22 on the basis of the first motor electrical angle θm1 calculated by the main electrical angle detection circuit 24A. On the other hand, when the resolver 23 is abnormal, the control calculation device 31 drive controls the electric motor 22 on the basis of the second motor electrical angle θm2 calculated by the estimated angle calculation unit 55.

Furthermore, on the basis of the steering torque Th, the advance gain calculation unit 61 calculates the advance gain Gad' for correcting an advance amount of the second motor electrical angle θm2. Here, the advance gain Gad' is a gain for advancing the second motor electrical angle θm2 in a direction cancelling an angle error of a direction delayed with respect to a steering direction. When the absolute value |Th| of the steering torque Th is less than the predetermined torque value Tht, the advance gain Gad' is "0", whereas when it is equal to or more than the predetermined torque value Tht, the advance gain Gad' has a value larger than "0". In addition, similarly to the first embodiment, the predetermined torque value Tht is set to a boundary value indicating whether or not influence due to the angle error appears as handling feeling of the driver. The multiplication unit 62 multiplies the output shaft angular velocity ωos calculated by the output shaft angular velocity calculation unit 53*a* by the advance gain Gad' calculated by the advance gain addition unit 61 to calculate the advance correction update amount Cr. The addition unit 66*j* adds the advance correction update amount Cr calculated by the multiplication unit 62 to the output shaft angular velocity ωos calculated by the output shaft angular velocity calculation unit 53*a* to calculate the post-advance steering angular velocity ωosc. Then, the estimated angle calculation unit 55 integrates the post-advance steering angular velocity ωosc calculated by the addition unit 66*j* to calculate the second motor electrical angle θm2 on the basis of a value of the integration.

With this structure, there can be obtained functions and effects equivalent to those of the motor control device 25 according to the first embodiment.

(Modifications)

While the above-described second embodiment has been structured such that the advance correction limit value SgsL is calculated on the basis of the synthetic error characteristic Sgs obtained by synthesizing the reduction gear error characteristic Sg and the sensor error characteristic Ss, the present invention is not limited thereto. For example, there may be employed a structure in which only the sensor error characteristic Ss is used to calculate an advance correction limit value SsL instead of the advance correction limit value SgsL of the second embodiment. When this structure is employed, the fixed sensor error characteristic Ss (see FIG. 25) corresponding to the sign of the output shaft angular velocity ωos becomes the advance correction limit value SsL. Then, regardless of the correction timing flag CTF, every time the sign of the output shaft angular velocity ωos reverses, the sensor error characteristic Ss corresponding to each sign is set as the advance correction limit value SsL.

Additionally, the above respective embodiments have been structured such that the motor electrical angle is estimated on the basis of the output shaft rotation angle θos detected by the output shaft rotation angle sensor 13c forming the steering torque sensor 13. However, the present invention is not limited thereto. For example, the motor electrical angle may be estimated on the basis of a rotation angle detected by another sensor that detects a rotation angle of a shaft rotating in conjunction with operation of the steering wheel 11, such as estimating the motor electrical angle on the basis of the input shaft rotation angle θ is detected by the input shaft rotation angle sensor 13b.

In addition, in the above respective embodiments, the one cycle of the motor electrical angle is divided by 60 [deg] into the absolute angle regions, and on the basis of the sign (corresponding to the motor rotation direction) of the output shaft angular velocity ωos and the sign relationship among the respective line counter electromotive force values EMF, it is determined in which of the absolute angle regions the actual motor electrical angle θm is present. Besides, it is determined whether or not the absolute angle region where the actual motor electrical angle θm is present has shifted to an adjacent region. When the absolute angle region has been determined to have shifted thereto, the second motor electrical angle θm2 is corrected by a boundary angle between the regions before and after the shifting. However, the present invention is not limited thereto. For example, the one motor electrical angle cycle may be divided by 30 [deg] into absolute angle regions, and on the basis of a magnitude relationship among the respective line counter electromotive force values EMF as well as the sign of the output shaft angular velocity ωos and the sign relationship among the respective line counter electromotive force values EMF, it may be determined in which of the absolute angle regions the actual motor electrical angle θm is present (see PTL 2 above for details). In this case also, a boundary angle at the time of shifting between the regions is used to correct the second motor electrical angle θm2. Additionally, in one motor electrical angle cycle, a motor electrical angle at which each of the respective line counter electromotive force values EMF is zero is also known. Thus, a zero-cross timing of each of the respective line counter electromotive force values EMF may be determined, and the second motor electrical angle θm2 may be corrected by using a motor electrical angle corresponding to a phase of the line counter electromotive force of zero at the time of determination (see PTL 2 above for details).

Furthermore, while the respective embodiments have been structured such that only abnormally of the resolver 23 is determined, and when the resolver 23 is abnormal, the second motor electrical angle θm2 is output as the motor electrical angle θm, the present invention is not limited thereto. For example, a structure may be employed in which abnormality of the angle calculation unit 51 also may be determined, and even when although the resolver 23 is normal, the angle calculation unit 51 is abnormal, the second motor electrical angle θm2 may be output as the motor electrical angle θm.

Additionally, the respective embodiments have been structured such that only in the timing where the absolute angle region has shifted to the adjacent angle region, the second motor electrical angle θm is corrected by using a boundary angle at that time. However, the present invention is not limited thereto. For example, there may be employed a structure in which a third motor electrical angle θm3 is calculated on the basis of the respective line counter electromotive force values EMF. Then, on the basis of a motor rotation velocity or the predetermined threshold value Thy, when the respective line counter electromotive force values EMF have been determined to be reliable values for acquiring the signs, the third motor electrical angle θm3 may be output to the electrical angle selection unit 24C. On the other hand, when they have been determined to be unreliable values, the second motor electrical angle θm2 calculated from the output shaft angular velocity ωos may be output to the electrical angle selection unit 24C.

The entire contents of Japanese Patent Application No. P2018-092473 (filed on May 11, 2018), to which the present application claims priority, are incorporated herein by reference. While the present invention has been described with reference to the definite number of embodiments, the scope of the present invention is not limited thereto, and modifications of the respective embodiments based on the above disclosure are obvious to those skilled in the art.

REFERENCE SIGNS LIST

1: Electric power steering device
2: Vehicle
11: Steering wheel
12: Steering shaft
12b: Output shaft
13: Steering torque sensor
13c: Output shaft rotation angle sensor
20: Steering assist mechanism
21: Reduction gear
22: Electric motor
23: Resolver
24: Motor electrical angle detection circuit
24A: Main electrical angle detection circuit
24B: Backup electrical angle detection circuit
24C: Electrical angle selection unit
25: Motor control device
26: Vehicle speed sensor
31: Control calculation device
32: Motor drive circuit
45A to 45C: Current detection circuit
40: Voltage detection circuit
41: Gate drive circuit
42: Inverter circuit
51: Angle calculation unit
52: Resolver abnormality determination unit
53: Counter electromotive force angle correction value calculation unit
53a: Output shaft angular velocity calculation unit
53b: Counter electromotive force calculation unit
53c: Absolute angle region determination unit
53d: Correction angle calculation unit
54: Inter-sensor error correction unit
55: Estimated angle calculation unit
55a: Matching unit
55b: Integration unit 61: Advance gain calculation unit
62: Multiplication unit
63: Motor torque equivalent value calculation unit
64: Reduction gear error characteristic calculation unit
65: Advance correction limit value calculation unit
66: Advance permission determination unit
66a, 66c: Subtraction unit
66b, 66j: Addition unit
66d, 66e: Sign acquisition unit
66f: Coincidence determination unit
66g: Angular velocity switching unit
66h: Advance correction amount past value switching unit
66i: Signal delay unit

The invention claimed is:

1. A motor control device comprising:
a steering angular velocity calculation unit configured to calculate a steering angular velocity on a basis of a steering angle detected by a steering angle detection unit configured to detect the steering angle of a steering wheel;
a motor electrical angle estimation unit configured to estimate a motor electrical angle of an electric motor providing a steering assist force to a steering shaft on a basis of the steering angular velocity calculated by the steering angular velocity calculation unit;
a motor drive control unit configured to, when a motor electrical angle detection unit configured to detect the motor electrical angle of the electric motor is normal, drive control the electric motor on a basis of the motor electrical angle detected by the motor electrical angle detection unit and, when the motor electrical angle detection unit is abnormal, drive control the electric motor on a basis of an estimated motor electrical angle estimated by the motor electrical angle estimation unit;
an advance gain setting unit configured to set an advance gain for correcting an advance amount of the estimated motor electrical angle on a basis of a steering torque detected by a steering torque detection unit configured to detect the steering torque transmitted to the steering shaft; and
a post-advance steering angular velocity calculation unit configured to calculate a post-advance steering angular velocity on a basis of a multiplication result obtained by multiplying the steering angular velocity by the advance gain set by the advance gain setting unit, wherein
the motor electrical angle estimation unit integrates the post-advance steering angular velocity calculated by the post-advance steering angular velocity calculation unit, and estimates the motor electrical angle on a basis of a value of the integration, and
only upon input of a steering torque equal to or more than a pre-set predetermined torque value, the advance gain setting unit sets the advance gain for advancing the estimated motor electrical angle in a direction cancelling an angle error of a direction delayed with respect to a steering direction.

2. The motor control device according to claim 1, wherein the predetermined torque value is set to a boundary value indicating whether or not influence due to the angle error appears as handling feeling of a driver.

3. The motor control device according to claim 1, wherein the electric motor is a multiphase electric motor, and
the motor control device further comprises a counter electromotive force angle correction unit configured to correct the estimated motor electrical angle on a basis of respective line counter electromotive forces of the electric motor.

4. The motor control device according to claim 3, further comprising:
an advance correction limit value calculation unit configured to, on a basis of an error characteristic that is a characteristic of at least one error factor causing the angle error, calculate an advance correction limit value that is a limit value of an advance correction amount that is an integrated amount of an increased amount of the post-advance steering angular velocity due to the advance gain; and
an advance correction amount control unit configured to control integration processing of the post-advance steering angular velocity by the motor electrical angle estimation unit such that the advance correction amount does not exceed the advance correction limit value calculated by the advance correction limit value calculation unit.

5. The motor control device according to claim 4, wherein the advance correction amount control unit controls the integration processing by the motor electrical angle estimation unit in such a manner as to permit only integration of the post-advance steering angular velocity in a direction in which the advance correction amount approaches the advance correction limit value in a range not exceeding the advance correction limit value, and when not permitting, directly integrate the steering angular velocity calculated by the steering angular velocity calculation unit.

6. The motor control device according to claim 4, wherein the electric motor is connected to the steering shaft via a reduction gear, and
the advance correction limit value calculation unit calculates the advance correction limit value on a basis of at least one of a mechanical compliance characteristic indicating a relationship between motor output torque information and a torsion angle, which is an error characteristic of the reduction gear as one of the at least one error factor, or a detection error characteristic indicating a relationship between steering angle information and a detection error, which is an error characteristic of the steering angle detection unit as another one of the at least one error factor.

7. The motor control device according to claim 6, wherein the counter electromotive force angle correction unit detects timing where a sign relationship among the respective line counter electromotive forces of the electric motor shifts to another sign relationship, and on a basis of the detected timing, corrects the estimated motor electrical angle on a basis of boundary angle information corresponding to a pre-set set of the sign relationships before and after the shifting.

8. The motor control device according to claim 7, wherein the counter electromotive force angle correction unit calculates absolute angle regions by dividing an angle range of one cycle of the motor electrical angle by 60°, detects timing where among the absolute angle regions, an absolute angle region where the motor electrical angle that is an actual motor electrical angle is present shifts to an adjacent region, on a basis of motor rotation direction information and the respective line counter electromotive forces, and at a time of the detection of the timing, corrects the estimated motor electrical angle on a basis of a boundary angle between the absolute angle regions before and after the shifting.

9. The motor control device according to claim 7, wherein
at each detection of the shifting timing, the counter electromotive force angle correction unit outputs correction timing information indicating correction timing of the estimated motor electrical angle to the advance correction limit value calculation unit and the advance correction amount control unit, the advance correction limit value calculation unit calculates, at each time of the correction timing on a basis of the correction timing information, as a reference angle error, an angle error due to the mechanical compliance characteristic corresponding to the motor output torque information at that time, and calculates a difference value between the calculated reference angle error and an angle error due to the mechanical compliance characteristic in timing of each subsequent calculation as the advance correction limit value in timing of each calculation, and the advance correction amount control unit integrates the increased amount of the post-advance steering angular velocity to calculate the advance correction amount, and resets a value of the integration of the increased amount to 0 at each time of the correction timing on the basis of the correction timing information.

10. The motor control device according to claim 7, wherein
at each detection of the shifting timing, the counter electromotive force angle correction unit outputs correction timing information indicating correction timing of the estimated motor electrical angle to the advance correction limit value calculation unit and the advance correction amount control unit, the advance correction limit value calculation unit calculates, at each time of the correction timing on a basis of the correction timing information, a first angle error due to the mechanical compliance characteristic corresponding to the motor output torque information at that time, calculates a second angle error due to the detection error characteristic of the steering angle detection unit on a basis of the steering angle information, adds the second angle error to the first angle error to set a result of the addition to a reference angle error, and calculates a difference value between the reference angle error and an added value of the first angle error due to the mechanical compliance characteristic and the second angle error due to the detection error characteristic in timing of each subsequent calculation as the advance correction limit value in the timing of each subsequent calculation, and the advance correction amount control unit integrates the increased amount of the post-advance steering angular velocity to calculate the advance correction amount, and resets a value of the integration of the increased amount to 0 at each time of the correction timing on a basis of the correction timing information.

11. The motor control device according to claim 7, wherein
at each detection of the shifting timing, the counter electromotive force angle correction unit outputs correction timing information indicating correction timing of the estimated motor electrical angle to the advance correction amount control unit, the advance correction limit value calculation unit calculates, as the advance correction limit value, an angle error due to the detection error characteristics of the steering angle detection unit on a basis of the steering angle information, and the advance correction amount control unit integrates the increased amount of the post-advance steering angular velocity to calculate the advance correction amount, and resets a value of the integration of the increased amount to 0 at each time of the correction timing on a basis of the correction timing information.

12. An electric power steering device comprising the motor control device according to claim 1.

* * * * *